(12) United States Patent
Mackall et al.

(10) Patent No.: US 12,473,344 B2
(45) Date of Patent: Nov. 18, 2025

(54) CHIMERIC ANTIGEN RECEPTOR POLYPEPTIDES AND METHODS OF USING SAME

(71) Applicant: The Board of Trustees of the Leland Stanford Junior University, Stanford, CA (US)

(72) Inventors: Crystal Mackall, Stanford, CA (US); Michael Lin, Stanford, CA (US); Robbie Majzner, Palo Alto, CA (US); Hokyung Chung, San Diego, CA (US); Louai Labanieh, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1054 days.

(21) Appl. No.: 17/254,618

(22) PCT Filed: Jul. 3, 2019

(86) PCT No.: PCT/US2019/040572
§ 371 (c)(1),
(2) Date: Dec. 21, 2020

(87) PCT Pub. No.: WO2020/010239
PCT Pub. Date: Jan. 9, 2020

(65) Prior Publication Data
US 2021/0171602 A1 Jun. 10, 2021

Related U.S. Application Data

(60) Provisional application No. 62/694,830, filed on Jul. 6, 2018.

(51) Int. Cl.
| | | |
|---|---|---|
| *C07K 14/705* | (2006.01) | |
| *A61K 31/426* | (2006.01) | |
| *A61K 31/498* | (2006.01) | |
| *A61K 40/11* | (2025.01) | |
| *A61K 40/31* | (2025.01) | |
| *A61K 40/42* | (2025.01) | |
| *C07K 14/725* | (2006.01) | |
| *C07K 16/28* | (2006.01) | |
| *C12N 9/50* | (2006.01) | |

(52) U.S. Cl.
CPC ........ *C07K 14/7051* (2013.01); *A61K 31/426* (2013.01); *A61K 31/498* (2013.01); *A61K 40/11* (2025.01); *A61K 40/31* (2025.01); *A61K 40/421* (2025.01); *C07K 16/28* (2013.01); *C12N 9/506* (2013.01); *A61K 2239/31* (2023.05); *A61K 2239/38* (2023.05); *A61K 2239/47* (2023.05); *A61K 2239/48* (2023.05); *C07K 2317/622* (2013.01); *C07K 2319/50* (2013.01)

(58) Field of Classification Search
CPC ............. C07K 14/7051; C07K 16/28; C07K 2317/622; C07K 2319/50; C07K 2319/60; C07K 16/2803; C07K 16/2827; C07K 16/3084; C07K 2317/73; C07K 14/005; C07K 2319/03; C07K 2319/33; A61K 31/426; A61K 31/498; A61K 2039/585; A61K 39/001102; A61K 39/12; A61K 2039/5156; C12N 9/506; C12N 2770/24234; C12N 2770/24222; A61P 35/00; C12Y 304/21098
See application file for complete search history.

(56) References Cited

U.S. PATENT DOCUMENTS 10,550,379 B2 * 2/2020 Lin ................ C12Y 304/21098

FOREIGN PATENT DOCUMENTS

| WO | WO-2017004022 A2 * | 1/2017 | ............. C12N 15/86 |
| WO | WO-2018121602 A1 * | 7/2018 | ............. C07K 19/00 |

OTHER PUBLICATIONS

Long et al (Nature Medicine, vol. 21, No. 6, Jun. 2015, 581-590). (Year: 2015).*
Labanieh et al. (2018) "Programming CAR-T cells to kill cancer" Nature Biomedical Engineering, 2:377-391.
Wang et al. (2016) "Phase 1 studies of central memory-derived CD19 CAR T-cell therapy following autologous HSCT in patients with B-cell NHL" Blood 127(24):2980-2990.
Naruse et al. (2022) "A degron system targeting endogenous PD-1 inhibits the growth of tumor cells in mice" NAR Cancer, 4(2):17 pages.

* cited by examiner

Primary Examiner — Sudhakar Katakam
(74) Attorney, Agent, or Firm — Brian E. Davy; Bozicevic, Field & Francis LLP

(57) ABSTRACT

Provided are polypeptides that include, from N-terminus to C-terminus, a chimeric antigen receptor (CAR), a protease, and a degron, where the polypeptide further includes a cleavage site for the protease disposed between the CAR and the degron. Also provided are cells that include such polypeptides (e.g., where the cells express the CAR on their surface) and pharmaceutical compositions including such cells. Nucleic acids that encode the polypeptides, cells including such nucleic acids, and pharmaceutical compositions including such cells, are also provided. Also provided are methods for controlling the expression of a CAR on the surface of a cell, and methods of using the cells of the present disclosure, including methods of using such cells to administer a regulatable CAR cell-based therapy (e.g., a regulatable CAR T cell therapy) to an individual.

10 Claims, 33 Drawing Sheets
Specification includes a Sequence Listing.

A

B

B7H3-CAR-SMASH

- ASV          + ASV

B7H3-CAR (control)

- ASV          + ASV

CAR-nLuc-SMASh has reduced leakiness

CAR-nLuc-SMASh has faster drug response time

SEQUENCE LISTING

<160> NUMBER OF SEQ ID NOS: 14

<210> SEQ ID NO 1
<211> LENGTH: 42
<212> TYPE: PRT

```
<213> ORGANISM: Artificial Sequence
<220> FEATURE:
<223> OTHER INFORMATION: Synthetic sequence

<400> SEQUENCE: 1

Pro Ile Thr Lys Ile Asp Thr Lys Tyr Ile Met Thr Cys Met Ser Ala
1               5                   10                  15

Asp Leu Glu Val Val Thr Ser Thr Trp Val Leu Val Gly Gly Val Leu
            20                  25                  30

Ala Ala Leu Ala Ala Tyr Cys Leu Ser Thr
            35                  40

<210> SEQ ID NO 2
<211> LENGTH: 186
<212> TYPE: PRT
<213> ORGANISM: Artificial Sequence
<220> FEATURE:
<223> OTHER INFORMATION: Synthetic sequence

<400> SEQUENCE: 2

Ala Pro Ile Thr Ala Tyr Ala Gln Gln Thr Arg Gly Leu Leu Gly Cys
1               5                   10                  15

Ile Ile Thr Ser Leu Thr Gly Arg Asp Lys Asn Gln Val Glu Gly Glu
            20                  25                  30

Val Gln Ile Val Ser Thr Ala Thr Gln Thr Phe Leu Ala Thr Cys Ile
        35                  40                  45

Asn Gly Val Cys Trp Ala Val Tyr His Gly Ala Gly Thr Arg Thr Ile
50                  55                  60

Ala Ser Pro Lys Gly Pro Val Ile Gln Met Tyr Thr Asn Val Asp Gln
65                  70                  75                  80

Asp Leu Val Gly Trp Pro Ala Pro Gln Gly Ser Arg Ser Leu Thr Pro
                85                  90                  95

Cys Thr Cys Gly Ser Ser Asp Leu Tyr Leu Val Thr Arg His Ala Asp
            100                 105                 110

Val Ile Pro Val Arg Arg Arg Gly Asp Ser Arg Gly Ser Leu Leu Ser
        115                 120                 125

Pro Arg Pro Ile Ser Tyr Leu Lys Gly Ser Ser Gly Gly Pro Leu Leu
130                 135                 140

Cys Pro Ala Gly His Ala Val Gly Leu Phe Arg Ala Ala Val Cys Thr
145                 150                 155                 160

Arg Gly Val Ala Lys Ala Val Asp Phe Ile Pro Val Glu Asn Leu Glu
                165                 170                 175

Thr Thr Met Arg Ser Pro Val Phe Thr Asp
            180                 185

<210> SEQ ID NO 3
<211> LENGTH: 15
<212> TYPE: PRT
<213> ORGANISM: Artificial Sequence
<220> FEATURE:
<223> OTHER INFORMATION: Synthetic sequence

<400> SEQUENCE: 3

Gly Gly Gly Gly Ser Gly Gly Gly Gly Ser Gly Gly Gly Gly Ser
1               5                   10                  15

<210> SEQ ID NO 4
<211> LENGTH: 10
<212> TYPE: PRT
<213> ORGANISM: Artificial Sequence
```

```
<220> FEATURE:
<223> OTHER INFORMATION: Synthetic sequence

<400> SEQUENCE: 4

Asp Glu Met Glu Glu Cys Ser Gln His Leu
1               5                   10

<210> SEQ ID NO 5
<211> LENGTH: 9
<212> TYPE: PRT
<213> ORGANISM: Artificial Sequence
<220> FEATURE:
<223> OTHER INFORMATION: Synthetic sequence

<400> SEQUENCE: 5

Glu Asp Val Val Pro Cys Ser Met Gly
1               5

<210> SEQ ID NO 6
<211> LENGTH: 306
<212> TYPE: PRT
<213> ORGANISM: Artificial Sequence
<220> FEATURE:
<223> OTHER INFORMATION: Synthetic sequence

<400> SEQUENCE: 6

Pro Gly Asp Glu Met Glu Glu Cys Ser Gln His Leu Pro Gly Ala Gly
1               5                   10                  15

Ser Ser Gly Asp Ile Met Asp Tyr Lys Asp Asp Asp Lys Gly Ser
            20                  25                  30

Ser Gly Thr Gly Ser Gly Ser Gly Thr Ser Ala Pro Ile Thr Ala Tyr
            35                  40                  45

Ala Gln Gln Thr Arg Gly Leu Leu Gly Cys Ile Ile Thr Ser Leu Thr
        50                  55                  60

Gly Arg Asp Lys Asn Gln Val Glu Gly Glu Val Gln Ile Val Ser Thr
65                  70                  75                  80

Ala Thr Gln Thr Phe Leu Ala Thr Cys Ile Asn Gly Val Cys Trp Ala
                85                  90                  95

Val Tyr His Gly Ala Gly Thr Arg Thr Ile Ala Ser Pro Lys Gly Pro
            100                 105                 110

Val Ile Gln Met Tyr Thr Asn Val Asp Gln Asp Leu Val Gly Trp Pro
        115                 120                 125

Ala Pro Gln Gly Ser Arg Ser Leu Thr Pro Cys Thr Cys Gly Ser Ser
    130                 135                 140

Asp Leu Tyr Leu Val Thr Arg His Ala Asp Val Ile Pro Val Arg Arg
145                 150                 155                 160

Arg Gly Asp Ser Arg Gly Ser Leu Leu Ser Pro Arg Pro Ile Ser Tyr
                165                 170                 175

Leu Lys Gly Ser Ser Gly Gly Pro Leu Leu Cys Pro Ala Gly His Ala
            180                 185                 190

Val Gly Leu Phe Arg Ala Ala Val Cys Thr Arg Gly Val Ala Lys Ala
        195                 200                 205

Val Asp Phe Ile Pro Val Glu Asn Leu Glu Thr Thr Met Arg Ser Pro
    210                 215                 220

Val Phe Thr Asp Asn Ser Ser Pro Pro Ala Val Thr Leu Thr His Pro
225                 230                 235                 240

Ile Thr Lys Ile Asp Thr Lys Tyr Ile Met Thr Cys Met Ser Ala Asp
                245                 250                 255
```

```
Leu Glu Val Val Thr Ser Thr Trp Val Leu Val Gly Gly Val Leu Ala
            260                 265                 270

Ala Leu Ala Ala Tyr Cys Leu Ser Thr Gly Cys Val Val Ile Val Gly
            275                 280                 285

Arg Ile Val Leu Ser Gly Lys Pro Ala Ile Ile Pro Asp Arg Glu Val
            290                 295                 300

Leu Tyr
305

<210> SEQ ID NO 7
<211> LENGTH: 776
<212> TYPE: PRT
<213> ORGANISM: Artificial Sequence
<220> FEATURE:
<223> OTHER INFORMATION: Synthetic sequence

<400> SEQUENCE: 7

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
            35                  40                  45

Ala Tyr Ile Ser Ser Asp Ser Ala Ile Tyr Tyr Ala Asp Thr Val
50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Gly Arg Gly Arg Glu Asn Ile Tyr Tyr Gly Ser Arg Leu Asp Tyr Trp
            100                 105                 110

Gly Gln Gly Thr Thr Val Thr Val Ser Ser Gly Gly Gly Gly Ser Gly
            115                 120                 125

Gly Gly Gly Ser Gly Gly Gly Ser Asp Ile Gln Leu Thr Gln Ser
        130                 135                 140

Pro Ser Phe Leu Ser Ala Ser Val Gly Asp Arg Val Thr Ile Thr Cys
145                 150                 155                 160

Lys Ala Ser Gln Asn Val Asp Thr Asn Val Ala Trp Tyr Gln Gln Lys
                165                 170                 175

Pro Gly Lys Ala Pro Lys Ala Leu Ile Tyr Ser Ala Ser Tyr Arg Tyr
            180                 185                 190

Ser Gly Val Pro Ser Arg Phe Ser Gly Ser Gly Ser Gly Thr Asp Phe
            195                 200                 205

Thr Leu Thr Ile Ser Ser Leu Gln Pro Glu Asp Phe Ala Thr Tyr Tyr
            210                 215                 220

Cys Gln Gln Tyr Asn Asn Tyr Pro Phe Thr Phe Gly Gln Gly Thr Lys
225                 230                 235                 240

Leu Glu Ile Lys Ala Ala Ala Thr Thr Thr Pro Ala Pro Arg Pro Pro
                245                 250                 255

Thr Pro Ala Pro Thr Ile Ala Ser Gln Pro Leu Ser Leu Arg Pro Glu
            260                 265                 270

Ala Cys Arg Pro Ala Ala Gly Gly Ala Val His Thr Arg Gly Leu Asp
            275                 280                 285

Phe Ala Cys Asp Ile Tyr Ile Trp Ala Pro Leu Ala Gly Thr Cys Gly
            290                 295                 300
```

```
Val Leu Leu Leu Ser Leu Val Ile Thr Leu Tyr Cys Lys Arg Gly Arg
305                 310                 315                 320

Lys Lys Leu Leu Tyr Ile Phe Lys Gln Pro Phe Met Arg Pro Val Gln
            325                 330                 335

Thr Thr Gln Glu Glu Asp Gly Cys Ser Cys Arg Phe Pro Glu Glu Glu
        340                 345                 350

Glu Gly Gly Cys Glu Leu Arg Val Lys Phe Ser Arg Ser Ala Asp Ala
        355                 360                 365

Pro Ala Tyr Lys Gln Gly Gln Asn Gln Leu Tyr Asn Glu Leu Asn Leu
        370                 375                 380

Gly Arg Arg Glu Glu Tyr Asp Val Leu Asp Lys Arg Arg Gly Arg Asp
385                 390                 395                 400

Pro Glu Met Gly Gly Lys Pro Arg Arg Lys Asn Pro Gln Glu Gly Leu
            405                 410                 415

Tyr Asn Glu Leu Gln Lys Asp Lys Met Ala Glu Ala Tyr Ser Glu Ile
            420                 425                 430

Gly Met Lys Gly Glu Arg Arg Arg Gly Lys Gly His Asp Gly Leu Tyr
            435                 440                 445

Gln Gly Leu Ser Thr Ala Thr Lys Asp Thr Tyr Asp Ala Leu His Met
450                 455                 460

Gln Ala Leu Pro Pro Arg Pro Gly Asp Glu Met Glu Glu Cys Ser Gln
465                 470                 475                 480

His Leu Pro Gly Ala Gly Ser Ser Gly Asp Ile Met Asp Tyr Lys Asp
            485                 490                 495

Asp Asp Asp Lys Gly Ser Ser Gly Thr Gly Ser Gly Ser Gly Thr Ser
            500                 505                 510

Ala Pro Ile Thr Ala Tyr Ala Gln Gln Thr Arg Gly Leu Leu Gly Cys
            515                 520                 525

Ile Ile Thr Ser Leu Thr Gly Arg Asp Lys Asn Gln Val Glu Gly Glu
            530                 535                 540

Val Gln Ile Val Ser Thr Ala Thr Gln Thr Phe Leu Ala Thr Cys Ile
545                 550                 555                 560

Asn Gly Val Cys Trp Ala Val Tyr His Gly Ala Gly Thr Arg Thr Ile
            565                 570                 575

Ala Ser Pro Lys Gly Pro Val Ile Gln Met Tyr Thr Asn Val Asp Gln
            580                 585                 590

Asp Leu Val Gly Trp Pro Ala Pro Gln Gly Ser Arg Ser Leu Thr Pro
            595                 600                 605

Cys Thr Cys Gly Ser Ser Asp Leu Tyr Leu Val Thr Arg His Ala Asp
            610                 615                 620

Val Ile Pro Val Arg Arg Arg Gly Asp Ser Arg Gly Ser Leu Leu Ser
625                 630                 635                 640

Pro Arg Pro Ile Ser Tyr Leu Lys Gly Ser Ser Gly Gly Pro Leu Leu
            645                 650                 655

Cys Pro Ala Gly His Ala Val Gly Leu Phe Arg Ala Ala Val Cys Thr
            660                 665                 670

Arg Gly Val Ala Lys Ala Val Asp Phe Ile Pro Val Glu Asn Leu Glu
            675                 680                 685

Thr Thr Met Arg Ser Pro Val Phe Thr Asp Asn Ser Ser Pro Pro Ala
            690                 695                 700

Val Thr Leu Thr His Pro Ile Thr Lys Ile Asp Thr Lys Tyr Ile Met
705                 710                 715                 720

Thr Cys Met Ser Ala Asp Leu Glu Val Val Thr Ser Thr Trp Val Leu
```

725                 730                 735
Val Gly Gly Val Leu Ala Ala Leu Ala Ala Tyr Cys Leu Ser Thr Gly
            740                 745                 750
Cys Val Val Ile Val Gly Arg Ile Val Leu Ser Gly Lys Pro Ala Ile
            755                 760                 765
Ile Pro Asp Arg Glu Val Leu Tyr
    770                 775

<210> SEQ ID NO 8
<211> LENGTH: 2331
<212> TYPE: DNA
<213> ORGANISM: Artificial Sequence
<220> FEATURE:
<223> OTHER INFORMATION: Synthetic sequence

<400> SEQUENCE: 8

| | | | | | |
|---|---|---|---|---|---|
| gaggtgcagc | tggtggaatc | tggcggcgga | ctggtgcagc | tggcggatc | tctgagactg | 60 |
| agctgtgccg | ccagcggctt | caccttcagc | agcttcggaa | tgcactgggt | gcgccaggcc | 120 |
| cctggcaaag | gactggaatg | gtggcctac | atcagcagcg | acagcagcgc | catctactac | 180 |
| gccgacaccg | tgaagggccg | gttcaccatc | tcccggaca | acgccaagaa | cagcctgtac | 240 |
| ctgcagatga | actccctgcg | ggacgaggac | accgccgtgt | actattgcgg | cagaggcaga | 300 |
| gagaacatct | attacggcag | cagactggac | tactggggcc | agggcacaac | cgtgacagtg | 360 |
| tctagcggag | gcggaggatc | aggcggcgga | ggaagtggcg | gaggggatc | tgatatccag | 420 |
| ctgacccaga | gccccagctt | cctgagcgcc | tctgtgggcg | acagagtgac | catcacatgc | 480 |
| aaggccagcc | agaacgtgga | caccaacgtg | gcctggtatc | agcagaagcc | cggcaaggcc | 540 |
| cctaaggccc | tgatctacag | cgccagctac | cggtacagcg | gcgtgcccag | cagattttct | 600 |
| ggcagcggct | ccggcaccga | cttcaccctg | acaatcagca | gcctgcagcc | cgaggacttc | 660 |
| gccacctact | actgccagca | gtacaacaac | taccctttca | ccttcggcca | ggggaccaag | 720 |
| ctggaaatca | agcggccgc | aacaacaaca | ccagctccta | gacctccaac | tcctgctcct | 780 |
| acaatcgcca | gccagcctct | gtctctgagg | cctgaagctt | gtagacctgc | tgctggcgga | 840 |
| gccgtgcata | ccagaggact | ggatttcgcc | tgcgacatct | catttgggc | ccctctggct | 900 |
| ggaacatgtg | gcgtgctgct | gctgtctctg | gtcatcaccc | tgtactgcaa | gcggggcaga | 960 |
| aagaagctgc | tgtacatctt | caagcagccc | ttcatgcggc | ccgtgcagac | cacacaagag | 1020 |
| gaagatggct | gctcctgcag | attccccgag | gaagaagaag | cggctgcga | gctgagagtg | 1080 |
| aagttctcta | gatctgccga | cgctcccgcc | tacaagcagg | gccagaatca | gctgtacaac | 1140 |
| gagctgaacc | tggggagaag | agaagagtac | gacgtgctgg | ataagcggag | aggcagagat | 1200 |
| cctgagatgg | gcggcaagcc | cagacggaag | aatcctcaag | agggcctgta | taatgagctg | 1260 |
| cagaaagaca | agatggccga | ggcctacagc | gagatcggaa | tgaagggcga | gcgcagaaga | 1320 |
| ggcaagggcc | acgatggact | gtatcagggc | ctgagcacag | ccaccaagga | tacctatgat | 1380 |
| gccctgcaca | tgcaggccct | tccacctaga | cctggcgacg | aaatggaaga | gtgtagccag | 1440 |
| catctgcctg | cgccggatc | tagcggcgac | atcatggact | acaaggacga | cgacgataag | 1500 |
| ggcagctctg | gcacaggctc | tggctctgga | acatctgccc | ctatcacagc | ctacgctcag | 1560 |
| cagacaagag | gcctgctggg | ctgtatcatc | accagcctga | ccggcagaga | caagaaccag | 1620 |
| gttgagggcg | aagtgcagat | cgtgtctacc | gccacacaga | cctttctggc | cacctgtatc | 1680 |
| aatggcgtgt | gctgggccgt | ttatcacggc | gctggaacca | gaacaatcgc | ctctcctaag | 1740 |

-continued

```
ggccccgtga tccagatgta caccaacgtg gaccaggatc tcgttggctg gcctgctcct    1800
cagggaagca gaagcctgac accttgtacc tgtggcagca gcgatctgta cctggtcaca    1860
agacacgccg atgtgatccc tgtgcggaga agaggcgata gcagaggttc tctgctgtcc    1920
cctagaccta tcagctacct gaagggatct tctggcggcc ctctgctgtg tcctgctgga    1980
catgctgtgg gactgtttag agccgccgtg tgtacaagag gcgtggccaa ggctgtggac    2040
ttcatcccg tggaaaacct ggaaaccacc atgagaagcc ccgtgttcac cgacaatagc    2100
agccctccag ccgtgacact gacacacccc atcaccaaga tcgacaccaa gtacatcatg    2160
acctgcatga gcgccgacct ggaagtggtc acatctacct gggttctcgt tggaggcgtt    2220
ctggctgccc tggccgctta ttgtctgtct accggctgtg tggtcatcgt gggcagaatc    2280
gtgctgtccg gcaagcctgc catcattccc gatagagagg tgctgtactg a             2331
```

<210> SEQ ID NO 9
<211> LENGTH: 776
<212> TYPE: PRT
<213> ORGANISM: Artificial Sequence
<220> FEATURE:
<223> OTHER INFORMATION: Synthetic sequence

<400> SEQUENCE: 9

```
Ile Gln Met Thr Gln Thr Thr Ser Ser Leu Ser Ala Ser Leu Gly Asp
1               5                   10                  15

Arg Val Thr Ile Ser Cys Arg Ala Ser Gln Asp Ile Ser Lys Tyr Leu
            20                  25                  30

Asn Trp Tyr Gln Gln Lys Pro Asp Gly Thr Val Lys Leu Leu Ile Tyr
        35                  40                  45

His Thr Ser Arg Leu His Ser Gly Val Pro Ser Arg Phe Ser Gly Ser
    50                  55                  60

Gly Ser Gly Thr Asp Tyr Ser Leu Thr Ile Ser Asn Leu Glu Gln Glu
65                  70                  75                  80

Asp Ile Ala Thr Tyr Phe Cys Gln Gln Gly Asn Thr Leu Pro Tyr Thr
                85                  90                  95

Phe Gly Gly Gly Thr Lys Leu Glu Ile Thr Gly Ser Thr Ser Gly Ser
            100                 105                 110

Gly Lys Pro Gly Ser Gly Glu Gly Ser Thr Lys Gly Glu Val Lys Leu
        115                 120                 125

Gln Glu Ser Gly Pro Gly Leu Val Ala Pro Ser Gln Ser Leu Ser Val
    130                 135                 140

Thr Cys Thr Val Ser Gly Val Ser Leu Pro Asp Tyr Gly Val Ser Trp
145                 150                 155                 160

Ile Arg Gln Pro Pro Arg Lys Gly Leu Glu Trp Leu Gly Val Ile Trp
                165                 170                 175

Gly Ser Glu Thr Thr Tyr Tyr Asn Ser Ala Leu Lys Ser Arg Leu Thr
            180                 185                 190

Ile Ile Lys Asp Asn Ser Lys Ser Gln Val Phe Leu Lys Met Asn Ser
        195                 200                 205

Leu Gln Thr Asp Asp Thr Ala Ile Tyr Tyr Cys Ala Lys His Tyr Tyr
    210                 215                 220

Tyr Gly Gly Ser Tyr Ala Met Asp Tyr Trp Gly Gln Gly Thr Ser Val
225                 230                 235                 240

Thr Val Ser Ser Ala Ala Ala Thr Thr Thr Pro Ala Pro Arg Pro Pro
                245                 250                 255

Thr Pro Ala Pro Thr Ile Ala Ser Gln Pro Leu Ser Leu Arg Pro Glu
```

```
                260                 265                 270
Ala Cys Arg Pro Ala Gly Gly Ala Val His Thr Arg Gly Leu Asp
        275                 280                 285

Phe Ala Cys Asp Ile Tyr Ile Trp Ala Pro Leu Ala Gly Thr Cys Gly
        290                 295                 300

Val Leu Leu Leu Ser Leu Val Ile Thr Leu Tyr Cys Lys Arg Gly Arg
305                 310                 315                 320

Lys Lys Leu Leu Tyr Ile Phe Lys Gln Pro Phe Met Arg Pro Val Gln
                325                 330                 335

Thr Thr Gln Glu Glu Asp Gly Cys Ser Cys Arg Phe Pro Glu Glu Glu
                340                 345                 350

Glu Gly Gly Cys Glu Leu Arg Val Lys Phe Ser Arg Ser Ala Asp Ala
        355                 360                 365

Pro Ala Tyr Lys Gln Gly Gln Asn Gln Leu Tyr Asn Glu Leu Asn Leu
        370                 375                 380

Gly Arg Arg Glu Glu Tyr Asp Val Leu Asp Lys Arg Arg Gly Arg Asp
385                 390                 395                 400

Pro Glu Met Gly Gly Lys Pro Arg Arg Lys Asn Pro Gln Glu Gly Leu
                405                 410                 415

Tyr Asn Glu Leu Gln Lys Asp Lys Met Ala Glu Ala Tyr Ser Glu Ile
                420                 425                 430

Gly Met Lys Gly Glu Arg Arg Arg Gly Lys Gly His Asp Gly Leu Tyr
        435                 440                 445

Gln Gly Leu Ser Thr Ala Thr Lys Asp Thr Tyr Asp Ala Leu His Met
        450                 455                 460

Gln Ala Leu Pro Pro Arg Pro Gly Asp Glu Met Glu Glu Cys Ser Gln
465                 470                 475                 480

His Leu Pro Gly Ala Gly Ser Ser Gly Asp Ile Met Tyr Lys Asp
                485                 490                 495

Asp Asp Asp Lys Gly Ser Ser Gly Thr Gly Ser Gly Ser Gly Thr Ser
                500                 505                 510

Ala Pro Ile Thr Ala Tyr Ala Gln Gln Thr Arg Gly Leu Leu Gly Cys
                515                 520                 525

Ile Ile Thr Ser Leu Thr Gly Arg Asp Lys Asn Gln Val Glu Gly Glu
530                 535                 540

Val Gln Ile Val Ser Thr Ala Thr Gln Thr Phe Leu Ala Thr Cys Ile
545                 550                 555                 560

Asn Gly Val Cys Trp Ala Val Tyr His Gly Ala Gly Thr Arg Thr Ile
                565                 570                 575

Ala Ser Pro Lys Gly Pro Val Ile Gln Met Tyr Thr Asn Val Asp Gln
                580                 585                 590

Asp Leu Val Gly Trp Pro Ala Pro Gln Gly Ser Arg Ser Leu Thr Pro
                595                 600                 605

Cys Thr Cys Gly Ser Ser Asp Leu Tyr Leu Val Thr Arg His Ala Asp
        610                 615                 620

Val Ile Pro Val Arg Arg Arg Gly Asp Ser Arg Gly Ser Leu Leu Ser
625                 630                 635                 640

Pro Arg Pro Ile Ser Tyr Leu Lys Gly Ser Ser Gly Gly Pro Leu Leu
                645                 650                 655

Cys Pro Ala Gly His Ala Val Gly Leu Phe Arg Ala Ala Val Cys Thr
        660                 665                 670

Arg Gly Val Ala Lys Ala Val Asp Phe Ile Pro Val Glu Asn Leu Glu
        675                 680                 685
```

```
Thr Thr Met Arg Ser Pro Val Phe Thr Asp Asn Ser Ser Pro Pro Ala
        690                 695                 700
Val Thr Leu Thr His Pro Ile Thr Lys Ile Asp Thr Lys Tyr Ile Met
705                 710                 715                 720
Thr Cys Met Ser Ala Asp Leu Glu Val Val Thr Ser Thr Trp Val Leu
                725                 730                 735
Val Gly Gly Val Leu Ala Ala Leu Ala Ala Tyr Cys Leu Ser Thr Gly
            740                 745                 750
Cys Val Val Ile Val Gly Arg Ile Val Leu Ser Gly Lys Pro Ala Ile
        755                 760                 765
Ile Pro Asp Arg Glu Val Leu Tyr
        770                 775

<210> SEQ ID NO 10
<211> LENGTH: 2331
<212> TYPE: DNA
<213> ORGANISM: Artificial Sequence
<220> FEATURE:
<223> OTHER INFORMATION: Synthetic sequence

<400> SEQUENCE: 10
```

| | | | | |
|---|---|---|---|---|
| atccagatga | cccagaccac | cagcagcctg | agcgccagcc | tgggcgatag | agtgaccatc | 60 |
| agctgcagag | ccagccagga | catcagcaag | tacctgaact | ggtatcagca | gaaacccgac | 120 |
| ggcaccgtga | agctgctgat | ctaccacacc | agcagactgc | acagcggcgt | gcccagcaga | 180 |
| ttttctggca | gcggctccgg | caccgactac | agcctgacca | tctccaacct | ggaacaggaa | 240 |
| gatatcgcta | cctacttctg | tcagcaaggc | aacaccctgc | cctacacctt | cggcggaggc | 300 |
| accaagctgg | aaatcaccgg | cagcacaagc | ggcagcggca | gcctggatc | tggcgaggga | 360 |
| agcaccaagg | gcgaagtgaa | actgcaggaa | agcggccctg | gactggtggc | cccaagccag | 420 |
| tctctgagcg | tgacctgtac | cgtgtccggc | gtgtccctgc | ctgactatgg | cgtgtcctgg | 480 |
| atcagacagc | cccccagaaa | gggcctggaa | tggctgggag | tgatctgggg | cagcgagaca | 540 |
| acctactaca | acagcgccct | gaagtcccgg | ctgaccatca | tcaaggacaa | ctccaagagc | 600 |
| caggtgttcc | tgaagatgaa | cagcctgcag | accgacgaca | ccgccatcta | ctactgcgcc | 660 |
| aagcactact | actacggcgg | cagctacgct | atggactact | ggggccaggg | caccagcgtg | 720 |
| accgtgtcat | ctgcggccgc | aacaacaaca | ccagctccta | gacctccaac | tcctgctcct | 780 |
| acaatcgcca | gccagcctct | gtctctgagg | cctgaagctt | gtagacctgc | tgctggcgga | 840 |
| gccgtgcata | ccagaggact | ggatttcgcc | tgcgacatct | acatttgggc | ccctctggct | 900 |
| ggaacatgtg | gcgtgctgct | gctgtctctg | gtcatcaccc | tgtactgcaa | gcggggcaga | 960 |
| aagaagctgc | tgtacatctt | caagcagccc | ttcatgcggc | ccgtgcagac | cacacaagag | 1020 |
| gaagatggct | gctcctgcag | attccccgag | gaagaagaag | gcggctgcga | gctgagagtg | 1080 |
| aagttctcta | gatctgccga | cgctcccgcc | tacaagcagg | gccagaatca | gctgtacaac | 1140 |
| gagctgaacc | tggggagaag | agaagagtac | gacgtgctgg | ataagcggag | aggcagagat | 1200 |
| cctgagatgg | gcggcaagcc | cagacggaag | aatcctcaag | agggcctgta | taatgagctg | 1260 |
| cagaaagaca | agatggccga | ggcctacagc | gagatcggaa | tgaagggcga | gcgcagaaga | 1320 |
| ggcaagggcc | acgatggact | gtatcagggc | ctgagcacag | ccaccaagga | tacctatgat | 1380 |
| gccctgcaca | tgcaggccct | tccacctaga | cctggcgacg | aaatggaaga | gtgtagccag | 1440 |
| catctgcctg | gcgccggatc | tagcggcgac | atcatggact | acaaggacga | cgacgataag | 1500 |

```
ggcagctctg gcacaggctc tggctctgga acatctgccc ctatcacagc ctacgctcag    1560
cagacaagag gcctgctggg ctgtatcatc accagcctga ccggcagaga caagaaccag    1620
gttgagggcg aagtgcagat cgtgtctacc gccacacaga cctttctggc cacctgtatc    1680
aatggcgtgt gctgggccgt ttatcacggc gctggaacca aacaatcgc ctctcctaag    1740 ggccccgtga tccagatgta caccaacgtg gaccaggatc tcgttggctg gcctgctcct    1800
cagggaagca gaagcctgac acctgtacc tgtggcagca gcgatctgta cctggtcaca    1860
agacacgccg atgtgatccc tgtgcggaga gaggcgata gcagaggttc tctgctgtcc    1920
cctagaccta tcagctacct gaagggatct tctggcggcc ctctgctgtg tcctgctgga    1980
catgctgtgg gactgtttag agccgccgtg tgtacaagag gcgtggccaa ggctgtggac    2040
ttcatccccg tggaaaacct ggaaaccacc atgagaagcc ccgtgttcac cgacaatagc    2100
agccctccag ccgtgacact gacacacccc atcaccaaga tcgacaccaa gtacatcatg    2160
acctgcatga gcgccgacct ggaagtggtc acatctacct gggttctcgt tggaggcgtt    2220
ctggctgccc tggccgctta ttgtctgtct accggctgtg tggtcatcgt gggcagaatc    2280
gtgctgtccg gcaagcctgc catcattccc gatagagagg tgctgtactg a            2331

<210> SEQ ID NO 11
<211> LENGTH: 775
<212> TYPE: PRT
<213> ORGANISM: Artificial Sequence
<220> FEATURE:
<223> OTHER INFORMATION: Synthetic sequence

<400> SEQUENCE: 11

Ile Leu Leu Thr Gln Thr Pro Leu Ser Leu Pro Val Ser Leu Gly Asp
1               5                   10                  15

Gln Ala Ser Ile Ser Cys Arg Ser Ser Gln Ser Leu Val His Arg Asn
            20                  25                  30

Gly Asn Thr Tyr Leu His Trp Tyr Leu Gln Lys Pro Gly Gln Ser Pro
        35                  40                  45

Lys Leu Leu Ile His Lys Val Ser Asn Arg Phe Ser Gly Val Pro Asp
    50                  55                  60

Arg Phe Ser Gly Ser Gly Ser Gly Thr Asp Phe Thr Leu Lys Ile Ser
65                  70                  75                  80

Arg Val Glu Ala Glu Asp Leu Gly Val Tyr Phe Cys Ser Gln Ser Thr
                85                  90                  95

His Val Pro Pro Leu Thr Phe Gly Ala Gly Thr Lys Leu Glu Leu Lys
            100                 105                 110

Gly Ser Thr Ser Gly Ser Gly Lys Pro Gly Ser Gly Glu Gly Ser Thr
        115                 120                 125

Lys Gly Glu Val Lys Leu Gln Gln Ser Gly Pro Ser Leu Val Glu Pro
    130                 135                 140

Gly Ala Ser Val Met Ile Ser Cys Lys Ala Ser Gly Ser Ser Phe Thr
145                 150                 155                 160

Gly Tyr Asn Met Asn Trp Val Arg Gln Asn Ile Gly Lys Ser Leu Glu
                165                 170                 175

Trp Ile Gly Ala Ile Asp Pro Tyr Tyr Gly Gly Thr Ser Tyr Asn Gln
            180                 185                 190

Lys Phe Lys Gly Arg Ala Thr Leu Thr Val Asp Lys Ser Ser Ser Thr
        195                 200                 205

Ala Tyr Met His Leu Lys Ser Leu Thr Ser Glu Asp Ser Ala Val Tyr
    210                 215                 220
```

```
Tyr Cys Val Ser Gly Met Glu Tyr Trp Gly Gln Gly Thr Ser Val Thr
225                 230                 235                 240

Val Ser Ser Ala Ala Ala Thr Thr Thr Pro Ala Pro Arg Pro Pro Thr
            245                 250                 255

Pro Ala Pro Thr Ile Ala Ser Gln Pro Leu Ser Leu Arg Pro Glu Ala
            260                 265                 270

Cys Arg Pro Ala Ala Gly Gly Ala Val His Thr Arg Gly Leu Asp Phe
            275                 280                 285

Ala Cys Asp Ile Tyr Ile Trp Ala Pro Leu Ala Gly Thr Cys Gly Val
            290                 295                 300

Leu Leu Leu Ser Leu Val Ile Thr Leu Tyr Cys Lys Arg Gly Arg Lys
305                 310                 315                 320

Lys Leu Leu Tyr Ile Phe Lys Gln Pro Phe Met Arg Pro Val Gln Thr
                325                 330                 335

Thr Gln Glu Glu Asp Gly Cys Ser Cys Arg Phe Pro Glu Glu Glu Glu
            340                 345                 350

Gly Gly Cys Glu Leu Arg Val Lys Phe Ser Arg Ser Ala Asp Ala Pro
            355                 360                 365

Ala Tyr Lys Gln Gly Gln Asn Gln Leu Tyr Asn Glu Leu Asn Leu Gly
370                 375                 380

Arg Arg Glu Glu Tyr Asp Val Leu Asp Lys Arg Arg Gly Arg Asp Pro
385                 390                 395                 400

Glu Met Gly Gly Lys Pro Arg Arg Lys Asn Pro Gln Glu Gly Leu Tyr
                405                 410                 415

Asn Glu Leu Gln Lys Asp Lys Met Ala Glu Ala Tyr Ser Glu Ile Gly
            420                 425                 430

Met Lys Gly Glu Arg Arg Arg Gly Lys Gly His Asp Gly Leu Tyr Gln
            435                 440                 445

Gly Leu Ser Thr Ala Thr Lys Asp Thr Tyr Asp Ala Leu His Met Gln
450                 455                 460

Ala Leu Pro Pro Arg Pro Gly Asp Glu Met Glu Glu Cys Ser Gln His
465                 470                 475                 480

Leu Pro Gly Ala Gly Ser Ser Gly Asp Ile Met Asp Tyr Lys Asp Asp
                485                 490                 495

Asp Asp Lys Gly Ser Ser Gly Thr Gly Ser Gly Ser Gly Thr Ser Ala
            500                 505                 510

Pro Ile Thr Ala Tyr Ala Gln Gln Thr Arg Gly Leu Leu Gly Cys Ile
            515                 520                 525

Ile Thr Ser Leu Thr Gly Arg Asp Lys Asn Gln Val Glu Gly Glu Val
            530                 535                 540

Gln Ile Val Ser Thr Ala Thr Gln Thr Phe Leu Ala Thr Cys Ile Asn
545                 550                 555                 560

Gly Val Cys Trp Ala Val Tyr His Gly Ala Gly Thr Arg Thr Ile Ala
                565                 570                 575

Ser Pro Lys Gly Pro Val Ile Gln Met Tyr Thr Asn Val Asp Gln Asp
            580                 585                 590

Leu Val Gly Trp Pro Ala Pro Gln Gly Ser Arg Ser Leu Thr Pro Cys
            595                 600                 605

Thr Cys Gly Ser Ser Asp Leu Tyr Leu Val Thr Arg His Ala Asp Val
        610                 615                 620

Ile Pro Val Arg Arg Arg Gly Asp Ser Arg Gly Ser Leu Leu Ser Pro
625                 630                 635                 640
```

Arg Pro Ile Ser Tyr Leu Lys Gly Ser Ser Gly Pro Leu Leu Cys
                645                 650                 655

Pro Ala Gly His Ala Val Gly Leu Phe Arg Ala Val Cys Thr Arg
            660                 665                 670

Gly Val Ala Lys Ala Val Asp Phe Ile Pro Val Glu Asn Leu Glu Thr
        675                 680                 685

Thr Met Arg Ser Pro Val Phe Thr Asp Asn Ser Ser Pro Pro Ala Val
    690                 695                 700

Thr Leu Thr His Pro Ile Thr Lys Ile Asp Thr Lys Tyr Ile Met Thr
705                 710                 715                 720

Cys Met Ser Ala Asp Leu Glu Val Val Thr Ser Thr Trp Val Leu Val
                725                 730                 735

Gly Gly Val Leu Ala Ala Leu Ala Ala Tyr Cys Leu Ser Thr Gly Cys
            740                 745                 750

Val Val Ile Val Gly Arg Ile Val Leu Ser Gly Lys Pro Ala Ile Ile
        755                 760                 765

Pro Asp Arg Glu Val Leu Tyr
    770                 775

<210> SEQ ID NO 12
<211> LENGTH: 2328
<212> TYPE: DNA
<213> ORGANISM: Artificial Sequence
<220> FEATURE:
<223> OTHER INFORMATION: Synthetic sequence

<400> SEQUENCE: 12
atcctgctga cccagacccc tctgagcctg cctgtgtctc tgggcgatca ggccagcatc        60
agctgcagat ccagccagag cctggtgcac cggaacggca cacctacct gcactggtat        120 ctgcagaagc ccggccagag ccccaagctg ctgattcaca aggtgtccaa ccggttcagc        180
ggcgtgcccg acagattttc tggcagcggc tccggcaccg acttcaccct gaagatcagc        240
cgggtggaag ccgaggacct gggcgtgtac ttctgcagcc agtccaccca cgtgcccccc        300
ctgacatttg gcgccggaac aaaagctgga a ctgaagggca gcacaagcgg cagcggcaag       360
cctggatctg gcgagggaag caccaagggc gaagtgaagc tgcagcagag cggcccctct        420
ctggtggaac tggcgcctc tgtgatgatc tcctgcaagg ccagcggcag ctccttcacc        480
ggctacaaca tgaactgggt gcgccagaac atcggcaaga gcctggaatg gatcggcgcc        540
atcgacccct actacggcgg caccagctac aaccagaagt tcaagggcag agccaccctg        600
accgtggaca gagcagctc caccgcctac atgcacctga gtccctgac agcgaggac        660 agcgccgtgt actactgcgt gtccggcatg gaatactggg gccagggcac aagcgtgacc        720
gtgtcctctg cggccgcaac aacaacacca gctcctagac ctccaactcc tgctcctaca        780
atcgccagcc agcctctgtc tctgaggcct gaagcttgta gacctgctgc tggcggagcc        840
gtgcatacca aggactgga tttcgcctgc gacatctaca tttgggcccc tctggctgga        900
acatgtggcg tgctgctgct gtctctggtc atcaccctgt actgcaagcg gggcagaaag        960
aagctgctgt acatcttcaa gcagcccttc atgcggcccg tgcagaccac acaagaggaa        1020
gatggctgct cctgcagatt ccccgaggaa gaagaaggcg gctgcgagct gagagtgaag        1080
ttctctagat ctgccgacgc tcccgcctac aagcagggcc agaatcagct gtacaacgag        1140
ctgaacctgg ggagaagaga agagtacgac gtgctggata gcggagagg cagagatcct        1200 gagatgggcg gcaagcccag acggaagaat cctcaagagg gcctgtataa tgagctgcag        1260

```
aaagacaaga tggccgaggc ctacagcgag atcggaatga agggcgagcg cagaagaggc    1320
aagggccacg atggactgta tcagggcctg agcacagcca ccaaggatac ctatgatgcc    1380
ctgcacatgc aggcccttcc acctagacct ggcgacgaaa tggaagagtg tagccagcat    1440
ctgcctggcg ccggatctag cggcgacatc atggactaca aggacgacga cgataagggc    1500
agctctggca caggctctgg ctctggaaca tctgccccta tcacagccta cgctcagcag    1560
acaagaggcc tgctgggctg tatcatcacc agcctgaccg gcagagacaa gaaccaggtt    1620
gagggcgaag tgcagatcgt gtctaccgcc acacagacct ttctggccac ctgtatcaat    1680
ggcgtgtgct gggccgttta tcacggcgct ggaaccagaa caatcgcctc tcctaagggc    1740
cccgtgatcc agatgtacac caacgtggac caggatctcg ttggctggcc tgctcctcag    1800
ggaagcagaa gcctgacacc ttgtacctgt ggcagcagcg atctgtacct ggtcacaaga    1860
cacgccgatg tgatccctgt gcggagaaga ggcgatagca gaggttctct gctgtcccct    1920
agacctatca gctacctgaa gggatcttct ggcggccctc tgctgtgtcc tgctggacat    1980
gctgtgggac tgtttagagc cgccgtgtgt acaagagggc tggccaaggc tgtggacttc    2040
atccccgtgg aaaacctgga accaccatg agaagcccg tgttcaccga caatagcagc    2100
cctccagccg tgacactgac acaccccatc accaagatcg acaccaagta catcatgacc    2160
tgcatgagcg ccgacctgga agtggtcaca tctacctggg ttctcgttgg aggcgttctg    2220
gctgccctgg ccgcttattg tctgtctacc ggctgtgtgg tcatcgtggg cagaatcgtg    2280
ctgtccggca agcctgccat cattcccgat agagaggtgc tgtactga              2328
```

<210> SEQ ID NO 13
<211> LENGTH: 768
<212> TYPE: PRT
<213> ORGANISM: Artificial Sequence
<220> FEATURE:
<223> OTHER INFORMATION: Synthetic sequence

<400> SEQUENCE: 13

```
Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
            20                  25                  30

Ser Ala Ala Trp Asn Trp Ile Arg Gln Ser Pro Ser Arg Gly Leu Glu
        35                  40                  45

Trp Leu Gly Arg Thr Tyr Tyr Arg Ser Lys Trp Tyr Asn Asp Tyr Ala
    50                  55                  60

Val Ser Val Lys Ser Arg Ile Thr Ile Asn Pro Asp Thr Ser Lys Asn
65                  70                  75                  80

Gln Phe Ser Leu Gln Leu Asn Ser Val Thr Pro Glu Asp Thr Ala Val
                85                  90                  95

Tyr Tyr Cys Ala Arg Glu Val Thr Gly Asp Leu Glu Asp Ala Phe Asp
            100                 105                 110

Ile Trp Gly Gln Gly Thr Met Val Thr Val Ser Ser Gly Gly Gly Gly
        115                 120                 125

Ser Asp Ile Gln Met Thr Gln Ser Pro Ser Ser Leu Ser Ala Ser Val
    130                 135                 140

Gly Asp Arg Val Thr Ile Thr Cys Arg Ala Ser Gln Thr Ile Trp Ser
145                 150                 155                 160

Tyr Leu Asn Trp Tyr Gln Gln Arg Pro Gly Lys Ala Pro Asn Leu Leu
                165                 170                 175
```

```
Ile Tyr Ala Ala Ser Ser Leu Gln Ser Gly Val Pro Ser Arg Phe Ser
            180                 185                 190

Gly Arg Gly Ser Gly Thr Asp Phe Thr Leu Thr Ile Ser Ser Leu Gln
        195                 200                 205

Ala Glu Asp Phe Ala Thr Tyr Tyr Cys Gln Gln Ser Tyr Ser Ile Pro
    210                 215                 220

Gln Thr Phe Gly Gln Gly Thr Lys Leu Glu Ile Lys Ala Ala Ala Thr
225                 230                 235                 240

Thr Thr Pro Ala Pro Arg Pro Pro Thr Pro Ala Pro Thr Ile Ala Ser
                245                 250                 255

Gln Pro Leu Ser Leu Arg Pro Glu Ala Cys Arg Pro Ala Ala Gly Gly
            260                 265                 270

Ala Val His Thr Arg Gly Leu Asp Phe Ala Cys Asp Ile Tyr Ile Trp
        275                 280                 285

Ala Pro Leu Ala Gly Thr Cys Gly Val Leu Leu Leu Ser Leu Val Ile
    290                 295                 300

Thr Leu Tyr Cys Lys Arg Gly Arg Lys Lys Leu Leu Tyr Ile Phe Lys
305                 310                 315                 320

Gln Pro Phe Met Arg Pro Val Gln Thr Thr Gln Glu Glu Asp Gly Cys
                325                 330                 335

Ser Cys Arg Phe Pro Glu Glu Glu Gly Gly Cys Glu Leu Arg Val
            340                 345                 350

Lys Phe Ser Arg Ser Ala Asp Ala Pro Ala Tyr Lys Gln Gly Gln Asn
        355                 360                 365

Gln Leu Tyr Asn Glu Leu Asn Leu Gly Arg Arg Glu Glu Tyr Asp Val
    370                 375                 380

Leu Asp Lys Arg Arg Gly Arg Asp Pro Glu Met Gly Gly Lys Pro Arg
385                 390                 395                 400

Arg Lys Asn Pro Gln Glu Gly Leu Tyr Asn Glu Leu Gln Lys Asp Lys
                405                 410                 415

Met Ala Glu Ala Tyr Ser Glu Ile Gly Met Lys Gly Glu Arg Arg Arg
            420                 425                 430

Gly Lys Gly His Asp Gly Leu Tyr Gln Gly Leu Ser Thr Ala Thr Lys
        435                 440                 445

Asp Thr Tyr Asp Ala Leu His Met Gln Ala Leu Pro Pro Arg Pro Gly
    450                 455                 460

Asp Glu Met Glu Glu Cys Ser Gln His Leu Pro Gly Ala Gly Ser Ser
465                 470                 475                 480

Gly Asp Ile Met Asp Tyr Lys Asp Asp Asp Lys Gly Ser Ser Gly
                485                 490                 495

Thr Gly Ser Gly Ser Gly Thr Ser Ala Pro Ile Thr Ala Tyr Ala Gln
        500                 505                 510

Gln Thr Arg Gly Leu Leu Gly Cys Ile Ile Thr Ser Leu Thr Gly Arg
    515                 520                 525

Asp Lys Asn Gln Val Glu Gly Glu Val Gln Ile Val Ser Thr Ala Thr
530                 535                 540

Gln Thr Phe Leu Ala Thr Cys Ile Asn Gly Val Cys Trp Ala Val Tyr
545                 550                 555                 560

His Gly Ala Gly Thr Arg Thr Ile Ala Ser Pro Lys Gly Pro Val Ile
                565                 570                 575

Gln Met Tyr Thr Asn Val Asp Gln Asp Leu Val Gly Trp Pro Ala Pro
            580                 585                 590

Gln Gly Ser Arg Ser Leu Thr Pro Cys Thr Cys Gly Ser Ser Asp Leu
```

```
                   595                 600                 605
Tyr Leu Val Thr Arg His Ala Asp Val Ile Pro Val Arg Arg Gly
    610                 615                 620
Asp Ser Arg Gly Ser Leu Leu Ser Pro Arg Pro Ile Ser Tyr Leu Lys
625                 630                 635                 640
Gly Ser Ser Gly Gly Pro Leu Leu Cys Pro Ala Gly His Ala Val Gly
                    645                 650                 655
Leu Phe Arg Ala Ala Val Cys Thr Arg Gly Val Ala Lys Ala Val Asp
                660                 665                 670
Phe Ile Pro Val Glu Asn Leu Glu Thr Thr Met Arg Ser Pro Val Phe
            675                 680                 685
Thr Asp Asn Ser Ser Pro Pro Ala Val Thr Leu Thr His Pro Ile Thr
        690                 695                 700
Lys Ile Asp Thr Lys Tyr Ile Met Thr Cys Met Ser Ala Asp Leu Glu
705                 710                 715                 720
Val Val Thr Ser Thr Trp Val Leu Val Gly Gly Val Leu Ala Ala Leu
                    725                 730                 735
Ala Ala Tyr Cys Leu Ser Thr Gly Cys Val Val Ile Val Gly Arg Ile
                740                 745                 750
Val Leu Ser Gly Lys Pro Ala Ile Ile Pro Asp Arg Glu Val Leu Tyr
            755                 760                 765
```

<210> SEQ ID NO 14
<211> LENGTH: 2307
<212> TYPE: DNA
<213> ORGANISM: Artificial Sequence
<220> FEATURE:
<223> OTHER INFORMATION: Synthetic sequence

<400> SEQUENCE: 14

```
caggtgcagc tgcagcagtc tggccctggc ctcgtgaagc ctagccagac cctgagcctg      60
acctgtgcca tcagcggcga tagcgtgtcc agcaatagcg ccgcctggaa ctggatcaga     120
cagagcccta gcagaggcct ggaatggctg gccggaccta ctaccggtca agtggtac      180
aacgactacg ccgtgtccgt gaagtcccgg atcaccatca cccccgacac cagcaagaac     240
cagttctccc tgcagctgaa cagcgtgacc cccgaggata ccgccgtgta ctactgcgcc     300
agagaagtga ccgcgacct ggaagatgcc ttcgacatct ggggccaggg cacaatggtc      360
accgtgtcta gcggaggcgg cggaagcgac atccagatga cacagagccc agctccctg      420
agcgccagcg tgggagacag agtgaccatc acctgtcggg ccagcagac catctggtcc      480
tacctgaact ggtatcagca gcggcctggc aaggccccca acctgctgat ctatgccgcc     540
agctcactgc agagcggcgt gcccagcaga ttttccggca gaggcagcgg caccgacttc     600
accctgacaa tcagttccct gcaggccgag gacttcgcca ctactactg ccagcagagc      660
tacagcatcc cccagacctt cggccagggg accaagctgg aaatcaaagc ggccgcaaca     720
acaacaccag ctcctagacc tccaactcct gctcctacaa tcgccagcca gcctctgtct     780
ctgaggcctg aagcttgtag acctgctgct ggcggagccg tgcataccag aggactggat     840
ttcgcctgcg acatctacat ttgggcccct tggctggaa catgtggcgt gctgctgctg     900
tctctggtca tcaccctgta ctgcaagcgg ggcagaaaga agctgctgta catcttcaag     960
cagcccttca tgcggcccgt gcagaccaca caagaggaag atggctgctc ctgcagattc    1020
cccgaggaag aagaaggcgg ctgcgagctg agagtgaagt ctctctagatc tgccgacgct    1080
cccgcctaca gcagggcca gaatcagctg tacaacgagc tgaacctggg gagaagagaa     1140
```

```
gagtacgacg tgctggataa gcggagaggc agagatcctg agatgggcgg caagcccaga      1200
cggaagaatc ctcaagaggg cctgtataat gagctgcaga aagacaagat ggccgaggcc      1260
tacagcgaga tcggaatgaa gggcgagcgc agaagaggca agggccacga tggactgtat      1320
cagggcctga gcacagccac caaggatacc tatgatgccc tgcacatgca ggcccttcca      1380
cctagacctg gcgacgaaat ggaagagtgt agccagcatc tgcctggcgc cggatctagc      1440
ggcgacatca tggactacaa ggacgacgac gataagggca gctctggcac aggctctggc      1500
tctggaacat ctgccctat cacagcctac gctcagcaga caagaggcct gctgggctgt       1560
atcatcacca gcctgaccgg cagagacaag aaccaggttg agggcgaagt gcagatcgtg      1620
tctaccgcca cacagacctt tctggccacc tgtatcaatg gcgtgtgctg ggccgtttat      1680
cacggcgctg gaaccagaac aatcgcctct cctaagggcc ccgtgatcca gatgtacacc      1740
aacgtggacc aggatctcgt tggctggcct gctcctcagg gaagcagaag cctgacacct      1800
tgtacctgtg gcagcagcga tctgtacctg gtcacaagac acgccgatgt gatccctgtg      1860
cggagaagag gcgatagcag aggttctctg ctgtcccta gacctatcag ctacctgaag       1920
ggatcttctg gcggccctct gctgtgtcct gctggacatg ctgtgggact gtttagagcc      1980
gccgtgtgta caagaggcgt ggccaaggct gtggacttca tccccgtgga aaacctggaa      2040
accaccatga gaagccccgt gttcaccgac aatagcagcc ctccagccgt gacactgaca      2100 cacccatca ccaagatcga caccaagtac atcatgacct gcatgagcgc cgacctggaa       2160
gtggtcacat ctacctgggt tctcgttgga ggcgttctgg ctgccctggc cgcttattgt      2220
ctgtctaccg gctgtgtggt catcgtgggc agaatcgtgc tgtccggcaa gcctgccatc      2280
attcccgata gagaggtgct gtactga                                          2307
```

US 12,473,344 B2

CHIMERIC ANTIGEN RECEPTOR POLYPEPTIDES AND METHODS OF USING SAME

CROSS-REFERENCE TO RELATED APPLICATIONS

This application claims the benefit of U.S. Provisional Patent Application No. 62/694,830, filed Jul. 6, 2018, which application is incorporated herein by reference in its entirety.

INTRODUCTION

Engineering cells such as T cells, stem cells or other cellular components of tissues provides the potential to cure numerous diseases. Engineering T cells with chimeric antigen receptors (CARs) has already demonstrated impressive clinical efficacy and additional applications using engineered CARs in the context of cell therapy holds great promise. There are, however, substantial risks associated with unregulated CAR expression.

The constant antigenic burden during chronic viral infections, cancer, and the like, causes CD8$^+$ T cells to develop a state of dysfunction often referred to as T cell exhaustion, characterized by a loss of some effector functions and up-regulation of multiple inhibitory receptors. The result is a population of antigen-specific CD8$^+$ T cells that are unable to successfully clear or stabilize an infection or tumor. However, exhausted CD8$^+$ T cells ($T_{EX}$) do retain some functionality. Blockade of inhibitory receptors such as programmed death 1 (PD-1), cytotoxic T-lymphocyte associated protein 4 (CTLA-4), Tim-3, and T-cell immunoreceptor with Ig and ITIM domains (TIGIT) has been used to reinvigorate $T_{EX}$ in order to combat cancer and viral infections in vitro and in clinical studies. In mice, the use of anti-PD-L1 blocking antibodies has been shown to restore CD8$^+$ T cell function against multiple epitopes during chronic lymphocytic choriomeningitis virus (LCMV) clone 13 infection. Barber et al. (2006) *Nature* 439:682-7. Clinical studies with therapeutic blockade of inhibitory receptor pathways (e.g., PD-1/PD-L1) in the field of human cancer research have rapidly resulted in several drugs approved by the FDA. Engineered T cells, such as T cells expressing chimeric antigen receptors (CARs), are another approach to combat malignancies. However, CAR-T cells also develop exhaustion, e.g., from tonic signaling or persistent antigen stimulation. Although advances have been made, patients do not respond equally to inhibitory receptor blockade therapy and the durability of the responses vary widely.

SUMMARY

Provided are polypeptides that include, from N-terminus to C-terminus, a chimeric antigen receptor (CAR), a protease, and a degron, where the polypeptide further includes a cleavage site for the protease disposed between the CAR and the degron. Also provided are cells that include such polypeptides (e.g., where the cells express the CAR on their surface) and pharmaceutical compositions including such cells. Nucleic acids that encode the polypeptides, cells including such nucleic acids, and pharmaceutical compositions including such cells, are also provided. Also provided are methods for controlling the expression of a CAR on the surface of a cell, and methods of using the cells of the present disclosure, including methods of using such cells to administer a regulatable CAR cell-based therapy (e.g., a regulatable CAR T cell therapy) to an individual.

DETAILED DESCRIPTION

Figure 1:
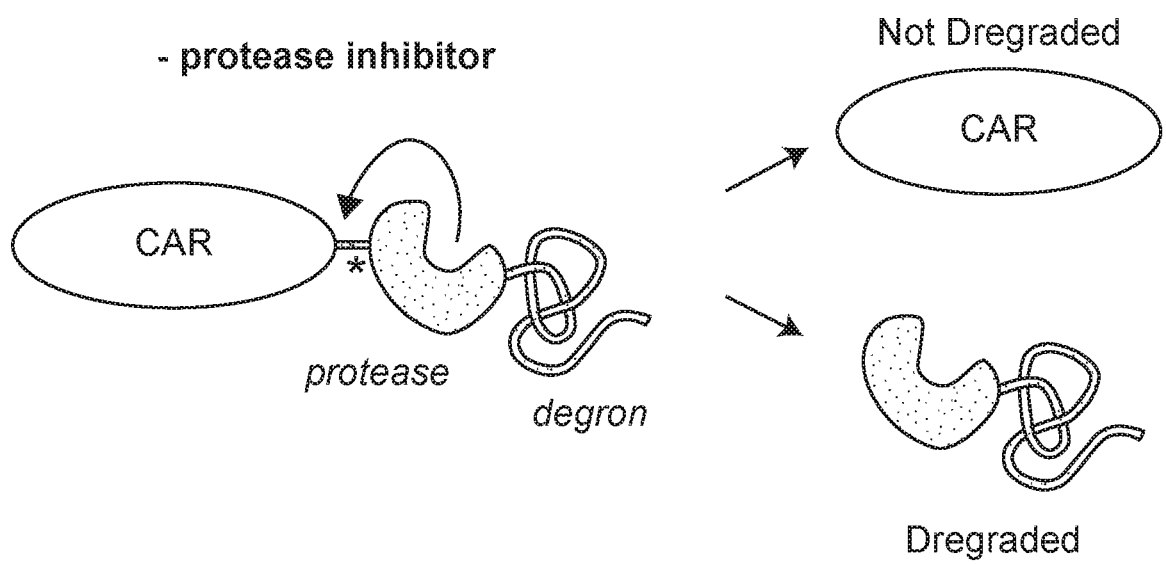
FIG. 1 Schematic illustration of a polypeptide according to an example embodiment of the present disclosure. Shown is a polypeptide that includes a CAR, a protease, a degron, and a cleavage site (indicated by an asterisk) for the protease, where the cleavage site is disposed between the CAR and the degron. The cleavage site, protease, and degron may be collectively referred to herein as a Small Molecule-Assisted Shutoff (SMASh) tag. Panel A: In the absence of a protease inhibitor, the protease cleaves the cleavage site such that the CAR is separated from the degron and therefore not degraded. When expressed in a cell in the absence of the protease inhibitor, the CAR construct is expressed on the surface of the cell. Panel B: In the presence of an inhibitor of the protease, the CAR remains linked to the degron and, accordingly, is degraded.
Figure 1:
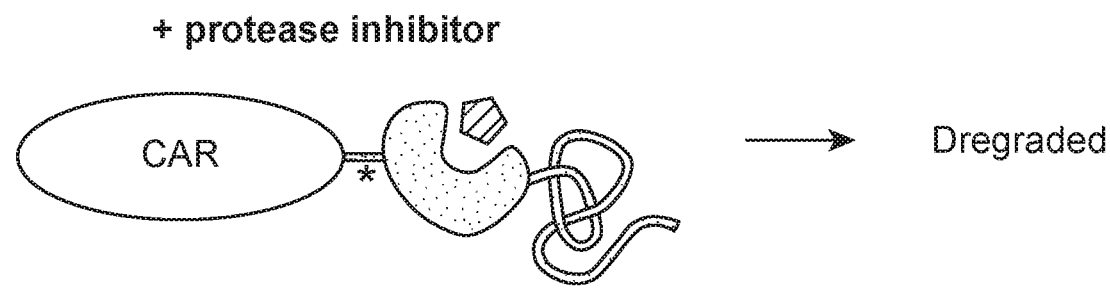

Provided are polypeptides that include, from N-terminus to C-terminus, a chimeric antigen receptor (CAR), a protease, and a degron, where the polypeptide further includes a cleavage site for the protease disposed between the CAR and the degron. Also provided are cells that include such polypeptides (e.g., where the cells express the CAR on their surface) and pharmaceutical compositions including such cells. Nucleic acids that encode the polypeptides, cells including such nucleic acids, and pharmaceutical compositions including such cells, are also provided. Also provided are methods for controlling the expression of a CAR on the surface of a cell, and methods of using the cells of the present disclosure, including methods of using such cells to administer a regulatable CAR cell-based therapy (e.g., a regulatable CAR T cell therapy) to an individual.

Before the polypeptides, nucleic acids, cells, compositions and methods of the present disclosure are described in greater detail, it is to be understood that the polypeptides, nucleic acids, cells, compositions and methods are not limited to particular embodiments described, as such may, of course, vary. It is also to be understood that the terminology used herein is for the purpose of describing particular embodiments only, and is not intended to be limiting, since the scope of the polypeptides, nucleic acids, cells, compositions and methods will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the polypeptides, nucleic acids, cells, compositions and methods. The upper and lower limits of these smaller ranges may independently be included in the smaller ranges, subject to any specifically excluded limit in the stated range. Where the stated range includes one or both of the limits, ranges excluding either or both of those included limits are also included in the polypeptides, nucleic acids, cells, compositions and methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the polypeptides, nucleic acids, cells, compositions and methods belong. Although any polypeptides, nucleic acids, cells, compositions and methods similar or equivalent to those described herein can also be used in the practice or testing of the polypeptides, nucleic acids, cells, compositions and methods, representative illustrative polypeptides, nucleic acids, cells, compositions and methods are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present polypeptides, nucleic acids, cells, compositions and methods are not entitled to antedate such publication, as the date of publication provided may be different from the actual publication date which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the polypeptides, nucleic acids, cells, compositions and methods, which are, for clarity, described in the context of separate embodiments, may also be provided in combination in a single embodiment. Conversely, various features of the polypeptides, nucleic acids, cells, compositions and methods, which are, for brevity, described in the context of a single embodiment, may also be provided separately or in any suitable sub-combination. All combinations of the embodiments are specifically embraced by the present disclosure and are disclosed herein just as if each and every combination was individually and explicitly disclosed, to the extent that such combinations embrace operable processes and/or compositions. In addition, all sub-combinations listed in the embodiments describing such variables are also specifically embraced by the present polypeptides, nucleic acids, cells, compositions and methods and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

Polypeptides and Nucleic Acids

As summarized above, aspects of the present disclosure include polypeptides. The polypeptides include, from N-terminus to C-terminus, a chimeric antigen receptor (CAR), a protease, and a degron, where the polypeptide further includes a cleavage site for the protease disposed between the CAR and the degron. The SMASh concept in the context of the present disclosure is schematically illustrated in FIG. 1. The CAR is linked to a protease (e.g., a protease derived from hepatitis C virus (HCV) nonstructural protein 3 (NS3)) via a linker including a cleavage site for the protease (e.g., a HCV NS3 protease recognition site). In this example, the polypeptide includes a degron on the opposite side of the protease and cleavage site relative to the CAR. As shown in FIG. 1, panel A, upon expression and protein folding, the SMASh tag is removed from the CAR by its internal protease activity in the absence of an inhibitor of the protease, and is trafficked to the cell's protein degradation machinery by the degron. In the absence of an inhibitor of the protease, therefore, the CAR is expressed on the surface of the cell expressing the polypeptide. As shown in FIG. 1, panel B, addition of an inhibitor of the protease induces the rapid degradation of subsequently synthesized copies of the CAR, effectively shutting off further production of the CAR. Details regarding the subject polypeptides and components thereof will now be described in detail.

Figure 3:
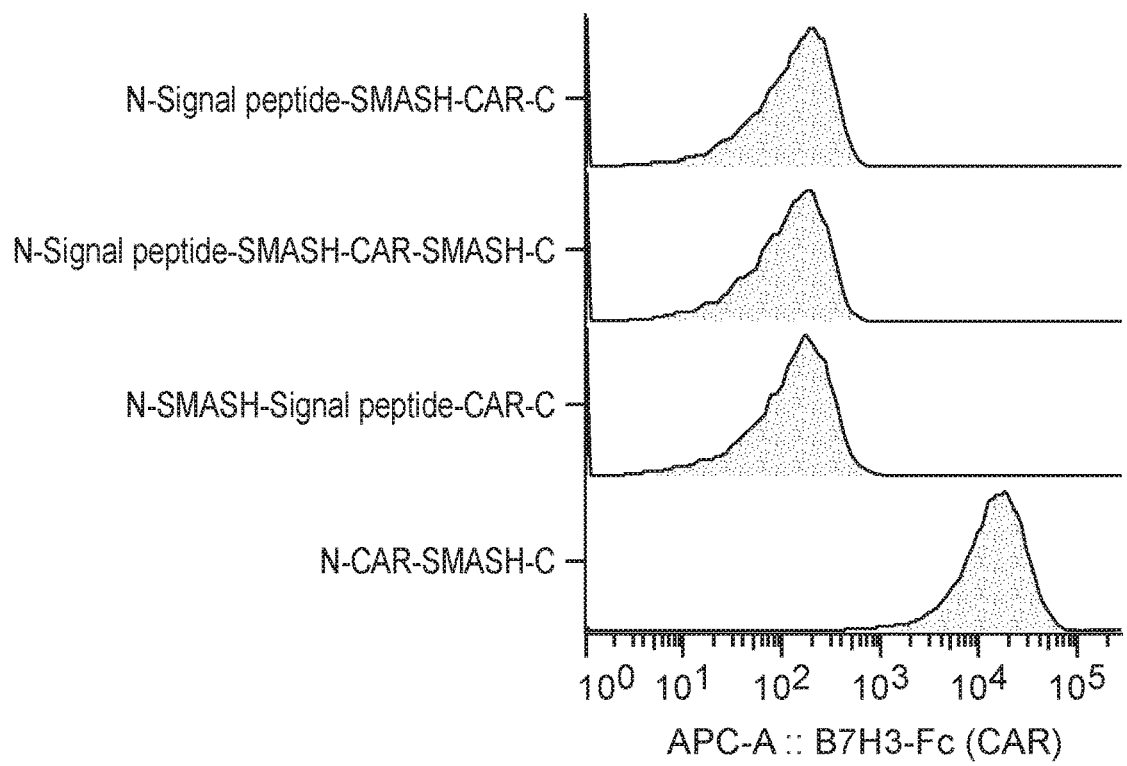
FIG. 3 Flow cytometry plot showing CAR expression of B7H3 CAR constructs with a SMASh tag integrated at various positions in the CAR. All constructs with N-terminal SMASh domains were not expressed on the T cell surface, while constructs with a C-terminal SMASh domain were expressed at high levels.

A "polypeptide" of the present disclosure is a single continuous chain of amino acids that includes a selected CAR of interest, a protease, a degron, and a cleavage site for the protease, which chain does not occur in nature. The degron is connected to the CAR of interest through a cleavage site (e.g., a cleavable linker including a cleavage site) capable of being recognized by the protease of the polypeptide to allow self-removal of the degron (and optionally, the protease depending on the position of the cleavage site) from the CAR of interest. The position of the cleavage site in the polypeptide may be chosen to allow release of the CAR of interest from the polypeptide essentially unmodified or with little modification, e.g., 20 or fewer, 15 or fewer, 10 or fewer, or 5 or fewer extra amino acids. The CAR is N-terminal to the degron. In some embodiments, the degron is located at the C-terminus of the polypeptide. In some embodiments, the polypeptide may be represented by the formula $NH_2$—X—C—P-D-COOH, where: X is an amino acid sequence of the CAR of interest; C is an amino acid sequence of the cleavage site for the protease; P is an amino acid sequence of the protease; and D is an amino acid sequence of the degron. The inventors surprisingly found that only when the SMASh tag is C-terminal to the CAR could the CAR be expressed at acceptable levels on the cell surface (FIG. 3). In some embodiments, the cleavage site is between the CAR and the protease. In certain aspects, the cleavage site is between the protease and the degron.

The CAR, cleavage site, protease and degron constitute domains of the polypeptide which are operably linked to one another. The domains may be contiguous (that is, immediately adjacent one another), or two or more domains may be linked by one or more linkers, spacers, and/or the like.

Figure 22:
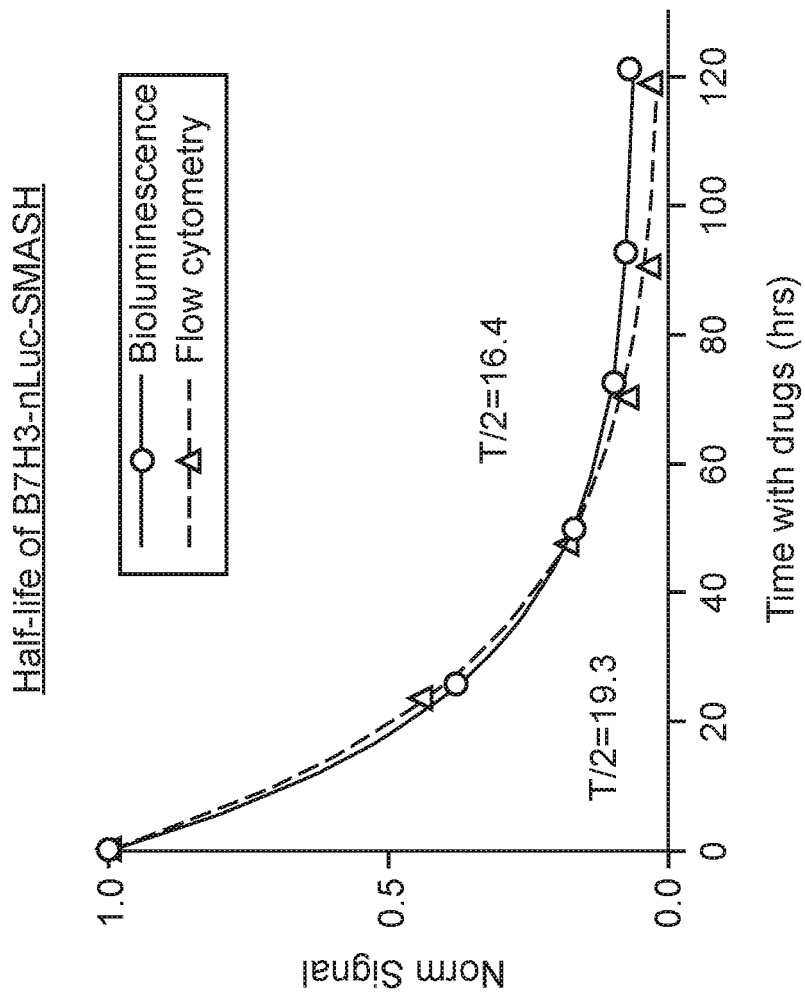
FIG. 22 Graph showing the expression of B7H3 CAR-nanoluciferase-SMASh on T cells in the presence of 3 µM grazoprevir for various amounts of time, as determined by flow cytometry or bioluminescence. Nanoluciferase bioluminescence serves as a reporter for CAR expression, which can facilitate CAR tracking in vivo.
Figure 22:
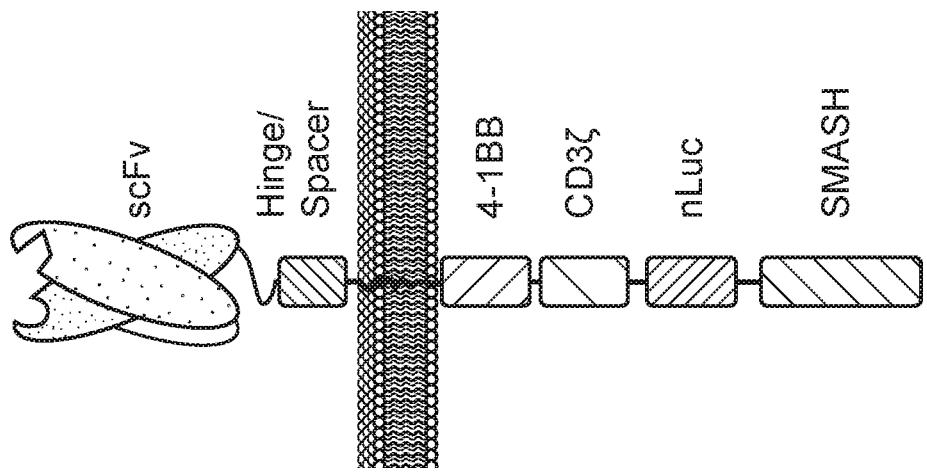
Figure 23:
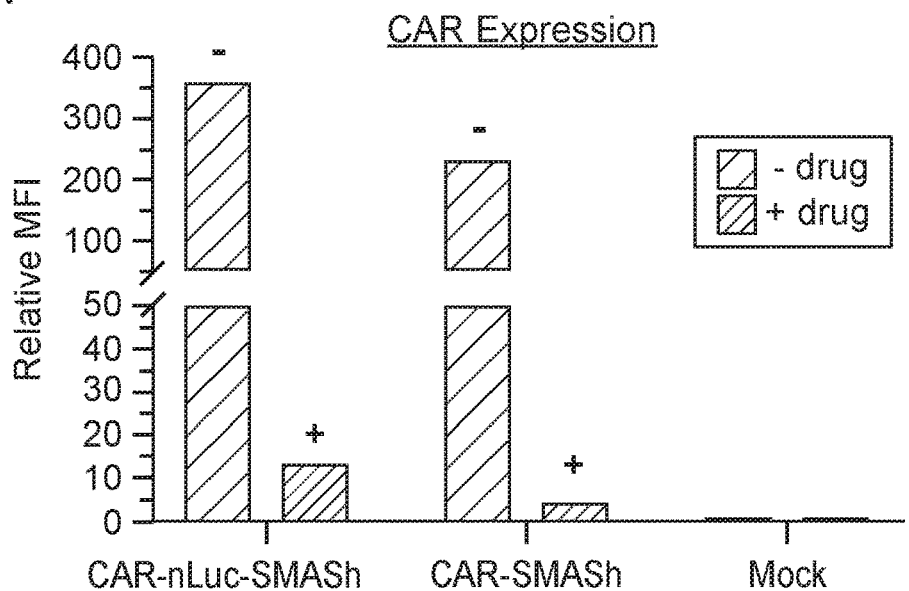
FIG. 23 Panel A: Graph showing MFIs of T cells expressing B7H3 CAR-SMASh vs B7H3 CAR-nLuc-SMASh in the presence or absence of 3 µM grazoprevir. Inclusion of a nanoluciferase domain reduces the residual expression of CAR in the presence of drug. Panel B: Graph showing the MFIs of T cells expressing these constructs after incubation with 3 µM grazoprevir for various amounts of time. The reduced half-life of CAR-nLuc-SMASh results in a faster drug response time relative to CAR-SMASh.
Figure 23:
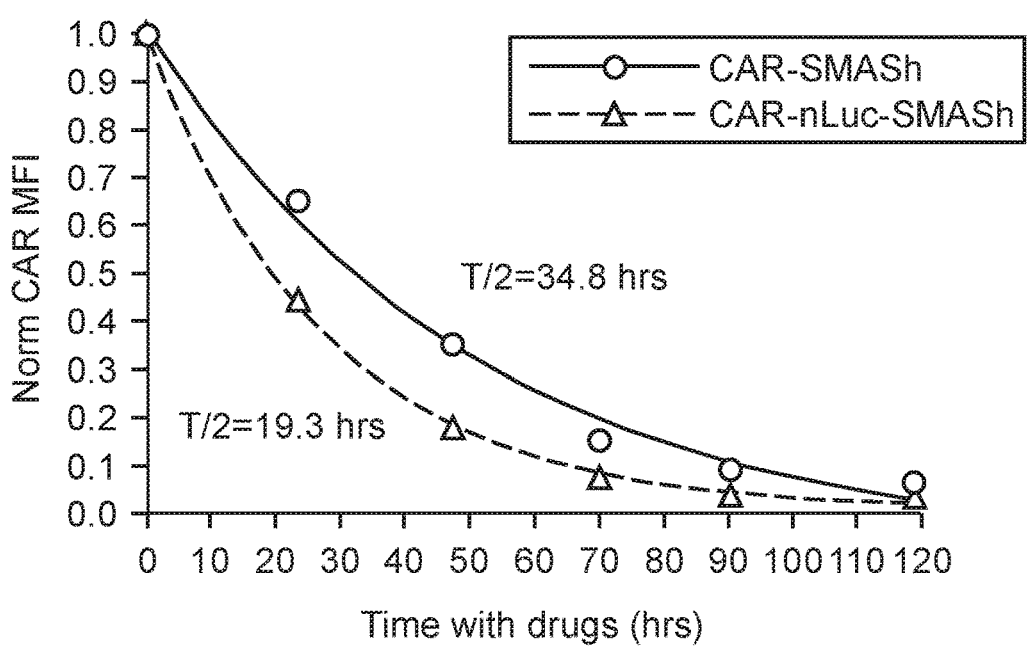

The polypeptide may include domains in addition to the CAR, cleavage site, protease, and degron. For example, the polypeptide may include a spacer domain between the CAR and the cleavage site. The inventors surprisingly found that such a spacer domain may decrease the response time of the polypeptide to an inhibitor of the protease. See, e.g., FIG. 22 and FIG. 23. A spacer domain may be positioned between the CAR and the cleavage site, where the protease is on the opposite side of the cleavage site from the CAR (e.g., $NH_2$—X—S—C—P-D-COOH, where X is an amino acid sequence of the CAR of interest; S is an amino acid sequence of a spacer; C is an amino acid sequence of the cleavage site for the protease; P is an amino acid sequence of the protease; and D is an amino acid sequence of the degron). In such a configuration, upon cleavage at the cleavage site by the protease, the spacer domain remains attached to the C-terminus of the CAR. In other aspects, a spacer domain is positioned between the CAR and the cleavage site, where the protease is on the same side of the cleavage site as the CAR (e.g., $NH_2$—X—S—P—C-D-COOH, where X is an amino acid sequence of the CAR of interest; S is the amino acid sequence of a spacer; P is an amino acid sequence of the protease; C is an amino acid sequence of the cleavage site for the protease; and D is an amino acid sequence of the degron). In such a configuration, upon cleavage at the cleavage site by the protease, the spacer domain and protease remain attached to the C-terminus of the CAR. In some embodiments, the spacer domain includes a linker, a reporter, or a combination thereof. Non-limiting examples of reporters are bioluminescence reporters. For example, the reporter may be a luciferase, e.g., a nanoluciferase. A polypeptide of the present disclosure may include one or more domains useful for purification (e.g., a purification tag, such as a FLAG tag, HIS tag, and/or the like), a localization sequence, a domain useful for detecting/imaging the CAR (e.g., a luciferase or other proteinaceous element that enables detection/imaging of the CAR directly or indirectly), and/or the like. The various domains of the subject polypeptides are operably linked to one another, meaning that such domains are linked to one another and retain their respective functions, e.g., protease function of the protease, etc.

The antigen-binding (e.g., antibody) portion of the CAR may specifically bind to the antigen (e.g., a cell surface antigen, such as an antigen on the surface of a cancer cell). The antigen-binding (e.g., antibody) portion of the CAR "specifically binds" to the antigen if it binds to or associates with the antigen with an affinity or $K_a$ (that is, an equilibrium association constant of a particular binding interaction with units of 1/M) of, for example, greater than or equal to about $10^5$ $M^{-1}$. In certain embodiments, the antigen-binding (e.g., antibody) portion of the CAR binds to an antigen with a $K_a$ greater than or equal to about $10^6$ $M^{-1}$, $10^7$ $M^{-1}$, $10^8$ $M^{-1}$, $10^9$ $M^{-1}$, $10^{10}$ $M^{-1}$, $10^{11}$ $M^{-1}$, $10^{12}$ $M^{-1}$, or $10^{13}$ $M^{-1}$. "High affinity" binding refers to binding with a $K_a$ of at least $10^7$ $M^{-1}$, at least $10^8$ $M^{-1}$, at least $10^9$ $M^{-1}$, at least $10^{10}M^{-1}$, at least $10^{11}$ $M^{-1}$, at least $10^{12}$ $M^{-1}$, at least $10^{13}$ $M^{-1}$, or greater. Alternatively, affinity may be defined as an equilibrium dissociation constant ($K_D$) of a particular binding interaction with units of M (e.g., $10^{-5}$ M to $10^{-13}$ M, or less). In certain aspects, specific binding means the antigen-binding (e.g., antibody) portion of the CAR binds to the target molecule with a $K_D$ of less than or equal to about $10^{-5}$ M, less than or equal to about $10^{-6}$ M, less than or equal to about $10^{-7}$ M, less than or equal to about $10^{-8}$ M, or less than or equal to about $10^{-9}$ M, $10^{-10}$ M, $10^{-11}$ M, or $10^{-12}$ M or less. The binding affinity of the antigen-binding (e.g., antibody) portion of the CAR for the target antigen can be readily determined using conventional techniques, e.g., by competitive ELISA (enzyme-linked immunosorbent assay), equilibrium dialysis, by using surface plasmon resonance (SPR) technology (e.g., the BIAcore 2000 instrument, using general procedures outlined by the manufacturer); by radioimmunoassay; or the like.

The CAR includes an antigen-binding portion that binds to a target antigen of interest, e.g., a particular antigen on the surface of a target cell. Non-limiting examples of an antigen-binding portion that may be included in the CAR include an antibody, a receptor (e.g., a variable lymphocyte receptor), a receptor fragment (e.g., an Fc receptor fragment), a ligand, a cytokine, a DARPin, an adnectin, a nanobody, and a peptide. Suitable antigen-binding portions include those described in Labanieh et al. (2018) *Nature Biomedical Engineering* 2:377-391, the disclosure of which is incorporated herein by reference in its entirety for all purposes.

In certain aspects, the antibody portion of the CAR is an antibody. In some embodiments, the antibody is a single-chain antibody. According to certain embodiments, the single-chain antibody is a single-chain variable fragment (scFv). The single-chain antibody may be a monoclonal antibody, a chimeric antibody, a humanized antibody, a fully human antibody, and/or the like. In certain aspects, the antibody portion of the CAR is an antibody approved by the United States Food and Drug Administration and/or the European Medicines Agency (EMA) for use as a therapeutic antibody (e.g., for antibody-dependent cellular cytotoxicity (ADCC), etc.), or a fragment thereof (e.g., a single-chain version of such an antibody, such as an scFv version of the antibody) that retains the ability to bind the target molecule.

In certain aspects, the antigen-binding portion of the CAR specifically binds a molecule on the surface of a target cell. The target cell may be any cell type of interest. For example, the target cell may be a genetically and/or phenotypically normal cell. In other aspects, the target cell is a genetically and/or phenotypically abnormal cell. Abnormal cells of interest include, but are not limited to, cancer cells. By "cancer cell" is meant a cell exhibiting a neoplastic cellular phenotype, which may be characterized by one or more of, for example, abnormal cell growth, abnormal cellular proliferation, loss of density dependent growth inhibition, anchorage-independent growth potential, ability to promote tumor growth and/or development in an immunocompromised non-human animal model, and/or any appropriate indicator of cellular transformation. "Cancer cell" may be used interchangeably herein with "tumor cell", "malignant cell" or "cancerous cell", and encompasses cancer cells of a solid tumor, a semi-solid tumor, a hematological malignancy (e.g., a leukemia cell, a lymphoma cell, a myeloma cell, etc.), a primary tumor, a metastatic tumor, and the like.

In some embodiments, when the target cell is a cancer cell, the molecule on the surface of the cancer cell to which the antigen-binding portion of the CAR binds is a tumor-associated cell surface molecule or a tumor-specific cell surface molecule. By "tumor-associated cell surface molecule" is meant a cell surface molecule expressed on malignant cells with limited expression on cells of normal tissues, a cell surface molecule expressed at much higher density on malignant versus normal cells, or a cell surface molecule that is developmentally expressed.

When the target cell is a cancer cell, the cancer cell may express on its surface a tumor-associated molecule or tumor-specific molecule to which the antigen-binding portion of the CAR binds. In certain embodiments, such a tumor-associated molecule or tumor-specific molecule is selected from HER2, B7-H3 (CD276), CD19, CD20, GD2, CD22, CD30, CD33, CD56, CD66/CEACAM5, CD70, CD74, CD79b, CD123, CD133 CD138, CD171, Nectin-4, Mesothelin, Transmembrane glycoprotein NMB (GPNMB), Prostate-Specific Membrane Antigen (PSMA), SLC44A4, CA6, tyrosine-protein kinase Met (c-Met), epidermal growth factor receptor variant III (EGFRvIII), mucin 1 (MUC1), ephrin type-A receptor 2 (EphA2), glypican 2 (GPC2), glypican 3 (GPC3), fms-like tyrosine kinase 3 (FLT3), folate receptor alpha (FRα), IL-13 receptor alpha 2 (IL13Rα2), fibroblast activation protein (FAP), receptor tyrosine kinase-like orphan receptor 1 (ROR1), B-cell maturation antigen (BCMA), delta-like 3 (DLL3), κ light chain, vascular endothelial growth factor receptor 2 (VEGFR2), Trophoblast glycoprotein (TPBG), anaplastic lymphoma kinase (ALK), CA-IX, an integrin, C—X—C chemokine receptor type 4 (CXCR4), neuropilin-1 (NRP1), matriptase, and any other tumor-associated or tumor-specific molecules of interest.

Non-limiting examples of antibodies which may be employed in the CAR of a polypeptide of the present disclosure include Adecatumumab, Ascrinvacumab, Cixutumumab, Conatumumab, Daratumumab, Drozitumab, Duligotumab, Durvalumab, Dusigitumab, Enfortumab, Enoticumab, Figitumumab, Ganitumab, Glembatumumab, Intetumumab, Ipilimumab, Iratumumab, Icrucumab, Lexatumumab, Lucatumumab, Mapatumumab, Narnatumab, Necitumumab, Nesvacumab, Ofatumumab, Olaratumab, Panitumumab, Patritumab, Pritumumab, Radretumab, Ramucirumab, Rilotumumab, Robatumumab, Seribantumab, Tarextumab, Teprotumumab, Tovetumab, Vanticumab, Vesencumab, Votumumab, Zalutumumab, Flanvotumab, Altumomab, Anatumomab, Arcitumomab, Bectumomab, Blinatumomab, Detumomab, Ibritumomab, Minretumomab, Mitumomab, Moxetumomab, Naptumomab, Nofetumomab, Pemtumomab, Pintumomab, Racotumomab, Satumomab, Solitomab, Taplitumomab, Tenatumomab, Tositumomab, Tremelimumab, Abagovomab, Igovomab, Oregovomab, Capromab, Edrecolomab, Nacolomab, Amatuximab, Bavituximab, Brentuximab, Cetuximab, Derlotuximab, Dinutuximab, Ensituximab, Futuximab, Girentuximab, Indatuximab, Isatuximab, Margetuximab, Rituximab, Siltuximab, Ublituximab, Ecromeximab, Abituzumab, Alemtuzumab, Bevacizumab, Bivatuzumab, Brontictuzumab, Cantuzumab, Cantuzumab, Citatuzumab, Clivatuzumab, Dacetuzumab, Demcizumab, Dalotuzumab, Denintuzumab, Elotuzumab, Emactuzumab, Emibetuzumab, Enoblituzumab, Etaracizumab, Farletuzumab, Ficlatuzumab, Gemtuzumab, Imgatuzumab, Inotuzumab, Labetuzumab, Lifastuzumab, Lintuzumab, Lorvotuzumab, Lumretuzumab, Matuzumab, Milatuzumab, Nimotuzumab, Obinutuzumab, Ocaratuzumab, Otlertuzumab, Onartuzumab, Oportuzumab, Parsatuzumab, Pertuzumab, Pinatuzumab, Polatuzumab, Sibrotuzumab, Simtuzumab, Tacatuzumab, Tigatuzumab, Trastuzumab, Tucotuzumab, Vandortuzumab, Vanucizumab, Veltuzumab, Vorsetuzumab, Sofituzumab, Catumaxomab, Ertumaxomab, Depatuxizumab, Ontuxizumab, Blontuvetmab, Tamtuvetmab, or an antigen-binding variant thereof. As used herein, the term "variant" refers to an antibody that binds to a particular cognate antigen (e.g., HER2 for trastuzumab) but has fewer or more amino acids than the parental antibody, has one or more amino acid substitutions relative to the parental antibody, is a single-chain variant (such as an scFv variant) of the parental antibody, or any combination thereof.

Figure 2:
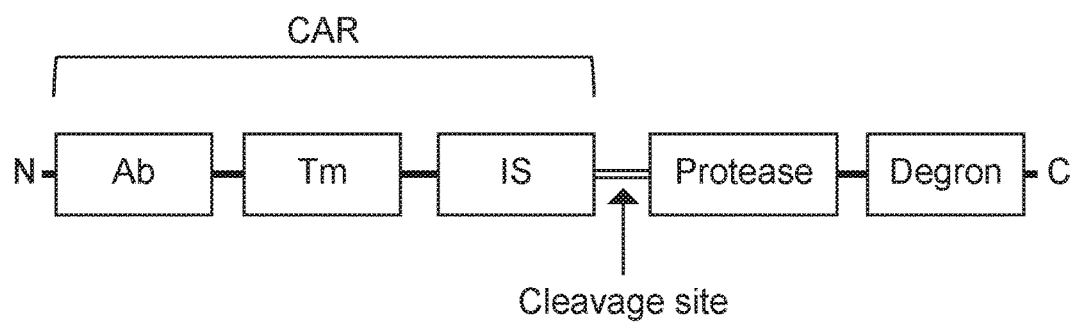
FIG. 2 Panel A: Schematic illustration of a CAR that includes an antibody ("Ab") that binds to an antigen of interest, a transmembrane domain ("Tm"), and an intracellular signaling domain ("IS"). Panel B: Schematic illustration of a polypeptide according to one embodiment of the present disclosure. In this example, the CAR includes an anti-B7-H3 (CD276) scFv as the antibody ("B7H3 scFv"), a CD 8 transmembrane domain ("CD 8 Tm"), and a 4-1 BB and CD 3 zeta signaling endodomain ("4-1BB" and "CD 3ζ").

The CAR may include the antigen-binding (e.g., an antibody, such as an scFv), a transmembrane domain, and an intracellular signaling domain. A polypeptide that includes such a CAR is schematically illustrated in FIG. 2, panel A. As shown, the polypeptide includes a CAR that includes an antibody (Ab), transmembrane domain (Tm), and intracellular signaling domain (IS), where the polypeptide further includes a cleavage site for a protease, the protease, and a degron. A specific example of such a polypeptide, employed in the Experimental section herein, is shown in FIG. 2, panel B. In this example, the CAR includes an anti-B7-H3 (anti-CD276) scFv as the antibody ("B7H3 scFv"), a CD 8 transmembrane domain ("CD 8 Tm"), and a signaling endodomain including 4-1BB and CD3 zeta ("4-1BB" and "CD 3ζ").

In some embodiments, the CAR includes one or more linker sequences between the various domains. A "variable region linking sequence" is an amino acid sequence that connects a heavy chain variable region to a light chain variable region and provides a spacer function compatible with interaction of the two sub-binding domains so that the resulting polypeptide retains a specific binding affinity to the same target molecule as an antibody that includes the same light and heavy chain variable regions. A non-limiting example of a variable region linking sequence is a serine-glycine linker, such as a serine-glycine linker that includes the amino acid sequence GGGGSGGGGSGGGGS $(G_4S)_3$ (SEQ ID NO:3). In certain aspects, a linker separates one or more heavy or light chain variable domains, hinge domains, transmembrane domains, co-stimulatory domains, and/or primary signaling domains. In particular embodiments, the CAR includes one, two, three, four, or five or more linkers. In particular embodiments, the length of a linker is about 1 to about 25 amino acids, about 5 to about 20 amino acids, or about 10 to about 20 amino acids, or any intervening length of amino acids. In some embodiments, the linker is 1, 2, 3, 4, 5, 6, 7, 8, 9, 10, 11, 12, 13, 14, 15, 16, 17, 18, 19, 20, 21, 22, 23, 24, 25, or more amino acids long.

In some embodiments, the binding domain of the CAR is followed by one or more spacer domains that moves the antigen binding domain away from the effector cell surface (e.g., the surface of a T cell expressing the CAR) to enable proper cell/cell contact, antigen binding and/or activation. The spacer domain (and any other spacer domains, linkers, and/or the like described herein) may be derived either from a natural, synthetic, semi-synthetic, or recombinant source. In certain embodiments, a spacer domain is a portion of an immunoglobulin, including, but not limited to, one or more heavy chain constant regions, e.g., CH2 and CH3. The spacer domain may include the amino acid sequence of a naturally occurring immunoglobulin hinge region or an altered immunoglobulin hinge region. In one embodiment, the spacer domain includes the CH2 and/or CH3 of IgG1, IgG4, or IgD. Illustrative spacer domains suitable for use in the CARs described herein include the hinge region derived from the extracellular regions of type 1 membrane proteins such as CD8a and CD4, which may be wild-type hinge regions from these molecules or variants thereof. In certain aspects, the hinge domain includes a CD8a hinge region. In some embodiments, the hinge is a PD-1 hinge or CD152 hinge.

The "transmembrane domain" (TM domain) is the portion of the CAR that fuses the extracellular binding portion and intracellular signaling domain and anchors the CAR to the plasma membrane of the cell (e.g., immune effector cell). The Tm domain may be derived either from a natural, synthetic, semi-synthetic, or recombinant source. In some embodiments, the Tm domain is derived from (e.g., includes at least the transmembrane region(s) or a functional portion thereof) of the alpha or beta chain of the T-cell receptor, CD35, CD3ζ, CD3γ, CD3δ, CD4, CD5, CD8α, CD9, CD16, CD22, CD27, CD28, CD33, CD37, CD45, CD64, CD80, CD86, CD134, CD137, CD152, CD154, and PD-1.

In one embodiment, a CAR includes a Tm domain derived from CD8α. In certain aspects, a CAR includes a Tm domain derived from CD8a and a short oligo- or polypeptide linker, e.g., between 1, 2, 3, 4, 5, 6, 7, 8, 9, or 10 amino acids in length, that links the Tm domain and the intracellular signaling domain of the CAR. A glycine-serine linker may be employed as such a linker, for example.

The "intracellular signaling" domain of a CAR refers to the part of a CAR that participates in transducing the signal from CAR binding to a target molecule/antigen into the interior of the immune effector cell to elicit effector cell function, e.g., activation, cytokine production, proliferation and/or cytotoxic activity, including the release of cytotoxic factors to the CAR-bound target cell, or other cellular responses elicited with target molecule/antigen binding to the extracellular CAR domain. Accordingly, the term "intracellular signaling domain" refers to the portion of a protein which transduces the effector function signal and that directs the cell to perform a specialized function. To the extent that a truncated portion of an intracellular signaling domain is used, such truncated portion may be used in place of a full-length intracellular signaling domain as long as it transduces the effector function signal. The term intracellular signaling domain is meant to include any truncated portion of an intracellular signaling domain sufficient for transducing effector function signal.

Signals generated through the T cell receptor (TCR) alone are insufficient for full activation of the T cell and a secondary or costimulatory signal is also required. Thus, T cell activation is mediated by two distinct classes of intracellular signaling domains: primary signaling domains that initiate antigen-dependent primary activation through the TCR (e.g., a TCR/CD3 complex) and costimulatory signaling domains that act in an antigen-independent manner to provide a secondary or costimulatory signal. As such, a CAR of the present disclosure may include an intracellular signaling domain that includes one or more "costimulatory signaling domains" and a "primary signaling domain."

Primary signaling domains regulate primary activation of the TCR complex either in a stimulatory manner, or in an inhibitory manner. Primary signaling domains that act in a stimulatory manner may contain signaling motifs which are known as immunoreceptor tyrosine-based activation motifs (or "ITAMs"). Non-limiting examples of ITAM-containing primary signaling domains suitable for use in a CAR of the present disclosure include those derived from FcRγ, FcRβ, CD3γ, CD3δ, CD3ε, CD3ζ, CD22, CD79α, CD79β, and CD66δ. In certain embodiments, a CAR includes a CD3ζ primary signaling domain and one or more costimulatory signaling domains. The intracellular primary signaling and costimulatory signaling domains are operably linked to the carboxyl terminus of the transmembrane domain.

In some embodiments, the CAR includes one or more costimulatory signaling domains to enhance the efficacy and expansion of T cells expressing the CAR. As used herein, the term "costimulatory signaling domain" or "costimulatory domain" refers to an intracellular signaling domain of a costimulatory molecule or an active fragment thereof. Example costimulatory molecules suitable for use in CARs contemplated in particular embodiments include TLR1, TLR2, TLR3, TLR4, TLR5, TLR6, TLR7, TLR8, TLR9, TLR10, CARD11, CD2, CD7, CD27, CD28, CD30, CD40, CD54 (ICAM), CD83, CD134 (OX40), CD137 (4-1BB), CD278 (ICOS), DAP10, LAT, KD2C, SLP76, TRIM, and ZAP70. In some embodiments, the CAR includes one or more costimulatory signaling domains selected from the group consisting of 4-1BB, CD28, CD137, and CD134, and a CD3 primary signaling domain.

In certain aspects, a CAR of a polypeptide of the present disclosure includes an antigen-binding portion (e.g., a single chain antibody, such as an scFv) that binds to an antigen of interest; a transmembrane domain from a polypeptide selected from the group consisting of: CD4, CD8α, CD154, and PD-1; one or more intracellular costimulatory signaling domains from a polypeptide selected from the group consisting of: 4-1 BB, CD28, CD134, and CD137; and an intracellular signaling domain from a polypeptide selected from the group consisting of: FcRγ, FcRβ, CD3γ, CD3δ, CD3ε, CD3ζ, CD22, CD79α, CD79β, and CD66δ. Such a CAR may further include a spacer domain between the antigen-binding portion and the transmembrane domain, e.g., a CD8 alpha hinge.

As summarized above, the polypeptides of the present disclosure include a degron. As used herein, a "degron" is a sequence of amino acids which provides a degradation signal that directs a polypeptide to intracellular pathways for proteolytic degradation. The degron may promote degradation of an attached polypeptide through either the proteasome or autophagy-lysosome pathways. In the polypeptide, the degron is operably linked to the CAR but need not be contiguous with it so long as the degron still functions to direct degradation of the CAR when the degron and CAR are linked (e.g., in the presence of an inhibitor of the protease such that the protease is not able to cleave the cleavage site and, therefore, the degron and CAR remain linked). In some embodiments, the degron induces rapid degradation of the polypeptide of interest. For a discussion of degrons and their function in protein degradation, see, e.g., Kanemaki et al. (2013) *Pflugers Arch.* 465(3):419-425, Erales et al. (2014) *Biochim Biophys Acta* 1843(1):216-221, Schrader et al. (2009) *Nat. Chem. Biol.* 5(11):815-822, Ravid et al. (2008) *Nat. Rev. Mol. Cell. Biol.* 9(9):679-690, Tasaki et al. (2007) *Trends Biochem Sci.* 32(I I):520-528, Meinnel et al. (2006) *Biol. Chem.* 387(7):839-851, Kim et al. (2013) *Autophagy* 9(7): 1100-1103, Varshaysky (2012) *Methods Mol. Biol.* 832: 1-11, and Fayadat et al. (2003) *Mol Biol Cell.* 14(3): 1268-1278; the disclosures of which are incorporated herein by reference in their entireties for all purposes.

In certain aspects, the degron is one found in p53, HIF1 alpha, ubiquitin, or a functional variant thereof. In some embodiments, the degron includes portions of the HCV nonstructural proteins NS3 and NS4A. In certain aspects, the degron includes the amino acid sequence of SEQ ID NO:1 (the amino acid sequence of a degron from HCV genotype 1a), or a functional variant thereof having 70% or greater, 75% or greater, 80% or greater, 85% or greater, 90% or greater, 95% or greater, or 99% or greater amino acid sequence identity to the amino acid sequence of SEQ ID NO:1, or a fragment thereof, such as a fragment having a length of from 30 to 41 amino acids, 32 to 41 amino acids, 34 to 41 amino acids, 36 to 41 amino acids, or 38 to 41 amino acids, wherein a functional variant of the degron of SEQ ID NO:1 is capable of promoting degradation of the CAR when the CAR and degron are linked. It is to be understood that degrons including the residues corresponding to the reference sequence of SEQ ID NO:1 in HCV nonstructural proteins NS3 and NS4A obtained from other strains of HCV are also encompassed by the present disclosure.

Example Degron Amino Acid Sequence

```
                                           (SEQ ID NO: 1)
PITKIDTKYIMTCMSADLEVVTSTWVLVGGVLAALAAYCLST
```

In certain aspects, a "variant" of any of the polypeptides or domains thereof of the present disclosure contains one or more conservative substitutions. A "conservative substitution" is one in which an amino acid is substituted for another amino acid that has similar properties, such that one skilled in the art of peptide chemistry would expect the secondary structure and hydropathic nature of the polypeptide to be substantially unchanged. Modifications may be made in the structure of the polynucleotides and polypeptides contemplated in particular embodiments, polypeptides include polypeptides having at least about and still obtain a functional molecule that encodes a variant or derivative polypeptide with desirable characteristics. When it is desired to alter the amino acid sequence of a polypeptide to create an equivalent, or even an improved, variant polypeptide, one skilled in the art, for example, can change one or more of the codons of the encoding DNA sequence.

As summarized above, the polypeptides of the present disclosure include a protease. The protease chosen for use in the polypeptide may be highly selective for the cleavage site in the polypeptide. Additionally, protease activity is preferably inhibitable with inhibitors that are cell-permeable and not toxic to the cell or individual under study or treatment. For a discussion of proteases, see, e.g., V. Y. H. Hook, Proteolytic and cellular mechanisms in prohormone and proprotein processing, RG Landes Company, Austin, Tex., USA (1998); N. M. Hooper et al., *Biochem. J.* 321: 265-279 (1997); Z. Werb, *Cell* 91: 439-442 (1997); T. G. Wolfsberg et al., *J. Cell Biol.* 131: 275-278 (1995); K. Murakami and J. D. Etlinger, *Biochem. Biophys. Res. Comm.* 146: 1249-1259 (1987); T. Berg et al., *Biochem. J.* 307: 313-326 (1995); M. J. Smyth and J. A. Trapani, *Immunology Today* 16: 202-206 (1995); R. V. Talanian et al., *J. Biol. Chem.* 272: 9677-9682 (1997); and N. A. Thornberry et al., *J. Biol. Chem.* 272: 17907-17911 (1997), the disclosures of which are incorporated herein by reference in their entireties for all purposes.

In some embodiments, the protease employed in the polypeptide is a sequence-specific non-human protease for which pharmacological inhibitors are available. In certain aspects, the protease employed in the polypeptide is a viral protease. Non-limiting examples of viral proteases that may be employed in the polypeptides of the present disclosure include a hepatitis C virus (HCV) protease, a rhinovirus protease, a coxsackie virus protease, a dengue virus protease, and a tev protease. As just one example, the viral protease may be a HCV protease. In certain embodiments, the viral protease is derived from HCV nonstructural protein 3 (NS3). NS3 consists of an N-terminal serine protease domain and a C-terminal helicase domain. By "derived from HCV NS3" is meant the protease is the serine protease domain of HCV NS3 or a proteolytically active variant thereof capable of cleaving a cleavage site for the serine protease domain of HCV NS3. The protease domain of NS3 forms a heterodimer with the HCV nonstructural protein 4A (NS4A), which activates proteolytic activity. A protease derived from HCV NS3 may include the entire NS3 protein or a proteolytically active fragment thereof, and may further include a cofactor polypeptide, such as a cofactor polypeptide derived from HCV nonstructural protein 4A (NS4A), e.g., an activating NS4A region. NS3 protease is highly selective and can be well-inhibited by a number of non-toxic, cell-permeable drugs, which are currently clinically available. NS3 protease inhibitors that may be employed include, but are not limited to, simeprevir, danoprevir, asunaprevir, ciluprevir, boceprevir, sovaprevir, paritaprevir and telaprevir. A non-limiting example of a protease derived from HCV NS3 is provided below.

Example Protease Derived from HCV NS3

```
                                           (SEQ ID NO: 2)
APITAYAQQTRGLLGCIITSLTGRDKNQVEGEVQIVSTATQTFLATCIN

GVCWAVYHGAGTRTIASPKGPVIQMYTNVDQDLVGWPAPQGSRSLTPCT

CGSSDLYLVTRHADVIPVRRRGDSRGSLLSPRPISYLKGSSGGPLLCPA

GHAVGLFRAAVCTRGVAKAVDFIPVENLETTMRSPVFTD
```

In some embodiments, the protease includes the sequence set forth in SEQ ID NO:2 or is a functional (proteolytic) variant thereof having 70% or greater, 75% or greater, 80% or greater, 85% or greater, 90% or greater, 95% or greater, or 99% or greater amino acid sequence identity to SEQ ID NO:2, and/or a functional (proteolytic) fragment thereof such as a fragment having a length of from 100 to 185, 120 to 185, 140 to 185, 160 to 185, 170 to 185, from 180 to 185, from 182 to 185, or from 184 to 185 amino acids.

When a protease derived from HCV NS3 is employed in a polypeptide of the present disclosure, the cleavage site should include a NS3 protease cleavage site. An NS3 protease cleavage site may include the four junctions between nonstructural (NS) proteins of the HCV polyprotein normally cleaved by the NS3 protease during HCV infection, including the NS3/NS4A, NS4A/NS4B, NS4B/NS5A, and NS5A/NS5B junction cleavage sites. For a description of NS3 protease and representative sequences of its cleavage sites for various strains of HCV, see, e.g., *Hepatitis C Viruses: Genomes and Molecular Biology* (S. L. Tan ed., Taylor & Francis, 2006), Chapter 6, pp. 163-206; the disclosure of which is incorporated herein by reference in its entirety.

In some embodiments, the protease is derived from HCV NS3 and engineered to include one or more amino acid substitutions relative to the amino acid sequence set forth in SEQ ID NO:2. For example, the protease may include a substitution at the position corresponding to position 54 of the amino acid sequence set forth in SEQ ID NO:2. In certain aspects, such a substitution is a threonine to alanine substitution.

NS3 nucleic acid and protein sequences may be derived from HCV, including any isolate of HCV having any genotype (e.g., seven genotypes 1-7) or subtype. A number of NS3 nucleic acid and protein sequences are known and described, e.g., in U.S. Ser. No. 15/737,712, the disclosure of which is incorporated herein by reference in their entirety for all purposes. Additional representative NS3 sequences are listed in the National Center for Biotechnology Information (NCBI) database. See, for example, NCBI entries: Accession Nos. YP_001491553, YP_001469631, YP_001469632, NP_803144, NP_671491, YP_001469634, YP_001469630, YP_001469633, ADA68311, ADA68307, AFP99000, AFP98987, ADA68322, AFP99033, ADA68330, AFP99056, AFP99041, CBF60982, CBF60817, AHH29575, AIZ00747, AIZ00744, ABI36969, ABN05226, KF516075, KF516074, KF516056, AB826684, AB826683, JX171009, JX171008, JX171000, EU847455, EF154714, GU085487, JX171065, and JX171063; all of which sequences are herein incorporated by reference. Any of these sequences or functional variants thereof having 70% or greater, 75% or greater, 80% or greater, 85% or greater, 90% or greater, 95% or greater, or 99% or greater amino acid sequence identity to any one of these sequences, or proteolytic fragments thereof, may be employed.

NS4A nucleic acid and protein sequences may be derived from HCV, including any isolate of HCV having any genotype (e.g., seven genotypes 1-7) or subtype. A number of NS4A nucleic acid and protein sequences are known. Representative NS4A sequences are listed in the National Center for Biotechnology Information (NCBI) database. See, for example, NCBI entries: Accession Nos. NP_751925, YP_001491554, GU945462, HQ822054, FJ932208, FJ932207, FJ932205, and FJ932199; all of which sequences (as entered by the date of filing of this application) are herein incorporated by reference. Any of these sequences or functional variants thereof having 70% or greater, 75% or greater, 80% or greater, 85% or greater, 90% or greater, 95% or greater, or 99% or greater amino acid sequence identity to any one of these sequences, or proteolytic fragments thereof, may be employed.

HCV polyprotein nucleic acid and protein sequences may be derived from HCV, including any isolate of HCV having any genotype (e.g., seven genotypes 1-7) or subtype. A number of HCV polyprotein nucleic acid and protein sequences are known. Representative HCV polyprotein sequences are listed in the National Center for Biotechnology Information (NCBI) database. See, for example, NCBI entries: Accession Nos. YP_001469631, NP_671491, YP_001469633, YP_001469630, YP_001469634, YP_001469632, NC_009824, NC_004102, NC_009825, NC_009827, NC_009823, NC_009826, and EF108306; all of which sequences (as entered by the date of filing of this application) are herein incorporated by reference. Any of these sequences or functional variants thereof having 70% or greater, 75% or greater, 80% or greater, 85% or greater, 90% or greater, 95% or greater, or 99% or greater amino acid sequence identity to any one of these sequences, or proteolytic fragments thereof, may be employed.

As summarized above, the polypeptides of the present disclosure include a cleavage site for the protease, where the cleavage site is disposed between the cell surface molecule and the degron. The term "cleavage site" refers to the bond (e.g., a scissile bond) cleaved by an agent. A cleavage site for a protease includes the specific amino acid sequence recognized by the protease during proteolytic cleavage and may include surrounding amino acids (e.g., from one to six amino acids) on either side of the scissile bond, which bind to the active site of the protease and are needed for recognition as a substrate. In some embodiments, the cleavage site is provided as a cleavable linker, where "cleavable linker" refers to a linker including the cleavage site. A cleavable linker may include a cleavage site specific for an enzyme, such as a protease or other cleavage agent. A cleavable linker is typically cleavable under physiological conditions.

In some embodiments, the protease of the polypeptide is derived from HCV NS3 and the cleavage site includes an NS3 protease cleavage site. An NS3 protease cleavage site may include the HCV polyprotein NS3/NS4A, NS4A/NS4B, NS4B/NS5A, and NS5A/NS5B junction cleavage sites. A representative HCV NS4A/4B protease cleavage site is DEMEECSQHL (SEQ ID NO:4). A representative HCV NS5A/5B protease cleavage site is EDVVPCSMG (SEQ ID NO:5).

In certain aspects, a polypeptide of the present disclosure includes a SMASh tag that includes the amino acid sequence set forth in SEQ ID NO:6 (C-terminal SMASh tag with NS4A/4B protease cleavage site), or a functional variant thereof having 70% or greater, 75% or greater, 80% or greater, 85% or greater, 90% or greater, 95% or greater, or 99% or greater amino acid sequence identity to such a SMASh tag, where the polypeptide includes a degron operably linked to the cell surface molecule of interest, and/or a functional fragment thereof (e.g., having from 290 to 305, 295 to 305, or 300 to 305 amino acids), which is capable of promoting degradation of the cell surface molecule of interest and includes a protease capable of cleaving the polypeptide at a cleavage site in the absence of an inhibitor of the protease.

Example C-Terminal SMASh Tag with NS4A/4B Protease Cleavage Site

```
                                          (SEQ ID NO: 6)
PGDEMEECSQHLPGAGSSGDIMDYKDDDDKGSSGTGSGSGTSAPITAYAQ

QTRGLLGCIITSLTGRDKNQVEGEVQIVSTATQTFLATCINGVCWAVYHG
```

-continued

AGTRTIASPKGPVIQMYTNVDQDLVGWPAPQGSRSLTPCTCGSSDLYLVT

RHADVIPVRRRGDSRGSLLSPRPISYLKGSSGGPLLCPAGHAVGLFRAAV

CTRGVAKAVDFIPVENLETTMRSPVFTDNSSPPAVTLTHPITKIDTKYIM

TCMSADLEVVTSTWVLVGGVLAALAAYCLSTGCVVIVGRIVLSGKPAIIP

DREVLY

Also provided by the present disclosure are nucleic acids encoding any of the polypeptides described herein, including any of the polypeptides having any of the features (e.g., domains, etc.) and combinations thereof described hereinabove. As a result of the degeneracy of the genetic code, there are many nucleotide sequences that may encode the polypeptides of the present disclosure. Some of these polynucleotides may bear minimal homology to the nucleotide sequence of any native gene. Polynucleotides that vary due to differences in codon usage are specifically contemplated in particular embodiments, for example polynucleotides that are optimized for human and/or primate codon selection.

Shown in Table 1 below are amino acid sequences of example polypeptides of the present disclosure (from N- to C-terminus), and nucleotide sequences of nucleic acids encoding the polypeptides. The polypeptides and nucleic acids are those employed in the Experimental section below. Not shown are signal sequences initially present at the N-termini of the polypeptides. For each polypeptide presented in Table 1 below, the CAR portion is shown in bold. Segments/domains of the polypeptides are indicated by alternating underlining, and the identities of the segments/domains are provided in the left column.

TABLE 1

Example Polypeptides

| | |
|---|---|
| B7H3-BBz-SMASh amino acid sequence (SEQ ID NO: 7)<br>CAR<br>B7H3 scFv (MGA271) heavy chain<br>linker<br>B7H3 scFv (MGA271) light chain<br>CD8 alpha hinge<br>CD8 alpha transmembrane domain<br>4-1BB costimulatory domain<br>CD3 zeta domain<br>SMASh tag<br>cleavage site (italicized)-containing domain<br>NS3 protease domain<br>degron domain<br>NS4A cofactor domain | EVQLVESGGGLVQPGGSLRLSCAASGFTFSSFGMHWVRQ APGKGLEWVAYISSDSSAIYYADTVKGRFTISRDNAKNSLY LQMNSLRDEDTAVYYCGRGRENIYYGSRLDYWGQGTTVT VSSGGGGSGGGGSGGGGSDIQLTQSPSFLSASVGDRVTIT CKASQNVDTNVAWYQQKPGKAPKALIYSASYRYSGVPSR FSGSGSGTDFTLTISSLQPEDFATYYCQQYNNYPFTFGQGT KLEIKAAATTTPAPRPPTPAPTIASQPLSLRPEACRPAAGG AVHTRGLDFACDIYIWAPLAGTCGVLLLSLVITLYCKRGRK KLLYIFKQPFMRPVQTTQEEDGCSCRFPEEEEGGCELRVK FSRSADAPAYKQGQNQLYNELNLGRREEYDVLDKRRGRD PEMGGKPRRKNPQEGLYNELQKDKMAEAYSEIGMKGERR RGKGHDGLYQGLSTATKDTYDALHMQALPPRPGDEMEEC SQHLPGAGSSGDIMDYKDDDDKGSSGTGSGSGTSAPITAY AQQTRGLLGCIITSLTGRDKNQVEGEVQIVSTATQTFLATCIN GVCWAVYHGAGTRTIASPKGPVIQMYTNVDQDLVGWPAPQ GSRSLTPCTCGSSDLYLVTRHADVIPVRRRGDSRGSLLSPR PISYLKGSSGGPLLCPAGHAVGLFRAAVCTRGVAKAVDFIPV ENLETTMRSPVFTDNSSPPAVTLTHPITKIDTKYIMTCMSADL EVVTSTWVLVGGVLAALAAYCLSTGCVVIVGRIVLSGKPAIIP DREVLY |
| B7H3-BBz-SMASh nucleotide sequence (SEQ ID NO: 8) | GAGGTGCAGCTGGTGGAATCTGGCGGCGGACTGGTGCA GCCTGGCGGATCTCTGAGACTGAGCTGTGCCGCCAGCG GCTTCACCTTCAGCAGCTTCGGAATGCACTGGGTGCGCC AGGCCCCTGGCAAAGGACTGGAATGGGTGGCCTACATCA GCAGCGACAGCAGCGCCATCTACTACGCCGACACCGTG AAGGGCCGGTTCACCATCTCCCGGGACAACGCCAAGAAC AGCCTGTACCTGCAGATGAACTCCCTGCGGGACGAGGAC ACCGCCGTGTACTATTGCGGCAGAGGCAGAGAGAACATC TATTACGGCAGCAGACTGGACTACTGGGGCCAGGGCACA ACCGTGACAGTGTCTAGCGGAGGCGGAGGATCAGGCGG CGGAGGAAGTGGCGGAGGGGGATCTGATATCCAGCTGA CCCAGAGCCCCAGCTTCCTGAGCGCCTCTGTGGGCGAC AGAGTGACCATCACATGCAAGGCCAGCCAGAACGTGGAC ACCAACGTGGCCTGGTATCAGCAGAAGCCCGGCAAGGC CCCTAAGGCCCTGATCTACAGCGCCAGCTACCGGTACAG CGGCGTGCCCAGCAGATTTTCTGGCAGCGGCTCCGGCA CCGACTTCACCCTGACAATCAGCAGCCTGCAGCCCGAGG ACTTCGCCACCTACTACTGCCAGCAGTACAACAACTACCC TTTCACCTTCGGCCAGGGGACCAAGCTGGAAATCAAAGC GGCCGCAACAACAACACCAGCTCCTAGACCTCCAACTCC TGCTCCTACAATCGCCAGCCAGCCTCTGTCTCTGAGGCC TGAAGCTTGTAGACCTGCTGCTGGCGGAGCCGTGCATAC CAGAGGACTGGATTTCGCCTGCGACATCTACATTTGGGC CCCTCTGGCTGGAACATGTGGCGTGCTGCTGCTGTCTCT GGTCATCACCCTGTACTGCAAGCGGGGCAGAAAGAAGCT GCTGTACATCTTCAAGCAGCCCTTCATGCGGCCCGTGCA GACCACACAAGAGGAAGATGGCTGCTCCTGCAGATTCCC CGAGGAAGAAGAAGGCGGCTGCGAGCTGAGAGTGAAGT TCTCTAGATCTGCCGACGCTCCCGCCTACAAGCAGGGCC AGAATCAGCTGTACAACGAGCTGAACCTGGGGAGAAGAG AAGAGTACGACGTGCTGGATAAGCGGAGAGGCAGAGAT CCTGAGATGGGCGGCAAGCCCAGACGGAAGAATCCTCA AGAGGGCCTGTATAATGAGCTGCAGAAAGACAAGATGGC CGAGGCCTACAGCGAGATCGGAATGAAGGGCGAGCGCA GAAGAGGCAAGGGCCACGATGGACTGTATCAGGGCCTG AGCACAGCCACCAAGGATACCTATGATGCCCTGCACATG |

TABLE 1-continued

Example Polypeptides

| | |
|---|---|
| | CAGGCCCTTCCACCTAGACCTGGCGACGAAATGGAAGAG<br>TGTAGCCAGCATCTGCCTGGCGCCGGATCTAGCGGCGA<br>CATCATGGACTACAAGGACGACGACGATAAGGGCAGCTC<br>TGGCACAGGCTCTGGCTCTGGAACATCTGCCCCTATCAC<br>AGCCTACGCTCAGCAGACAAGAGGCCTGCTGGGCTGTAT<br>CATCACCAGCCTGACCGGCAGAGACAAGAACCAGGTTGA<br>GGGCGAAGTGCAGATCGTGTCTACCGCCACACAGACCTT<br>TCTGGCCACCTGTATCAATGGCGTGTGCTGGGCCGTTTA<br>TCACGGCGCTGGAACCAGAACAATCGCCTCTCCTAAGGG<br>CCCCGTGATCCAGATGTACACCAACGTGGACCAGGATCT<br>CGTTGGCTGGCCTGCTCCTCAGGGAAGCAGAAGCCTGA<br>CACCTTGTACCTGTGGCAGCAGCGATCTGTACCTGGTCA<br>CAAGACACGCCGATGTGATCCCTGTGCGGAGAAGAGGC<br>GATAGCAGAGGTTCTCTGCTGTCCCCTAGACCTATCAGC<br>TACCTGAAGGGATCTTCTGGCGGCCCTCTGCTGTCCT<br>GCTGGACATGCTGTGGGACTGTTTAGAGCCGCCGTGTGT<br>ACAAGAGGCGTGGCCAAGGCTGTGGACTTCATCCCCGTG<br>GAAAACCTGGAAACCACCATGAGAAGCCCCGTGTTCACC<br>GACAATAGCAGCCCTCCAGCCGTGACACTGACACACCCC<br>ATCACCAAGATCGACACCAAGTACATCATGACCTGCATGA<br>GCGCCGACCTGGAAGTGGTCACATCTACCTGGGTTCTCG<br>TTGGAGGCGTTCTGGCTGCCCTGGCCGCTTATTGTCTGT<br>CTACCGGCTGTGTGGTCATCGTGGGCAGAATCGTGCTGT<br>CCGGCAAGCCTGCCATCATTCCCGATAGAGAGGTGCTGT<br>ACTGA |
| CD19-BBz-SMASh amino acid<br>sequence (SEQ ID NO: 9)<br>CAR<br>CD19 scFv (FMC63) light chain<br>linker<br>CD19 scFv (FMC63) heavy chain<br>CD8 alpha hinge<br>CD8 alpha transmembrane<br>domain<br>4-1BB costimulatory domain<br>CD3 zeta domain<br>SMASh tag<br>cleavage site (italicized)-<br>containing domain<br>NS3 protease domain<br>degron domain<br>NS4A cofactor domain | IQMTQTTSSLSASLGDRVTISCRASQDISKYLNWYQQKPDG<br>TVKLLIYHTSRLHSGVPSRFSGSGSGTDYSLTISNLEQEDIA<br>TYFCQQGNTLPYTFGGGTKLEITGSTSGSGKPGSGEGSTK<br>GEVKLQESGPGLVAPSQSLSVTCTVSGVSLPDYGVSWIRQ<br>PPRKGLEWLGVIWGSETTYYNSALKSRLTIIKDNSKSQVFL<br>KMNSLQTDDTAIYYCAKHYYYGGSYAMDYWGQGTSVTVS<br>SAAATTTPAPRPPTPAPTIASQPLSLRPEACRPAAGGAVHT<br>RGLDFACDIYIWAPLAGTCGVLLLSLVITLYCKRGRKKLLYI<br>FKQPFMRPVQTTQEEDGCSCRFPEEEEGGCELRVKFSRS<br>ADAPAYKQGQNQLYNELNLGRREEYDVLDKRRGRDPEMG<br>GKPRRKNPQEGLYNELQKDKMAEAYSEIGMKGERRRGKG<br>HDGLYQGLSTATKDTYDALHMQALPPRPGDEMEECSQHL<br>PGAGSSGDIMDYKDDDDKGSSGTGSGSGTSAPITAYAQQT<br>RGLLGCIITSLTGRDKNQVEGEVQIVSTATQTFLATCINGVC<br>WAVYHGAGTRTIASPKGPVIQMYTNVDQDLVGWPAPQGSR<br>SLTPCTCGSSDLYLVTRHADVIPVRRRGDSRGSLLSPRPISY<br>LKGSSGGPLLCPAGHAVGLFRAAVCTRGVAKAVDFIPVENL<br>ETTMRSPVFTDNSSPPAVTLTHPITKIDTKYIMTCMSADLEVV<br>TSTWVLVGGVLAALAAYCLSTGCVVIVGRIVLSGKPAIIPDRE<br>VLY |
| CD19-BBz-SMASh nucleotide<br>sequence (SEQ ID NO: 10) | ATCCAGATGACCCAGACCACCAGCAGCCTGAGCGCCAG<br>CCTGGGCGATAGAGTGACCATCAGCTGCAGAGCCAGCC<br>AGGACATCAGCAAGTACCTGAACTGGTATCAGCAGAAAC<br>CCGACGGCACCGTGAAGCTGCTGATCTACCACACCAGCA<br>GACTGCACAGCGGCGTGCCCAGCAGATTTTCTGGCAGC<br>GGCTCCGGCACCGACTACAGCCTGACCATCTCCAACCTG<br>GAACAGGAAGATATCGCTACCTACTTCTGTCAGCAAGGC<br>AACACCCTGCCCTACACCTTCGGCGGAGGCACCAAGCTG<br>GAAATCACCGGCAGCACAAGCGGCAGCGGCAAGCCTGG<br>ATCTGGCGAGGGAAGCACCAAGGGCGAAGTGAAACTGC<br>AGGAAAGCGGCCCTGGACTGGTGGCCCCAAGCCAGTCT<br>CTGAGCGTGACCTGTACCGTGTCCGGCGTGTCCCTGCCT<br>GACTATGGCGTGTCCTGGATCAGACAGCCCCCCAGAAAG<br>GGCCTGGAATGGCTGGGAGTGATCTGGGGCAGCGAGAC<br>AACCTACTACAACAGCGCCCTGAAGTCCCGGCTGACCAT<br>CATCAAGGACAACTCCAAGAGCCAGGTGTTCCTGAAGAT<br>GAACAGCCTGCAGACCGACGACACCGCCATCTACTACTG<br>CGCCAAGCACTACTACTACGGCGGCAGCTACGCTATGGA<br>CTACTGGGGCCAGGGCACCAGCGTGACCGTGTCATCTG<br>CGGCCGCAACAACAACACCAGCTCCTAGACCTCCAACTC<br>CTGCTCCTACAATCGCCAGCCAGCCTCTGTCTCTGAGGC<br>CTGAAGCTTGTAGACCTGCTGCTGGCGGAGCCGTGCATA<br>CCAGAGGACTGGATTTCGCCTGCGACATCTACATTTGGG<br>CCCCTCTGGCTGGAACATGTGGCGTGCTGCTGCTGTCTC<br>TGGTCATCACCCTGTACTGCAAGCGGGGCAGAAAGAAGC<br>TGCTGTACATCTTCAAGCAGCCCTTCATGCGGCCCGTGC<br>AGACCACACAAGAGGAAGATGGCTGCTCCTGCAGATTCC<br>CCGAGGAAGAAGAAGGCGGCTGCGAGCTGAGAGTGAAG<br>TTCTCTAGATCTGCCGACGCTCCCGCCTACAAGCAGGGC<br>CAGAATCAGCTGTACAACGAGCTGAACCTGGGGAGAAGA<br>GAAGAGTACGACGTGCTGGATAAGCGGAGAGGCAGAGA |

TABLE 1-continued

Example Polypeptides

| | |
|---|---|
| | TCCTGAGATGGGCGGCAAGCCCAGACGGAAGAATCCTCA<br>AGAGGGCCTGTATAATGAGCTGCAGAAAGACAAGATGGC<br>CGAGGCCTACAGCGAGATCGGAATGAAGGGCGAGCGCA<br>GAAGAGGCAAGGGCCACGATGGACTGTATCAGGGCCTG<br>AGCACAGCCACCAAGGATACCTATGATGCCCTGCACATG<br>CAGGCCCTTCCACCTAGACCTGGCGACGAAATGGAAGAG<br>TGTAGCCAGCATCTGCCTGGCGCCGGATCTAGCGGCGA<br>CATCATGGACTACAAGGACGACGACGATAAGGGCAGCTC<br>TGGCACAGGCTCTGGCTCTGGAACATCTGCCCCTATCAC<br>AGCCTACGCTCAGCAGACAAGAGGCCTGCTGGGCTGTAT<br>CATCACCAGCCTGACCGGCAGAGACAAGAACCAGGTTGA<br>GGGCGAAGTGCAGATCGTGTCTACCGCCACACAGACCTT<br>TCTGGCCACCTGTATCAATGGCGTGTGCTGGGCCGTTTA<br>TCACGGCGCTGGAACCAGAACAATCGCCTCTCCTAAGGG<br>CCCCGTGATCCAGATGTACACCAACGTGGACCAGGATCT<br>CGTTGGCTGGCCTGCTCCTCAGGGAAGCAGAAGCCTGA<br>CACCTTGTACCTGTGGCAGCAGCGATCTGTACCTGGTCA<br>CAAGACACGCCGATGTGATCCCTGTGCGGAGAAGAGGC<br>GATAGCAGAGGTTCTCTGCTGTCCCCTAGACCTATCAGC<br>TACCTGAAGGGATCTTCTGGCGGCCCTCTGCTGTGTCCT<br>GCTGGACATGCTGTGGGACTGTTTAGAGCCGCCGTGTGT<br>ACAAGAGGCGTGGCCAAGGCTGTGGACTTCATCCCCGTG<br>GAAAACCTGGAAACCACCATGAGAAGCCCCGTGTTCACC<br>GACAATAGCAGCCCTCCAGCCGTGACACTGACACACCCC<br>ATCACCAAGATCGACACCAAGTACATCATGACCTGCATGA<br>GCGCCGACCTGGAAGTGGTCACATCTACCTGGGTTCTCG<br>TTGGAGGCGTTCTGGCTGCCCTGGCCGCTTATTGTCTGT<br>CTACCGGCTGTGTGGTCATCGTGGGCAGAATCGTGCTGT<br>CCGGCAAGCCTGCCATCATTCCCGATAGAGAGGTGCTGT<br>ACTGA |
| GD2-BBz-SMASh amino acid sequence (SEQ ID NO: 11)<br>CAR<br>GD2 scFv (14G2A)<br>CD8 alpha hinge<br>CD8 alpha transmembrane domain<br>4-1BB costimulatory domain<br>CD3 zeta domain<br>SMASh tag<br>cleavage site (italicized)-containing domain<br>NS3 protease domain<br>degron domain<br>NS4A cofactor domain | ILLTQTPLSLPVSLGDQASISCRSSQSLVHRNGNTYLHWYL<br>QKPGQSPKLLIHKVSNRFSGVPDRFSGSGSGTDFTLKISRV<br>EAEDLGVYFCSQSTHVPPLTFGAGTKLELKGSTSGSGKPG<br>SGEGSTKGEVKLQQSGPSLVEPGASVMISCKASGSSFTGY<br>NMNWVRQNIGKSLEWIGAIDPYYGGTSYNQKFKGRATLTV<br>DKSSSTAYMHLKSLTSEDSAVYYCVSGMEYWGQGTSVTV<br>SSAAATTTPAPRPPTPAPTIASQPLSLRPEACRPAAGGAV<br>HTRGLDFACDIYIWAPLAGTCGVLLLSLVITLYCKRGRKKLL<br>YIFKQPFMRPVQTTQEEDGCSCRFPEEEEGGCELRVKFSR<br>SADAPAYKQGQNQLYNELNLGRREEYDVLDKRRGRDPEM<br>GGKPRRKNPQEGLYNELQKDKMAEAYSEIGMKGERRRGK<br>GHDGLYQGLSTATKDTYDALHMQALPPRP_GDEMEECSQH_<br>_LPGAGSSGDIMDYKDDDDKGSSGTGSGSGTSAPITAYAQQ<br>TRGLLGCIITSLTGRDKNQVEGEVQIVSTATQTFLATCINGVC<br>WAVYHGAGTRTIASPKGPVIQMYTNVDQDLVGWPAPQGSR<br>SLTPCTCGSSDLYLVTRHADVIPVRRRGDSRGSLLSPRPISY<br>LKGSSGGPLLCPAGHAVGLFRAAVCTRGVAKAVDFIPVENL<br>ETTMRSPVFTDNSSPPAVTLTHPITKIDTKYIMTCMSADLEVV<br>TSTWVLVGGVLAALAAYCLSTGCVVIVGRIVLSGKPAIIPDRE<br>VLY_ |
| GD2-BBz-SMASh nucleotide sequence (SEQ ID NO: 12) | ATCCTGCTGACCCAGACCCCTCTGAGCCTGCCTGTGTCT<br>CTGGGCGATCAGGCCAGCATCAGCTGCAGATCCAGCCA<br>GAGCCTGGTGCACCGGAACGGCAACACCTACCTGCACT<br>GGTATCTGCAGAAGCCCGGCCAGAGCCCCAAGCTGCTG<br>ATTCACAAGGTGTCCAACCGGTTCAGCGGCGTGCCCGAC<br>AGATTTTCTGGCAGCGGCTCCGGCACCGACTTCACCCTG<br>AAGATCAGCCGGGTGGAAGCCGAGGACCTGGGCGTGTA<br>CTTCTGCAGCCAGTCCACCCACGTGCCCCCCCTGACATT<br>TGGCGCCGGAACAAAGCTGGAACTGAAGGGCAGCACGA<br>GCGGCAGCGGCAAGCCTGGATCTGGCGAGGGAAGCACC<br>AAGGGCGAAGTGAAGCTGCAGCAGAGCGGCCCCTCTCT<br>GGTGGAACCTGGCGCCTCTGTGATGATCTCCTGCAAGGC<br>CAGCGGCAGCTCCTTCACCGGCTACAACATGAACTGGGT<br>GCGCCAGAACATCGGCAAGAGCCTGGAATGGATCGGCG<br>CCATCGACCCCTACTACGGCGGCACCAGCTACAACCAGA<br>AGTTCAAGGGCAGAGCCACCCTGACCGTGGACAAGAGC<br>AGCTCCACCGCCTACATGCACCTGAAGTCCCTGACCAGC<br>GAGGACAGCGCCGTGTACTACTGCGTGTCCGGCATGGA<br>ATACTGGGGCCAGGGCACAAGCGTGACCGTGTCCTCTG<br>CGGCCGCAACAACAACACCAGCTCCTAGACCTCCAACTC<br>CTGCTCCTACAATCGCCAGCCGCTCTGTCTCTGAGGC<br>CTGAAGCTTGTAGACCTGCTGCTGGCGGAGCCGTGCATA<br>CCAGAGGACTGGATTTCGCCTGCGACATCTACATTTGGG<br>CCCCTCTGGCTGGAACATGTGGCGTGCTGCTGCTGTCTC<br>TGGTCATCACCCTGTACTGCAAGCGGGGCAGAAAGAAGC<br>TGCTGTACATCTTCAAGCAGCCCTTCATGCGGCCCCGTGC |

TABLE 1-continued

Example Polypeptides

|  |  |
|---|---|
|  | AGACCACACAAGAGGAAGATGGCTGCTCCTGCAGATTCC<br>CCGAGGAAGAAGAAGGCGGCTGCGAGCTGAGAGTGAAG<br>TTCTCTAGATCTGCCGACGCTCCCGCCTACAAGCAGGGC<br>CAGAATCAGCTGTACAACGAGCTGAACCTGGGGAGAAGA<br>GAAGAGTACGACGTGCTGGATAAGCGGAGAGGCAGAGA<br>TCCTGAGATGGGCGGCAAGCCCAGACGGAAGAATCCTCA<br>AGAGGGCCTGTATAATGAGCTGCAGAAAGACAAGATGGC<br>CGAGGCCTACAGCGAGATCGGAATGAAGGGCGAGCGCA<br>GAAGAGGCAAGGGCCACGATGGACTGTATCAGGGCCTG<br>AGCACAGCCACCAAGGATACCTATGATGCCCTGCACATG<br>CAGGCCCTTCCACCTAGACCTGGCGACGAAATGGAAGAG<br>TGTAGCCAGCATCTGCCTGGCGCCGGATCTAGCGGCGA<br>CATCATGGACTACAAGGACGACGACGATAAGGGCAGCTC<br>TGGCACAGGCTCTGGCTCTGGAACATCTGCCCCTATCAC<br>AGCCTACGCTCAGCAGACAAGAGGCCTGCTGGGCTGTAT<br>CATCACCAGCCTGACCGGCAGAGACAAGAACCAGGTTGA<br>GGGCGAAGTGCAGATCGTGTCTACCGCCACACAGACCTT<br>TCTGGCCACCTGTATCAATGGCGTGTGCTGGGCCGTTTA<br>TCACGGCGCTGGAACCAGAACAATCGCCTCTCCTAAGGG<br>CCCCGTGATCCAGATGTACACCAACGTGGACCAGGATCT<br>CGTTGGCTGGCCTGCTCCTCAGGGAAGCAGAAGCCTGA<br>CACCTTGTACCTGTGGCAGCAGCGATCTGTACCTGGTCA<br>CAAGACACGCCGATGTGATCCCTGTGCGGAGAAGAGGC<br>GATAGCAGAGGTTCTCTGCTGTCCCCTAGACCTATCAGC<br>TACCTGAAGGGATCTTCTGGCGGCCCTCTGCTGTGTCCT<br>GCTGGACATGCGTGGGACTGTTTAGAGCCGCCGTGTGT<br>ACAAGAGGCGTGGCCAAGGCTGTGGACTTCATCCCCGTG<br>GAAAACCTGGAAACCACCATGAGAAGCCCCGTGTTCACC<br>GACAATAGCAGCCCTCCAGCCGTGACACTGACACACCCC<br>ATCACCAAGATCGACACCAAGTACATCATGACCTGCATGA<br>GCGCCGACCTGGAAGTGGTCACATCTACCTGGGTTCTCG<br>TTGGAGGCGTTCTGGCTGCCCTGGCCGCTTATTGTCTGT<br>CTACCGGCTGTGTGGTCATCGTGGGCAGAATCGTGCTGT<br>CCGGCAAGCCTGCCATCATTCCCGATAGAGAGGTGCTGT<br>ACTGA |
| CD22-BBz-SMASh amino acid<br>sequence (SEQ ID NO: 13)<br>CAR<br>CD22 scFv (M971)<br>CD8 alpha hinge<br>CD8 alpha transmembrane<br>domain<br>4-1BB costimulatory domain<br>CD3 zeta<br>SMASh tag<br>cleavage site (italicized)-<br>containing domain<br>NS3 protease domain<br>degron domain<br>NS4A cofactor domain | QVQLQQSGPGLVKPSQTLSLTCAISGDSVSSNSAAWNWIR<br>QSPSRGLEWLGRTYYRSKWYNDYAVSVKSRITINPDTSKN<br>QFSLQLNSVTPEDTAVYYCAREVTGDLEDAFDIWGQGTMV<br>TVSSGGGGSDIQMTQSPSSLSASVGDRVTITCRASQTIWSY<br>LNWYQQRPGKAPNLLIYAASSLQSGVPSRFSGRGSGTDFT<br>LTISSLQAEDFATYYCQQSYSIPQTFGQGTKLEIKAAATTTP<br>APRPPTPAPTIASQPLSLRPEACRPAAGGAVHTRGLDFAC<br>DIYIWAPLAGTCGVLLLSLVITLYCKRGRKKLLYIFKQPFMR<br>PVQTTQEEDGCSCRFPEEEEGGCELRVKFSRSADAPAYK<br>QGQNQLYNELNLGRREEYDVLDKRRGRDPEMGGKPRRK<br>NPQEGLYNELQKDKMAEAYSEIGMKGERRRGKGHDGLYQ<br>GLSTATKDTYDALHMQALPPRPG*DEMEECS*QHLPGAGSS<br>GDIMDYKDDDDKGSSGTGSGSGTSAPITAYAQQTRGLLGCI<br>ITSLTGRDKNQVEGEVQIVSTATQTFLATCINGVCWAVYHGA<br>GTRTIASPKGPVIQMYTNVDQDLVGWPAPQGSRSLTPCTC<br>GSSDLYLVTRHADVIPVRRRGDSRGSLLSPRPISYLKGSSG<br>GPLLCPAGHAVGLFRAAVCTRGVAKAVDFIPVENLETTMRS<br>PVFTDNSSPPAVTLTHPITKIDTKYIMTCMSADLEVVTSTWVL<br>VGGVLAALAAYCLSTGCVVIVGRIVLSGKPAIIPDREVLY |
| CD22-BBz-SMASh nucleotide<br>sequence (SEQ ID NO: 14) | CAGGTGCAGCTGCAGCAGTCTGGCCCTGGCCTCGTGAA<br>GCCTAGCCAGACCCTGAGCCTGACCTGTGCCATCAGCG<br>GCGATAGCGTGTCCAGCAATAGCGCCGCCTGGAACTGG<br>ATCAGACAGAGCCCTAGCAGAGGCCTGGAATGGCTGGG<br>CCGGACCTACTACCGGTCCAAGTGGTACAACGACTACGC<br>CGTGTCCGTGAAGTCCCGGATCACCATCAACCCCGACAC<br>CAGCAAGAACCAGTTCTCCCTGCAGCTGAACAGCGTGAC<br>CCCCGAGGATACCGCCGTGTACTACTGCGCCAGAGAAGT<br>GACCGGCGACCTGGAAGATGCCTTCGACATCTGGGGCC<br>AGGGCACAATGGTCACCGTGTCTAGCGGAGGCGGCGGA<br>AGCGACATCCAGATGACACAGAGCCCAGCTCCCTGAGC<br>GCCAGCGTGGGAGACAGAGTGACCATCACCTGTCGGGC<br>CAGCCAGACCATCTGGTCCTACCTGAACTGGTATCAGCA<br>GCGGCCTGGCAAGGCCCCCAACCTGCTGATCTATGCCG<br>CCAGCTCACTGCAGAGCGGCGTGCCCAGCAGATTTTCCG<br>GCAGAGGCAGCGGCACCGACTTCACCCTGACAATCAGTT<br>CCCTGCAGGCCGAGGACTTCGCCACCTACTACTGCCAGC<br>AGAGCTACAGCATCCCCCAGACCTTCGGCCAGGGGACC<br>AAGCTGGAAATCAAAGCGGCCGCAACAACAACACCAGCT<br>CCTAGACCTCCAACTCCTGCTCCTACAATCGCCAGCCAG<br>CCTCTGTCTCTGAGGCCTGAAGCTTGTAGACCTGCTGCT<br>GGCGGAGCCGTGCATACCAGAGGACTGGATTTCGCCTG |

TABLE 1-continued

Example Polypeptides

```
CGACATCTACATTTGGGCCCCTCTGGCTGGAACATGTGG
CGTGCTGCTGCTGTCTCTGGTCATCACCCTGTACTGCAA
GCGGGGCAGAAAGAAGCTGCTGTACATCTTCAAGCAGCC
CTTCATGCGGCCCGTGCAGACCACACAAGAGGAAGATGG
CTGCTCCTGCAGATTCCCCGAGGAAGAAGAAGGCGGCT
GCGAG
CTGAGAGTGAAGTTCTCTAGATCTGCCGACGCTCCCGCC
TACAAGCAGGGCCAGAATCAGCTGTACAACGAGCTGAAC
CTGGGGAGAAGAGAAGAGTACGACGTGCTGGATAAGCG
GAGAGGCAGAGATCCTGAGATGGGCGGCAAGCCCAGAC
GGAAGAATCCTCAAGAGGGCCTGTATAATGAGCTGCAGA
AAGACAAGATGGCCGAGGCCTACAGCGAGATCGGAATGA
AGGGCGAGCGCAGAAGAGGCAAGGGCCACGATGGACTG
TATCAGGGCCTGAGCACAGCCACCAAGGATACCTATGAT
GCCCTGCACATGCAGGCCCTTCCACCTAGACCTGGCGAC
GAAATGGAAGAGTGTAGCCAGCATCTG
CCTGGCGCCGGATCTAGCGGCGACATCATGGACTACAAG
GACGACGACGATAAGGGCAGCTCTGGCACAGGCTCTGG
CTCTGGAACATCTGCCCCTATCACAGCCTACGCTCAGCA
GACAAGAGGCCTGCTGGGCTGTATCATCACCAGCCTGAC
CGGCAGAGACAAGAACCAGGTTGAGGGCGAAGTGCAGA
TCGTGTCTACCGCCACACAGACCTTTCTGGCCACCTGTAT
CAATGGCGTGTGCTGGGCCGTTTATCACGGCGCTGGAAC
CAGAACAATCGCCTCTCCTAAGGGCCCCGTGATCCAGAT
GTACACCAACGTGGACCAGGATCTCGTTGGCTGGCCTGC
TCCTCAGGGAAGCAGAAGCCTGACACCTTGTACCTGTGG
CAGCAGCGATCTGTACCTGGTCACAAGACACGCCGATGT
GATCCCTGTGCGGAGAAGAGGCGATAGCAGAGGTTCTCT
GCTGTCCCTAGACCTATCAGCTACCTGAAGGGATCTTCT
GGCGGCCCTCTGCTGTGTCCTGCTGGACATGCTGTGGG
ACTGTTTAGAGCCGCCGTGTGTACAAGAGGCGTGGCCAA
GGCTGTGGACTTCATCCCCGTGGAAAACCTGGAAACCAC
CATGAGAAGCCCCGTGTTCACCGACAATAGCAGCCCTCC
AGCCGTGACACTGACACACCCCATCACCAAGATCGACAC
CAAGTACATCATGACCTGCATGAGCGCCGACCTGGAAGT
GGTCACATCTACCTGGGTTCTCGTTGGAGGCGTTCTGGC
TGCCCTGGCCGCTTATTGTCTGTCTACCGGCTGTGTGGT
CATCGTGGGCAGAATCGTGCTGTCCGGCAAGCCTGCCAT
CATTCCCGATAGAGAGGTGCTGTACTGA
```

Also provided are expression vectors that include any of the nucleic acids of the present disclosure. A "vector" is capable of transferring nucleic acid sequences to target cells (e.g., viral vectors, non-viral vectors, particulate carriers, and liposomes). Typically, "vector construct," "expression vector," and "gene transfer vector," mean any nucleic acid construct capable of directing the expression of a nucleic acid of interest and which can transfer nucleic acid sequences to target cells. Thus, the term includes cloning and expression vehicles, as well as viral vectors.

In order to express a desired polypeptide, a nucleotide sequence encoding the polypeptide can be inserted into appropriate vector, e.g., using recombinant DNA techniques known in the art. Illustrative examples of viruses useful as vectors include, without limitation, retrovirus (including lentivirus), adenovirus, adeno-associated virus, herpesvirus (e.g., herpes simplex virus), poxvirus, baculovirus, papillomavirus, and papovavirus (e.g., SV40). Illustrative examples of expression vectors include, but are not limited to pClneo vectors (Promega) for expression in mammalian cells; pLenti4/V 5-DEST™, pLenti6/V 5-DEST™, murine stem cell virus (MSCV), MSGV, moloney murine leukemia virus (MMLV), and pLenti6.2/V5-GW/lacZ (Invitrogen) for lentivirus-mediated gene transfer and expression in mammalian cells. In particular embodiments, a nucleic acid sequence encoding a polypeptide of the present disclosure may be ligated into such expression vectors for the expression of the polypeptides in mammalian cells.

Expression control sequences, control elements, or regulatory sequences present in an expression vector are those non-translated regions of the vector—origin of replication, selection cassettes, promoters, enhancers, translation initiation signals (Shine Dalgarno sequence or Kozak sequence), introns, a polyadenylation sequence, 5' and 3' untranslated regions, and/or the like—which interact with host cellular proteins to carry out transcription and translation. Such elements may vary in their strength and specificity. Depending on the vector system and host utilized, any number of suitable transcription and translation elements, including ubiquitous promoters and inducible promoters may be used.

Components of the expression vector are operably linked such that they are in a relationship permitting them to function in their intended manner. In some embodiments, the term refers to a functional linkage between a nucleic acid expression control sequence (such as a promoter, and/or enhancer) and a second polynucleotide sequence, e.g., a nucleic acid encoding the polypeptide, where the expression control sequence directs transcription of the nucleic acid encoding the polypeptide.

In certain aspects, the expression vector is an episomal vector or a vector that is maintained extrachromosomally. As used herein, the term "episomal" refers to a vector that is able to replicate without integration into the host cell's chromosomal DNA and without gradual loss from a dividing host cell also meaning that said vector replicates extrachromosomally or episomally. Such a vector may be engineered to harbor the sequence coding for the origin of DNA replication or "ori" from an alpha, beta, or gamma herpesvirus, an adenovirus, SV40, a bovine papilloma virus, a yeast, or the like. The host cell may include a viral replication transactivator protein that activates the replication. Alpha herpes viruses have a relatively short reproductive cycle, variable host range, efficiently destroy infected cells and establish latent infections primarily in sensory ganglia. Illustrative examples of alpha herpes viruses include HSV 1, HSV 2, and VZV. Beta herpesviruses have long reproductive cycles and a restricted host range. Infected cells often enlarge. Non-limiting examples of beta herpes viruses include CMV, HHV-6 and HHV-7. Gamma-herpesviruses are specific for either T or B lymphocytes, and latency is often demonstrated in lymphoid tissue. Illustrative examples of gamma herpes viruses include EBV and HHV-8.

Cells

Also provided are cells that include any of the polypeptides, nucleic acids, and/or expression vectors of the present disclosure. In certain aspects, provided are cells where the CAR is expressed on the surface of the cell. By "expressed on the surface of the cell" is meant the CAR has been trafficked to the cell membrane such that the antigen-binding portion of the CAR is displayed on the cell surface, the transmembrane portion passes through the cell membrane, and the intracellular signaling domain is disposed adjacent to the intracellular side of the cell membrane. Upon binding of the antigen-binding portion of the CAR to the target antigen, the intracellular signaling domain of the CAR participates in transducing the signal from the binding into the interior of the effector cell (e.g., T cell) to elicit effector cell function.

In some embodiments, the cells are eukaryotic cells. Eukaryotic cells of interest include, but are not limited to, yeast cells, insect cells, mammalian cells, and the like. Mammalian cells of interest include, e.g., murine cells, non-human primate cells, human cells, and the like.

"Recombinant host cells," "host cells," "cells," "cell lines," "cell cultures," and other such terms denoting microorganisms or higher eukaryotic cell lines, refer to cells which can be, or have been, used as recipients for a recombinant vector or other transferred DNA, and include the progeny of the cell which has been transfected. Host cells may be cultured as unicellular or multicellular entities (e.g., tissue, organs, or organoids) including an expression vector of the present disclosure.

In certain aspects, a cell of the present disclosure is an immune cell. Non-limiting examples of immune cells which may include any of the polypeptides, nucleic acids, and/or expression vectors of the present disclosure include T cells, B cells, natural killer (NK) cells, a macrophages, monocytes, neutrophils, dendritic cells, mast cells, basophils, and eosinophils. In some embodiments, a cell of the present disclosure is a T cell. Non-limiting examples of T cells include naive T cells (TN), cytotoxic T cells ($T_c$), memory T cells (TMEM), T memory stem cells (TSCM), central memory T cells (TCM), effector memory T cells (TEM), tissue resident memory T cells (TRM), effector T cells (TEFF), regulatory T cells (Tregs), CD4 T cells, CD8 T cells, virus-specific T cells, and gamma delta T cells (γδ). In certain aspects, a cell of the present disclosure is a stem cell, e.g., an embryonic stem cell or an adult stem cell.

Also provided are methods of making the cells of the present disclosure. In some embodiments, such methods include transfecting or transducing cells with a nucleic acid or expression vector of the present disclosure. The term "transfection" is used to refer to the uptake of foreign DNA by a cell. A cell has been "transfected" when exogenous DNA has been introduced inside the cell membrane. A number of transfection techniques are generally known in the art. See, e.g., Sambrook et al. (2001) Molecular Cloning, a laboratory manual, $3^{rd}$ edition, Cold Spring Harbor Laboratories, New York, Davis et al. (1995) Basic Methods in Molecular Biology, 2nd edition, McGraw-Hill, and Chu et al. (1981) Gene 13:197. Such techniques can be used to introduce one or more exogenous DNA moieties into suitable host cells. The term refers to both stable and transient uptake of the genetic material.

In some embodiments, a cell of the present disclosure is produced by transducing the cell with a viral vector encoding the polypeptide. In certain aspects, the polypeptide includes a CAR and the cell is a T cell, such that provided are methods of producing a CAR T cell. In some embodiments, such methods include activating a population of T cells (e.g., T cells obtained from an individual to which a CAR T cell therapy will be administered), stimulating the population of T cells to proliferate, and transducing the T cell with a viral vector encoding the polypeptide including the CAR. In some embodiments, the T cells are transduced with a retroviral vector, e.g., a gamma retroviral vector or lentiviral vector, encoding the polypeptide. In certain aspects, the T cells are transduced with a lentiviral vector encoding the polypeptide.

Cells of the present disclosure may be autologous/autogeneic ("self") or non-autologous ("non-self," e.g., allogeneic, syngeneic or xenogeneic). "Autologous" as used herein, refers to cells from the same individual. "Allogeneic" as used herein refers to cells of the same species that differ genetically from the cell in comparison. "Syngeneic," as used herein, refers to cells of a different individual that are genetically identical to the cell in comparison. In some embodiments, the cells are T cells obtained from a mammalian individual. In certain aspects, the mammalian individual is a primate. In some embodiments, the T cells are obtained from a human.

T cells may be obtained from a number of sources including, but not limited to, peripheral blood, peripheral blood mononuclear cells, bone marrow, lymph node tissue, cord blood, thymus tissue, tissue from a site of infection, ascites, pleural effusion, spleen tissue, and tumors. In certain embodiments, T cells can be obtained from a unit of blood collected from an individual using any number of known techniques such as sedimentation, e.g., FICOLL™ separation.

In some embodiments, an isolated or purified population of T cells is used. In some embodiments, after isolation of PBMC, both cytotoxic and helper T lymphocytes can be sorted into naive, memory, and effector T cell subpopulations either before or after activation, expansion, and/or genetic modification. Suitable approaches for such sorting are known and include, e.g., magnetic-activated cell sorting (MACS), where TN are $CD45RA^+$ $CD62L^+$ $CD95^-$; TSCM are $CD45RA^+$ $CD62L^+$ $CD95^+$; TCM are $CD45RO^+$ $CD62L^+$ $CD95^+$; and TEM are $CD45RO^+$ $CD62L^-$ $CD95^+$. An example approach for such sorting is described in Wang et al. (2016) *Blood* 127(24):2980-90.

A specific subpopulation of T cells expressing one or more of the following markers: CD3, CD4, CD8, CD28, CD45RA, CD45RO, CD62, CD127, and HLA-DR can be further isolated by positive or negative selection techniques. In one embodiment, a specific subpopulation of T cells, expressing one or more of the markers selected from the group consisting of CD62L, CCR7, CD28, CD27, CD122, CD127, CD197; or CD38 or CD62L, CD127, CD197, and CD38, is further isolated by positive or negative selection techniques. In various embodiments, the manufactured T cell compositions do not express or do not substantially express one or more of the following markers: CD57, CD244, CD 160, PD-1, CTLA4, TIM3, and LAG3.

In order to achieve sufficient therapeutic doses of T cell compositions, the T cells may be subjected to one or more rounds of stimulation, activation and/or expansion. T cells can be activated and expanded generally using methods as described, for example, in U.S. Pat. Nos. 6,352,694; 6,534,055; 6,905,680; 6,692,964; 5,858,358; 6,887,466; 6,905,681; 7,144,575; 7,067,318; 7,172,869; 7,232,566; 7,175,843; 5,883,223; 6,905,874; 6,797,514; and 6,867,041, each of which is incorporated herein by reference in its entirety for all purposes. In particular embodiments, T cells are activated and expanded for about 1 to 21 days, e.g., about 5 to 21 days. In some embodiments, T cells are activated and expanded for about 1 day to about 4 days, about 1 day to about 3 days, about 1 day to about 2 days, about 2 days to about 3 days, about 2 days to about 4 days, about 3 days to about 4 days, or about 1 day, about 2 days, about 3 days, or about 4 days prior to introduction of a nucleic acid (e.g., expression vector) encoding the polypeptide into the T cells.

In particular embodiments, T cells are activated and expanded for about 6 hours, about 12 hours, about 18 hours or about 24 hours prior to introduction of the genome editing compositions into the T cells. In certain aspects, T cells are activated at the same time that a nucleic acid (e.g., expression vector) encoding the polypeptide is introduced into the T cells.

In some embodiments, conditions appropriate for T cell culture include an appropriate media (e.g., Minimal Essential Media or RPMI Media 1640 or, X-vivo 15, (Lonza)) and one or more factors necessary for proliferation and viability including, but not limited to serum (e.g., fetal bovine or human serum), interleukin-2 (IL-2), insulin, IFN-γ, IL-4, IL-7, IL-21, GM-CSF, IL-10, IL-12, IL-15, TGFβ, and TNF-α or any other additives suitable for the growth of cells known to the skilled artisan. Further illustrative examples of cell culture media include, but are not limited to RPMI 1640, Clicks, AEVI-V, DMEM, MEM, a-MEM, F-12, X-Vivo 15, and X-Vivo 20, Optimizer, with added amino acids, sodium pyruvate, and vitamins, either serum-free or supplemented with an appropriate amount of serum (or plasma) or a defined set of hormones, and/or an amount of cytokine(s) sufficient for the growth and expansion of T cells.

In some embodiments, the nucleic acid (e.g., expression vector) encoding the polypeptide is introduced into the cell (e.g., a T cell) by microinjection, transfection, lipofection, heat-shock, electroporation, transduction, gene gun, microinjection, DEAE-dextran-mediated transfer, and the like. In certain aspects, the nucleic acid (e.g., expression vector) encoding the polypeptide is introduced into the cell (e.g., a T cell) by AAV transduction. The AAV vector may comprise ITRs from AAV2, and a serotype from any one of AAV1, AAV2, AAV3, AAV4, AAV5, AAV6, AAV7, AAV8, AAV9, or AAV 10. In preferred embodiments, the AAV vector may comprise ITRs from AAV2 and a serotype from AAV6. In some embodiments, the nucleic acid (e.g., expression vector) encoding the polypeptide is introduced into the cell (e.g., a T cell) by lentiviral transduction. The lentiviral vector backbone may be derived from HIV-1, HIV-2, visna-maedi virus (VMV) virus, caprine arthritis-encephalitis virus (CAEV), equine infectious anemia virus (EIAV), feline immunodeficiency virus (FIV), bovine immune deficiency virus (BIV), or simian immunodeficiency virus (SIV). The lentiviral vector may be integration competent or an integrase deficient lentiviral vector (TDLV). In one embodiment, IDLV vectors including an HIV-based vector backbone (i.e., HIV cis-acting sequence elements) are employed.

Also provided are viruses that include any of the polypeptides, nucleic acids, and/or expression vectors of the present disclosure.

Compositions

Also provided by the present disclosure are compositions. A composition of the present disclosure may include any of the polypeptides, nucleic acids, expression vectors, and/or cells of the present disclosure.

In certain aspects, the compositions include any of the polypeptides, nucleic acids, expression vectors, and/or cells of the present disclosure present in a liquid medium. The liquid medium may be an aqueous liquid medium, such as water, a buffered solution, or the like. One or more additives such as a salt (e.g., NaCl, $MgCl_2$, KCl, $MgSO_4$), a buffering agent (a Tris buffer, N-(2-Hydroxyethyl)piperazine-N'-(2-ethanesulfonic acid) (HEPES), 2-(N-Morpholino)ethanesulfonic acid (MES), 2-(N-Morpholino)ethanesulfonic acid sodium salt (MES), 3-(N-Morpholino)propanesulfonic acid (MOPS), N-tris[Hydroxymethyl]methyl-3-aminopropane-sulfonic acid (TAPS), etc.), a solubilizing agent, a detergent (e.g., a non-ionic detergent such as Tween-20, etc.), a nuclease inhibitor, glycerol, a chelating agent, and the like may be present in such compositions.

Pharmaceutical compositions are also provided. The pharmaceutical compositions may include any of the cells of the present disclosure, and a pharmaceutically acceptable carrier. The pharmaceutical compositions generally include a therapeutically effective amount of the cells. By "therapeutically effective amount" is meant a number of cells sufficient to produce a desired result, e.g., an amount sufficient to effect beneficial or desired therapeutic (including preventative) results, such as a reduction in a symptom of a disease or disorder associated, e.g., with the target cell or a population thereof, as compared to a control. An effective amount can be administered in one or more administrations.

The cells of the present disclosure can be incorporated into a variety of formulations for therapeutic administration. More particularly, the cells of the present disclosure can be formulated into pharmaceutical compositions by combination with appropriate, pharmaceutically acceptable excipients or diluents.

Formulations of the cells suitable for administration to a patient (e.g., suitable for human administration) are generally sterile and may further be free of detectable pyrogens or other contaminants contraindicated for administration to a patient according to a selected route of administration.

The cells may be formulated for parenteral (e.g., intravenous, intra-arterial, intraosseous, intramuscular, intracerebral, intracerebroventricular, intrathecal, subcutaneous, etc.) administration, or any other suitable route of administration.

Pharmaceutical compositions that include the cells of the present disclosure may be prepared by mixing the cells having the desired degree of purity with optional physiologically acceptable carriers, excipients, stabilizers, surfactants, buffers and/or tonicity agents. Acceptable carriers, excipients and/or stabilizers are nontoxic to recipients at the dosages and concentrations employed, and include buffers such as phosphate, citrate, and other organic acids; antioxidants including ascorbic acid, glutathione, cysteine, methionine and citric acid; preservatives (such as ethanol, benzyl alcohol, phenol, m-cresol, p-chlor-m-cresol, methyl or propyl parabens, benzalkonium chloride, or combinations thereof); amino acids such as arginine, glycine, ornithine, lysine, histidine, glutamic acid, aspartic acid, isoleucine, leucine, alanine, phenylalanine, tyrosine, tryptophan, methionine, serine, proline and combinations thereof; monosaccharides, disaccharides and other carbohydrates; low molecular weight (less than about 10 residues) polypeptides; proteins, such as gelatin or serum albumin; chelating agents such as EDTA; sugars such as trehalose, sucrose, lactose, glucose, mannose, maltose, galactose, fructose, sorbose, raffinose, glucosamine, N-methylglucosamine, galactosamine, and neuraminic acid; and/or non-ionic surfactants such as Tween, Brij Pluronics, Triton-X, or polyethylene glycol (PEG).

An aqueous formulation of the polypeptides, nucleic acids, expression vectors, and/or cells may be prepared in a pH-buffered solution, e.g., at pH ranging from about 4.0 to about 7.0, or from about 5.0 to about 6.0, or alternatively about 5.5. Examples of buffers that are suitable for a pH within this range include phosphate-, histidine-, citrate-, succinate-, acetate-buffers and other organic acid buffers. The buffer concentration can be from about 1 mM to about 100 mM, or from about 5 mM to about 50 mM, depending, e.g., on the buffer and the desired tonicity of the formulation.

A tonicity agent may be included in the formulation to modulate the tonicity of the formulation. Example tonicity agents include sodium chloride, potassium chloride, glycerin and any component from the group of amino acids, sugars as well as combinations thereof. In some embodiments, the aqueous formulation is isotonic, although hypertonic or hypotonic solutions may be suitable. The term "isotonic" denotes a solution having the same tonicity as some other solution with which it is compared, such as physiological salt solution or serum. Tonicity agents may be used in an amount of about 5 mM to about 350 mM, e.g., in an amount of 100 mM to 350 mM.

A surfactant may also be added to the formulation to reduce aggregation and/or minimize the formation of particulates in the formulation and/or reduce adsorption. Example surfactants include polyoxyethylensorbitan fatty acid esters (Tween), polyoxyethylene alkyl ethers (Brij), alkylphenylpolyoxyethylene ethers (Triton-X), polyoxyethylene-polyoxypropylene copolymer (Poloxamer, Pluronic), and sodium dodecyl sulfate (SDS). Examples of suitable polyoxyethylenesorbitan-fatty acid esters are polysorbate 20, (sold under the trademark Tween 20™) and polysorbate 80 (sold under the trademark Tween 80™). Examples of suitable polyethylene-polypropylene copolymers are those sold under the names Pluronic® F68 or Poloxamer 188™. Examples of suitable Polyoxyethylene alkyl ethers are those sold under the trademark Brij™. Example concentrations of surfactant may range from about 0.001% to about 1% w/v.

In some embodiments, the pharmaceutical composition includes cells of the present disclosure, and one or more of the above-identified agents (e.g., a surfactant, a buffer, a stabilizer, a tonicity agent) and is essentially free of one or more preservatives, such as ethanol, benzyl alcohol, phenol, m-cresol, p-chlor-m-cresol, methyl or propyl parabens, benzalkonium chloride, and combinations thereof. In other embodiments, a preservative is included in the formulation, e.g., at concentrations ranging from about 0.001 to about 2% (w/v).

In certain aspects, provided is a pharmaceutical composition that includes a therapeutically effective amount of cells (e.g., T cells, such as CAR T cells) of the present disclosure. A "therapeutically effective amount" of such cells may vary according to factors such as the disease state, age, sex, and weight of the individual, and the ability of the cells to elicit a desired response in the individual. A therapeutically effective amount is also one in which any toxic or detrimental effects of the cells are outweighed by the therapeutically beneficial effects. The term "therapeutically effective amount" includes an amount that is effective to "treat" an individual (e.g., a patient). When a therapeutic amount is indicated, the precise amount of the compositions contemplated in particular embodiments, to be administered, can be determined by a physician in view of the specification and with consideration of individual differences in age, weight, tumor size, extent of infection or metastasis, and condition of the patient (individual). In certain aspects, a pharmaceutical composition of the present disclosure includes from $1\times10^6$ to $5\times10^{10}$ of the cells of the present disclosure.

Methods of Use

Also provided are methods that employ the polypeptides, nucleic acids, expression vectors, and/or cells of the present disclosure.

In certain aspects, a method for controlling the expression of a CAR on the surface of a cell is provided. Such methods include contacting a cell of the present disclosure with an inhibitor of the protease when expression of the CAR on the surface of the cell is not desired. In some embodiments, prior to the contacting, the method includes allowing the cell to express the CAR on the surface of the cell. In certain aspects the methods further include ceasing the contacting to express the CAR on the surface of the cell. In some embodiments, the protease is derived from HCV NS3, and the inhibitor of the protease is selected from the group consisting of asunaprevir (ASV), danoprevir (DPV), simeprevir (SPV), and grazoprevir (GPV). The methods may be carried out in vitro or ex vivo (e.g., in cultured cells), or in vivo, e.g., in an individual in a therapeutic context (e.g., an individual receiving a regulatable CAR cell-based therapy of the present disclosure).

In some embodiments, provided are methods of administering a regulatable CAR cell-based therapy to an individual in need thereof. In certain aspects, the individual in need thereof has cancer, and the antigen-binding portion of the CAR binds to a molecule on the surface of cells of the cancer. The methods of administering a regulatable CAR cell-based therapy to the individual include administering to the individual a pharmaceutical composition that includes a cell that includes any of the nucleic acids or expression vectors of the present disclosure. The pharmaceutical composition typically includes a therapeutically effective amount of such cells as described above. The cells may be any cells capable of effecting the desired therapy. In some embodiments, the cells are immune cells. Non-limiting examples of immune cells which may be administered include T cells, B cells, natural killer (NK) cells, macrophages, monocytes, neutrophils, dendritic cells, mast cells, basophils, and eosinophils. In some embodiments, the cells are T cells. In some embodiments, the cells are T cells such that the cells are CAR T cells. In certain aspects, the cells are stem cells, e.g., embryonic stem cells or adult stem cells. In some embodiments, the pharmaceutical composition is produced by a method including removing cells from the individual and introducing into the removed cells or progeny thereof the desired nucleic acid or expression vector.

The methods of administering a regulatable cell-based therapy to an individual may further include contacting the administered cells or progeny thereof with an inhibitor of the protease when expression of the CAR on the surface of the administered cells or progeny thereof is not desired, where the contacting includes administering the inhibitor of the protease to the individual. Contacting the administered cells or progeny thereof with the inhibitor may include administering to the individual an amount of the inhibitor effective to inhibit the protease of the polypeptides. As just one example, when the protease is derived from HCV NS3 as described elsewhere herein, the contacting may include administering to the individual by a suitable route of administration simeprevir, danoprevir, asunaprevir, ciluprevir, boceprevir, sovaprevir, paritaprevir, telaprevir, or any combination thereof, in an amount effective to inhibit the protease of the polypeptides in the administered cells or progeny thereof. According to the methods of administering a regulatable cell-based therapy to an individual, the inhibitor of the protease may be administered to the individual prior to, concurrently with (that is, co-administered), and/or subsequent to administration of the pharmaceutical composition to the individual. In the methods of administering a regulatable cell-based therapy to an individual, expression of the CAR on the surface of the administered cells or progeny thereof may not be desired for one or more reasons. For example, such expression may not be desired in order to prevent or delay the onset of cell exhaustion (e.g., T cell exhaustion) resulting from CAR activity. As such, the inhibitor of the protease may be administered to the individual to prevent or delay the onset of cell exhaustion resulting from CAR activity. As another example, such expression may not be desired in order to reduce adverse side effects caused by the cells or progeny thereof, e.g., side effects relating to activity of the CAR expressed on the surface of the cells or progeny thereof.

According to the methods of administering a regulatable CAR cell-based therapy which include contacting the administered cells or progeny thereof with an inhibitor of the protease when expression of the CAR on the surface of the administered cells or progeny thereof is not desired, the methods may include administering the pharmaceutical composition to the individual prior to the contacting to allow expression of the CAR on the surface of the cells or progeny thereof in the individual, and subsequently administering the inhibitor of the protease to the individual when expression of the CAR on the surface of the cells or progeny thereof is no longer desired. Expression of the CAR on the surface of the cells or progeny thereof may no longer be desired for one or more reasons. For example, expression of the CAR on the surface of the cells or progeny thereof may no longer be desired in order to delay or prevent cell exhaustion resulting from CAR activity. Accordingly, the methods may include administering the protease to the individual to delay or prevent cell exhaustion resulting from CAR activity. Alternatively, or additionally, expression of the CAR on the surface of the cells or progeny thereof may no longer be desired because of adverse side effects caused by the cells or progeny thereof, such that the methods may include administering the protease to the individual to reduce adverse side effects caused by the cells or progeny thereof. Adverse side effects may include, but are not limited to, toxicity resulting from, e.g., unrestricted antigen-driven proliferation of the cells. Such toxicity may include cytokine release syndrome and/or neurotoxicity. Accordingly, the methods may include administering the protease to the individual to reduce adverse side effects caused by the cells or progeny thereof.

The methods of administering a regulatable cell-based therapy to an individual may further include administering to the individual a pharmacokinetic enhancer of the inhibitor of the protease. In certain embodiments, the pharmacokinetic enhancer increases the level of the inhibitor of the protease in the individual compared to the level of the inhibitor of the protease in the individual in the absence of administering the pharmacokinetic enhancer. The pharmacokinetic enhancer may vary depending upon the particular protease inhibitor employed. According to some embodiments, the pharmacokinetic enhancer is an inhibitor of an enzyme that metabolizes the inhibitor of the protease. For example, in certain embodiments, the inhibitor of the protease (e.g., grazoprevir and the like) is metabolized by a cytochrome P450 (CYP) enzyme, and the pharmacokinetic enhancer is an inhibitor of the CYP enzyme. A non-limiting example of such a pharmacokinetic enhancer is ritonavir. The methods of administering a regulatable cell-based therapy to an individual may further include, subsequent to contacting the administered cells or progeny thereof with an inhibitor of the protease (e.g., to delay or prevent cell exhaustion, address adverse side effects, and/or the like), ceasing the contacting to express the CAR on the surface of the cells or progeny thereof.

When the protease of the polypeptide is derived from HCV NS3, the methods of administering a regulatable cell-based therapy to an individual may involve administering a protease inhibitor selected from the group consisting of asunaprevir (ASV), danoprevir (DPV), simeprevir (SPV), and grazoprevir (GPV).

The methods of administering a regulatable cell-based therapy to an individual may further include producing the pharmaceutical composition. Producing the pharmaceutical composition may include introducing an expression vector of the present disclosure into cells or progeny thereof obtained from the individual. The introducing may include contacting the cells or progeny thereof obtained from the individual with an inhibitor of the protease prior to administering the pharmaceutical composition to the individual.

Methods that employ the cells of the present disclosure may be used in a variety of applications. For example, SMASh-mediated regulation of CARs could be used to enhance T cell function of engineered populations (cytotoxicity, proliferative capacity, cytokine secretion) during ex vivo expansion for adoptive transfer since diminished CAR expression would inhibit both tonic signaling (which can lead to exhaustion) and inhibit antigen induced signaling which can also lead to exhaustion in vivo. In vivo modulation of CAR signaling pathways in endogenous and/or transferred T cells in the context of chronic infection or cancer could lead to enhanced function.

SMASh-mediated regulation of CARs could potentially be used for localized regulation of receptor expression. For instance, if the small molecule protease inhibitor utilized to reduce receptor expression does not cross the blood:brain barrier, then one could achieve selective expression of a receptor within the CNS, which could be desirable in some circumstances. A further application is to enhance safety of genetically engineered populations since administration of an inhibitor of the protease can rapidly and potently diminish expression of a SMASh-regulated CAR on the surface of cells. A drug off system such as this is useful for enhancing the safety of engineered T cells including CAR T cells, where unrestricted antigen driven proliferation can lead to significant toxicity including cytokine release syndrome and neurotoxicity. Use of the SMASh-CARs allows regulated cell surface expression of the CAR for enhanced safety.

Kits

Also provided by the present disclosure are kits. In some embodiments, provided are kits that include any of the nucleic acids and/or expression vectors of the present disclosure, and instructions for introducing the nucleic acid or expression vector into a cell. The kits find use in a variety of in vitro, ex vivo, and in vivo applications. The instructions of such kits may further include instructions for regulatable expression of the CAR on the surface of the cell or progeny thereof. The instructions of such kits may further include instructions for contacting the cell or progeny thereof with an inhibitor of the protease when expression of the CAR on the surface of the cell or progeny thereof is not, or no longer, desired.

The kits of the present disclosure may further include any other reagents useful for regulatable expression of the CAR on the surface of the cell or progeny thereof, such as transfection/transduction reagents useful for introducing the nucleic acid or expression vector into a cell of interest, e.g., a T cell or other cell of interest.

In some embodiments, the kits further include an inhibitor of the protease of the polypeptide. For example, when a protease derived from HCV NS3 as described elsewhere herein is employed, the kit may include a suitable inhibitor of the protease, including but not limited to, imeprevir, danoprevir, asunaprevir, grazoprevir, simeprevir, ciluprevir, boceprevir, sovaprevir, paritaprevir, telaprevir, or any combination thereof. Kits that include an inhibitor of the protease may further include instructions for contacting the cell or progeny thereof with the inhibitor when cell surface expression of the CAR is no longer desired.

Components of the kits may be present in separate containers, or multiple components may be present in a single container. A suitable container includes a single tube (e.g., vial), one or more wells of a plate (e.g., a 96-well plate, a 384-well plate, etc.), or the like.

The instructions of the kits may be recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or sub-packaging), etc. In other embodiments, the instructions are present as an electronic storage data file present on a suitable computer readable storage medium, e.g., portable flash drive, DVD, CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, the means for obtaining the instructions is recorded on a suitable substrate.

Notwithstanding the appended claims, the present disclosure is also defined by the following clauses:

1. A polypeptide comprising from N-terminus to C-terminus:
    a chimeric antigen receptor (CAR);
    a protease; and
    a degron,
    wherein the polypeptide further comprises a cleavage site for the protease disposed between the CAR and the degron.
2. The polypeptide of clause 1, wherein the cleavage site is between the CAR and the protease.
3. The polypeptide of clause 1, wherein the cleavage site is between the protease and the degron.
4. The polypeptide of clause 2, further comprising a spacer domain between the CAR and the cleavage site.
5. The polypeptide of clause 3, further comprising a spacer domain between the CAR and the cleavage site.
6. The polypeptide of clause 4 or clause 5, wherein the spacer domain comprises a linker.
7. The polypeptide of any one of clauses 4 to 6, wherein the spacer domain comprises a reporter.
8. The polypeptide of clause 7, wherein the reporter is a bioluminescence reporter.
9. The polypeptide of clause 8, wherein the bioluminescence reporter is a luciferase.
10. The polypeptide of any one of clauses 4 to 9, wherein the spacer domain decreases the response time of the polypeptide to an inhibitor of the protease.
11. The polypeptide of any one of clauses 1 to 10, wherein the antigen-binding portion of the CAR is an antibody.
12. The polypeptide of clause 11, wherein the antibody is a single chain variable fragment (scFv).
13. The polypeptide of any one of clauses 1 to 12, wherein the antigen-binding portion of the CAR specifically binds an antigen on the surface of a cancer cell.
14. The polypeptide of clause 13, wherein the antigen on the surface of the cancer cell is a tumor-associated antigen or a tumor-specific antigen.
15. The polypeptide of clause 13, wherein the antigen on the surface of the cancer cell is selected from the group consisting of: B7-H3 (CD276), CD19, GD2, CD22, and HER2.
16. The polypeptide of any one of clauses 1 to 15, wherein the protease is a viral protease.
17. The polypeptide of clause 16, wherein the protease is derived from hepatitis C virus (HCV) nonstructural protein 3 (NS3).
18. The polypeptide of clause 17, wherein the protease further comprises a cofactor polypeptide derived from HCV nonstructural protein 4A (NS4A).
19. The polypeptide of clause 17 or clause 18, wherein the protease is engineered to include one or more amino acid substitutions relative to a wild-type HCV NS3 protease.
20. The polypeptide of clause 19, wherein the protease comprises an amino acid sequence that is at least 80% identical, at least 85% identical, at least 90% identical, at least 95% identical, at least 99% identical, or 100% identical, to the amino acid sequence set forth in SEQ ID NO:2, which protease comprises an alanine at position 54, and wherein numbering is as in SEQ ID NO:2.
21. The polypeptide of any one of clauses 1 to 20, wherein the cleavage site for the protease is selected from the group consisting of: an NS4A/4B junction cleavage site, an NS3/NS4A junction cleavage site, an NS4A/NS4B junction cleavage site, an NS4B/NS5A junction cleavage site, and an NS5A/NS5B junction cleavage site.
22. The polypeptide of any one of clauses 1 to 21, wherein the degron comprises portions of the HCV nonstructural proteins NS3 and NS4A.
23. The polypeptide of clause 22, wherein the degron comprises an amino acid sequence that is at least 80% identical, at least 85% identical, at least 90% identical, at least 95% identical, or 100% identical, to the amino acid sequence set forth in SEQ ID NO:1.
24. A cell comprising the polypeptide of any one of clauses 1 to 23.
25. The cell of clause 24, wherein the cell is a mammalian cell.
26. The cell of clause 25, wherein the cell is a human cell.
27. The cell of any one of clauses 24 to 26, wherein the cell is an immune cell.
28. The cell of clause 27, wherein the cell is a T cell.
29. The cell of any one of clauses 24 to 28, wherein the CAR is expressed on the surface of the cell.
30. A pharmaceutical composition, comprising:
    the cell of any one of clauses 24 to 29; and
    a pharmaceutically-acceptable carrier.
31. A nucleic acid encoding the polypeptide of any one of clauses 1 to 23.
32. An expression vector comprising the nucleic acid of clause 31.

33. A cell comprising the nucleic acid of clause 31 or the expression vector of clause 32.
34. The cell of clause 33, wherein the cell is a mammalian cell.
35. The cell of clause 34, wherein the cell is a human cell.
36. The cell of any one of clauses 33 to 35, wherein the cell is an immune cell.
37. The cell of clause 36, wherein the cell is a T cell.
38. A method of making the cell of any one of clauses 33 to 37, comprising introducing the nucleic acid of clause 31 or the expression vector of clause 32 into the cell.
39. A method for controlling the expression of a CAR on the surface of a cell, comprising:
    contacting the cell of any one of clauses 33 to 37 with an inhibitor of the protease when expression of the CAR on the surface of the cell is not desired.
40. The method according to clause 39, wherein the protease is derived from HCV NS3, and wherein the inhibitor of the protease is selected from the group consisting of: asunaprevir (ASV), danoprevir (DPV), simeprevir (SPV), grazoprevir (GPV), and any combination thereof.
41. The method according to clause 39 or clause 40, wherein prior to the contacting, the cell is allowed to express the CAR on the surface of the cell.
42. The method according to any one of clauses 39 to 41, further comprising ceasing the contacting to express the CAR on the surface of the cell.
43. The method according to any one of clauses 39 to 42, wherein the method is performed in vitro.
44. The method according to any one of clauses 39 to 42, wherein the method is performed ex vivo.
45. The method according to any one of clauses 39 to 42, wherein the method is performed in vivo.
46. A pharmaceutical composition, comprising:
    the cell of any one of clauses 33 to 37; and
    a pharmaceutically-acceptable carrier.
47. A method of making the pharmaceutical composition of clause 46, comprising introducing the expression vector of clause 32 into cells obtained from an individual.
48. A method of administering a regulatable CAR cell-based therapy to an individual in need thereof, comprising administering to the individual the pharmaceutical composition of clause 46.
49. The method according to clause 48, further comprising contacting the administered cells or progeny thereof with an inhibitor of the protease when expression of the CAR on the surface of the administered cells or progeny thereof is not desired, wherein the contacting comprises administering the inhibitor of the protease to the individual.
50. The method according to clause 49, wherein the inhibitor of the protease is administered to the individual prior to administration of the pharmaceutical composition.
51. The method according to clause 49 or clause 50, wherein the pharmaceutical composition and the inhibitor of the protease are co-administered to the individual.
52. The method according to any one of clauses 49 to 51, wherein the inhibitor of the protease is administered to the individual to prevent or delay the onset of cell exhaustion resulting from CAR activity.
53. The method according to clause 49, comprising:
    administering the pharmaceutical composition to the individual prior to the contacting to allow expression of the CAR on the surface of the cells or progeny thereof in the individual; and
    administering the inhibitor of the protease to the individual when expression of the CAR on the surface of the cells or progeny thereof is no longer desired.
54. The method according to clause 53, wherein the inhibitor of the protease is administered to the individual to delay or prevent cell exhaustion resulting from CAR activity.
55. The method according to clause 53 or clause 54, wherein the inhibitor of the protease is administered to the individual to reduce adverse side effects caused by the cells or progeny thereof.
56. The method according to any one of clauses 49 to 55, further comprising ceasing the contacting to express the CAR on the surface of the cells or progeny thereof.
57. The method according to any one of clauses 49 to 56, wherein the protease is derived from HCV NS3, and wherein the inhibitor of the protease is selected from the group consisting of: asunaprevir (ASV), danoprevir (DPV), simeprevir (SPV), and grazoprevir (GPV).
58. The method according to any one of clauses 48 to 57, further comprising administering to the individual a pharmacokinetic enhancer of the inhibitor of the protease.
59. The method according to clause 58, wherein the pharmacokinetic enhancer is an inhibitor of an enzyme that metabolizes the inhibitor of the protease.
60. The method according to clause 59, wherein the pharmacokinetic enhancer is an inhibitor of a cytochrome P450 (CYP) enzyme that metabolizes the inhibitor of the protease.
61. The method according to clause 60, wherein the pharmacokinetic enhancer is ritonavir.
62. The method according to clause 61, wherein the inhibitor of the protease is grazoprevir.
63. The method according to any one of clauses 48 to 62, further comprising producing the pharmaceutical composition.
64. The method according to clause 63, wherein producing the pharmaceutical composition comprises introducing the expression vector of clause 32 into cells or progeny thereof obtained from the individual.
65. The method according to clause 64, comprising contacting the cells obtained from the individual, or progeny thereof, with an inhibitor of the protease prior to administering the pharmaceutical composition to the individual.
66. A kit, comprising:
    the nucleic acid of clause 31 or the expression vector of clause 32; and
    instructions for introducing the nucleic acid or expression vector into a cell.
67. The kit of clause 66, wherein the instructions further comprise instructions for regulatable expression of the CAR on the surface of the cell or progeny thereof.
68. The kit of clause 67, wherein the instructions comprise instructions for contacting the cell or progeny thereof with an inhibitor of the protease when expression of the CAR on the surface of the cell or progeny thereof is not desired.
69. The kit of any one of clauses 66 to 68, further comprising an inhibitor of the protease.

The following examples are offered by way of illustration and not by way of limitation.

EXPERIMENTAL

Example 1—SMASh CARs: Engineered Protein Expression in Human Cells Using Drug Regulatable Proteases Materials and Methods Materials
Asunaprevir (ASV), danoprevir (DPV), simeprevir (SPV), and grazoprevir (GPV) were purchased from ApexBio. Cell surface markers were stained with mouse monoclonal antibodies targeting PD-1 (PE-Cy7, eBioscience), LAG3 (PE, eBioscience), Tim-3 (BV 510, BioLegend), and B7-H3 (PE, R&D Systems). CAR molecules were stained with recombinant B7-H3 Fc (R&D Systems), protein L (Pierce Protein Biology), 1A7 anti-idiotype antibody, or FMC63 anti-idiotype antibody 136.20.1 conjugated in house using DyLight 650 Antibody Labeling Kit (Thermo Fisher). T cells were cultured in AIM V (Thermo Fisher) supplemented with 5% fetal bovine serum (Gibco), 100 U/mL rhIL-2 (PeproTech), 2 mM L-glutamine, 10 mM HEPES, 100 U/mL penicillin, and 100 mg/mL streptomycin (Invitrogen). Cancer cell lines were cultured in RPMI (Thermo Fisher) supplemented with 10% fetal bovine serum, 2 mM L-glutamine, 10 mM HEPES, 100 U/mL penicillin, and 100 mg/mL streptomycin.

Generation of CAR T Cells

SMASh-tagged CAR constructs were synthesized by custom gene synthesis (GeneArt) or assembled with the In-Fusion Cloning Kit (Takara Bio) into a retroviral vector. Viral supernatant was prepared by transfecting GP2-293 cells (Clontech) with CAR-SMASh plasmids complexed with Lipofectamine 2000 (Thermo Fisher). Viral supernatant was harvested 48 and 72 hours post-transfection, centrifuged and filtered to remove cell debris, and stored at −80° C. until use. CAR T cells were generated by retrovirally transducing activated T cells on Retronectin (Takara Bio) coated plates.

Flow Cytometry

Flow cytometry of samples was performed on an LSR Fortessa (BD Bioscience) and data were analyzed using FlowJo software. B7H3 CARs were detected using B7H3 Fc. GD2 and CD19 CARs were detected by 1A7 and FMC63 anti-idiotype antibody, respectively. CD 22 CARs were detected using biotinylated protein L and APC conjugated streptavidin. FACS plots were gated on live single T cells. Untransduced T cells ("Mock") were used as controls.

CAR-SMASh Drug Response Assay

CAR T cells were incubated in the indicated concentration of drug in T cell culture media (above) until analysis by FACS. Media was changed every 48-72 hours. Removal of drug was achieved by washing CAR T cells in T cell culture media 3 times.

Co-Culture Killing Assays

CAR T cells were co-cultured with indicated cancer cell lines, engineered to constitutively express green fluorescent protein, on day 10 post activation in 96-well plates at a ratio of 1:1 (50,000 cells each). Cancer cell fluorescence was monitored by time-lapse microscopy. Total integrated fluorescence intensity was calculated and plotted as a function of time. Co-culture supernatant was harvested after 24 hours of co-culture and analyzed for the presence of cytokine. Cytokine in culture supernatant was quantified using the Human IL-2 ELISA MAX™ and Human IFN-γ ELISA MAX™ Deluxe kits (BioLegend).

Results

A chimeric antigen receptor (CAR) incorporating the three critical elements for regulatory control in the SMASh-Tag system (a protease susceptible cleavable linker, the protease itself, and a degron domain) as an addition to the C-terminal domain of the CAR, was generated (termed "SMASh-CAR").

First, it was demonstrated that in the absence of exogenous protease inhibitors, expression of a B7-H3 CAR incorporating a 4-1 BB and CD3 signaling endodomain as well as the trio of SMASh components (termed "B7H3 SMASh-CAR"—FIG. 2, panel B) shows high level surface expression on engineered human T cells (FIG. 3). The CAR was expressed using a retroviral construct and demonstrated expression that was approximately 2 logs above background levels.

Figure 4:
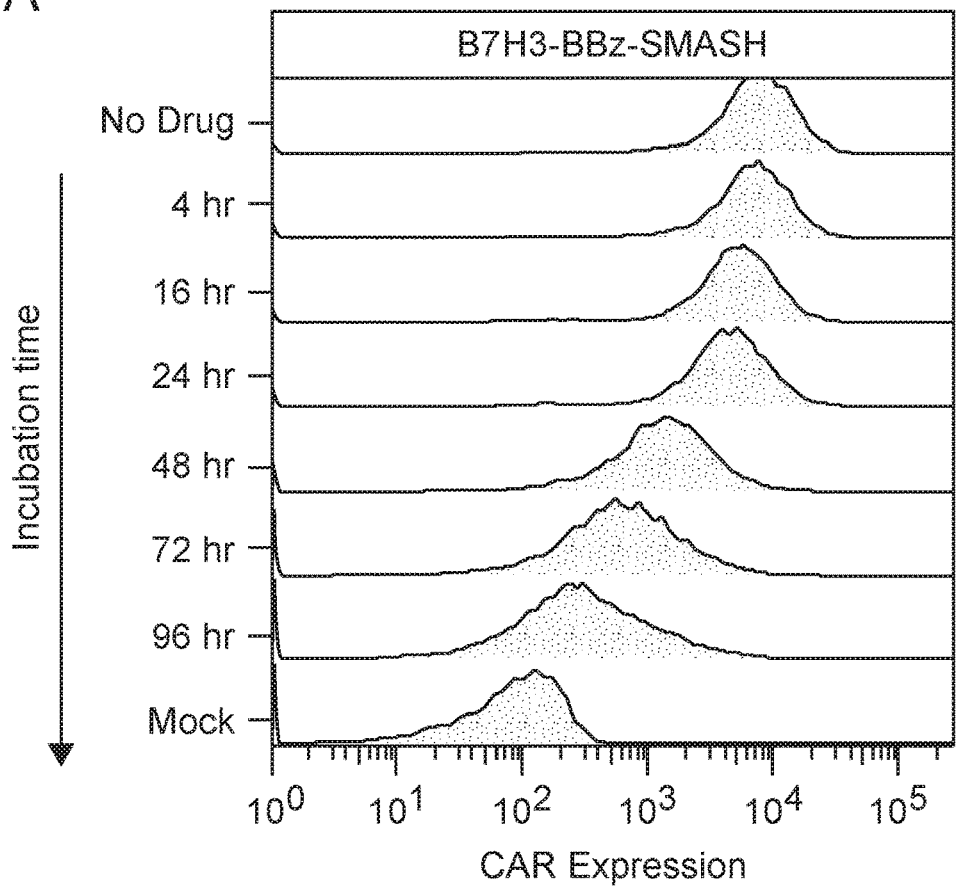
FIG. 4 Panel A: Flow cytometry plot showing the decrease in CAR expression after incubation with 3 μM protease inhibitor (asunaprevir) for various amounts of time. Panels B and C: Graphs showing the mean fluorescence intensities ("MFIs") of the flow cytometry data.
Figure 4:
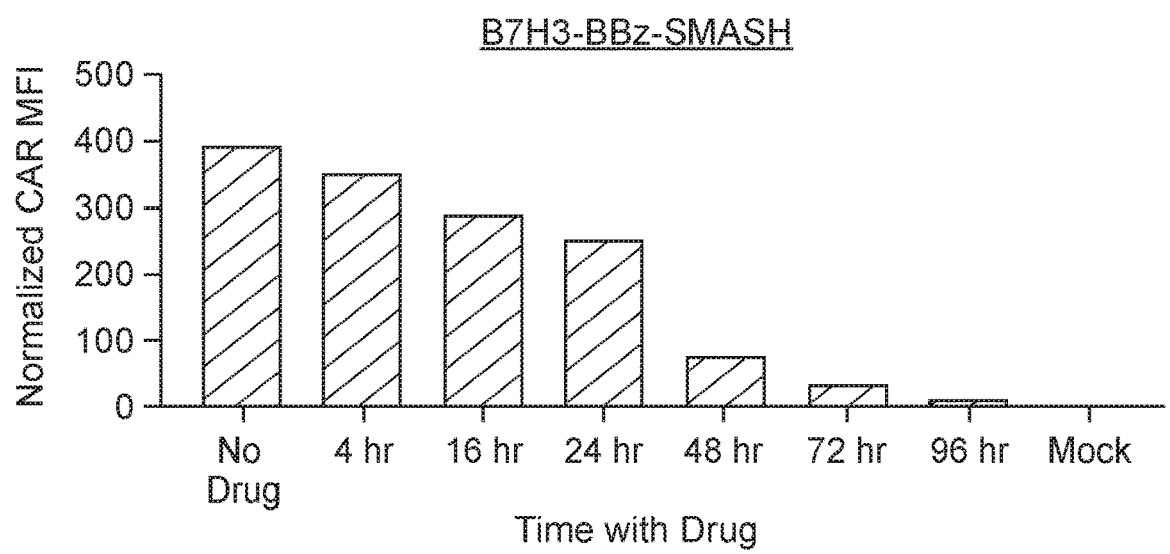
Figure 4:
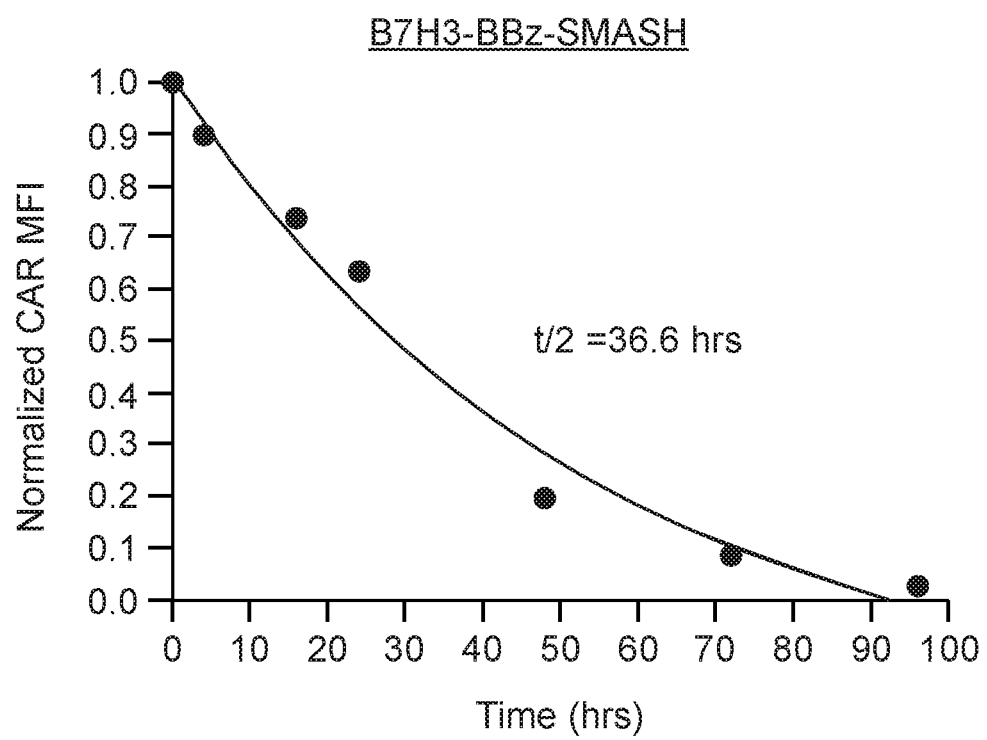
Figure 4:
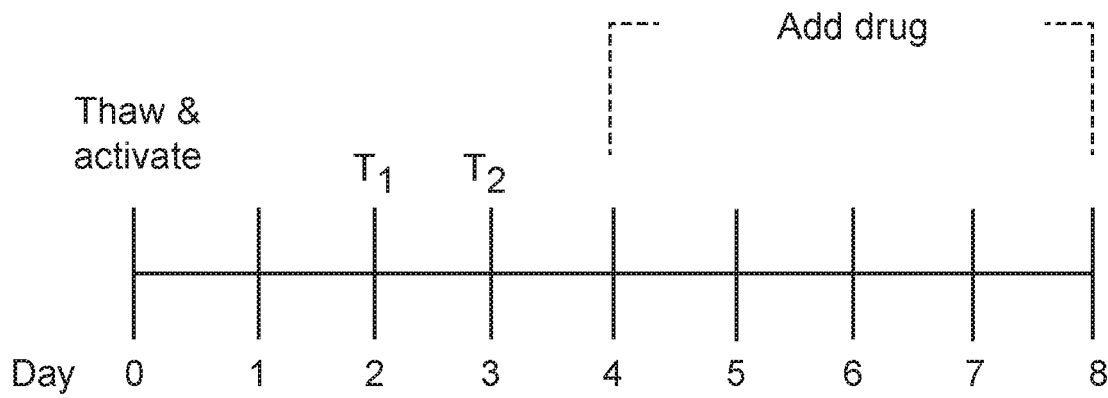

When asunaprevir, a small molecule that specifically inhibits HCV NS3 protease activity was added to the system ex vivo, CAR expression was reduced by greater than 90% (FIG. 4). Reduction in CAR expression occurred within 24 hours and was maximal at 96 h.

Figure 5:
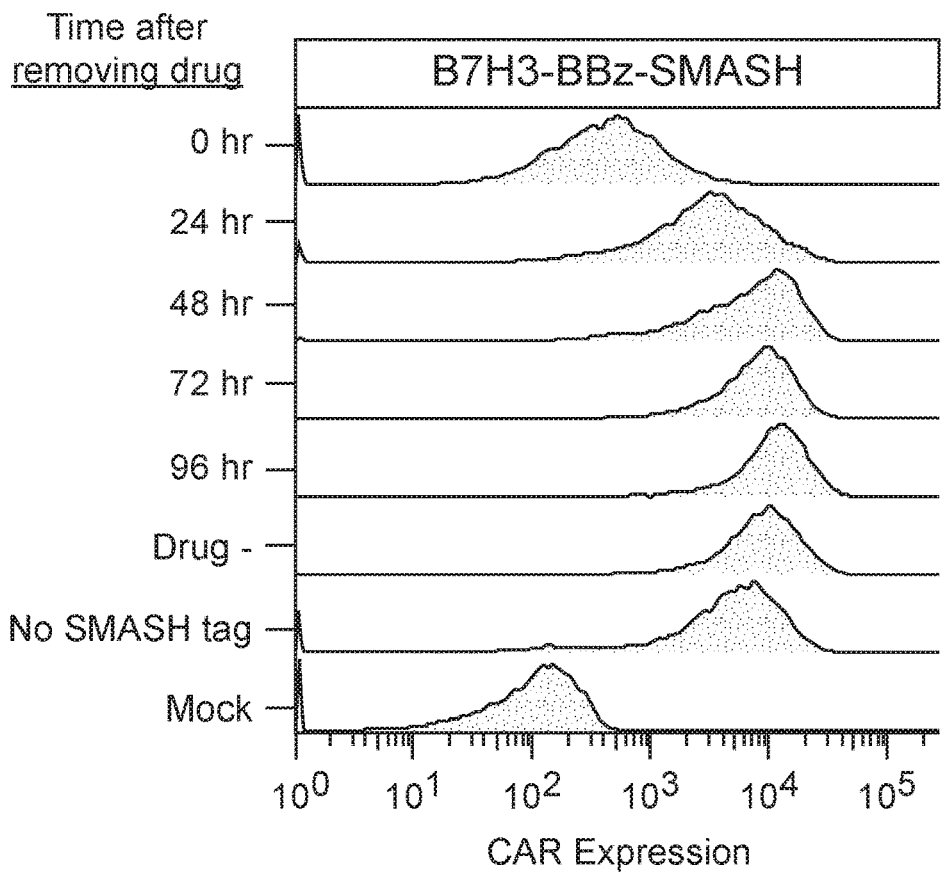
FIG. 5 Panel A: flow cytometry plot showing the recovery of CAR expression after removal of the protease inhibitor (asunaprevir) by washing. "No SMASh" control is a B7H3 CAR without the SMASh tag. Panel B: Graph showing the MFIs of the flow cytometry data.
Figure 5:
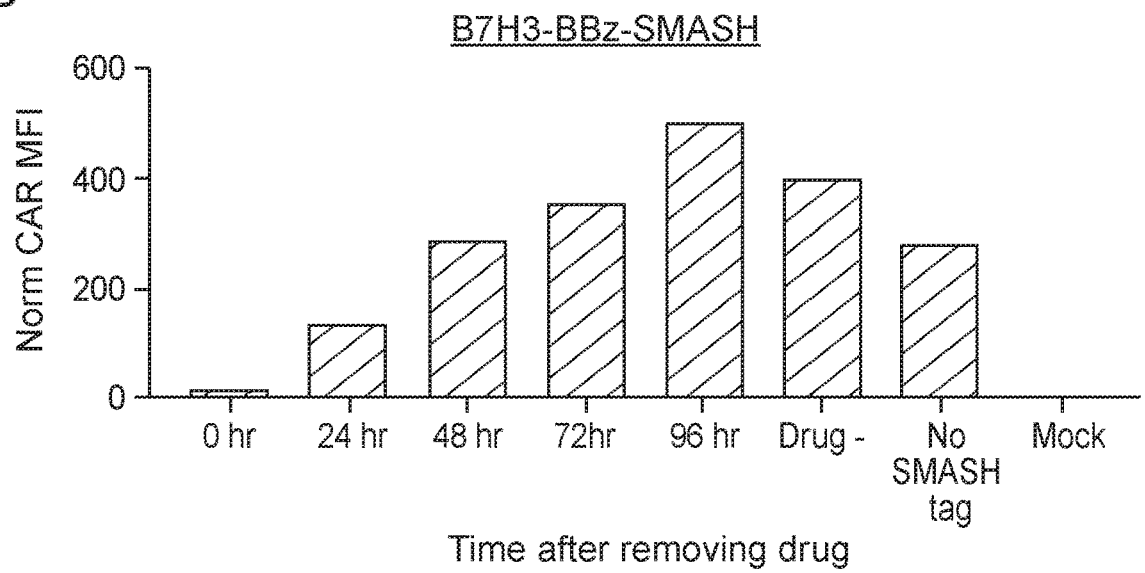

Following drug induced CAR removal, asunaprevir was subsequently removed, resulting in approximately 1.5 log re-expression within 24 h and full re-expression within 72 h (FIG. 5). Thus, we demonstrate drug-induced SMASh-CAR regulation.

Figure 6:
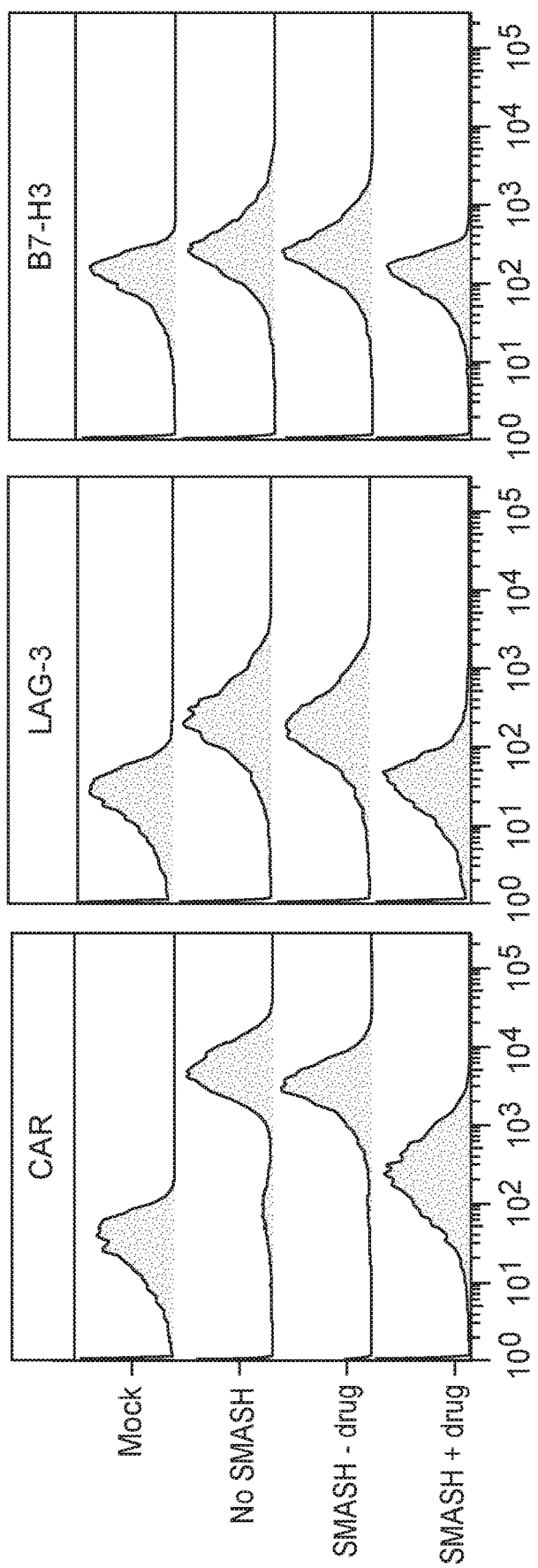
FIG. 6 A series of flow cytometry plots of CAR expression and activation/exhaustion-associated markers. The data demonstrate that incubating CAR-SMASh T cells with the protease inhibitor (3 μM asunaprevir) not only reduces CAR expression but also reduces expression of activation/exhaustion markers.
Figure 6:
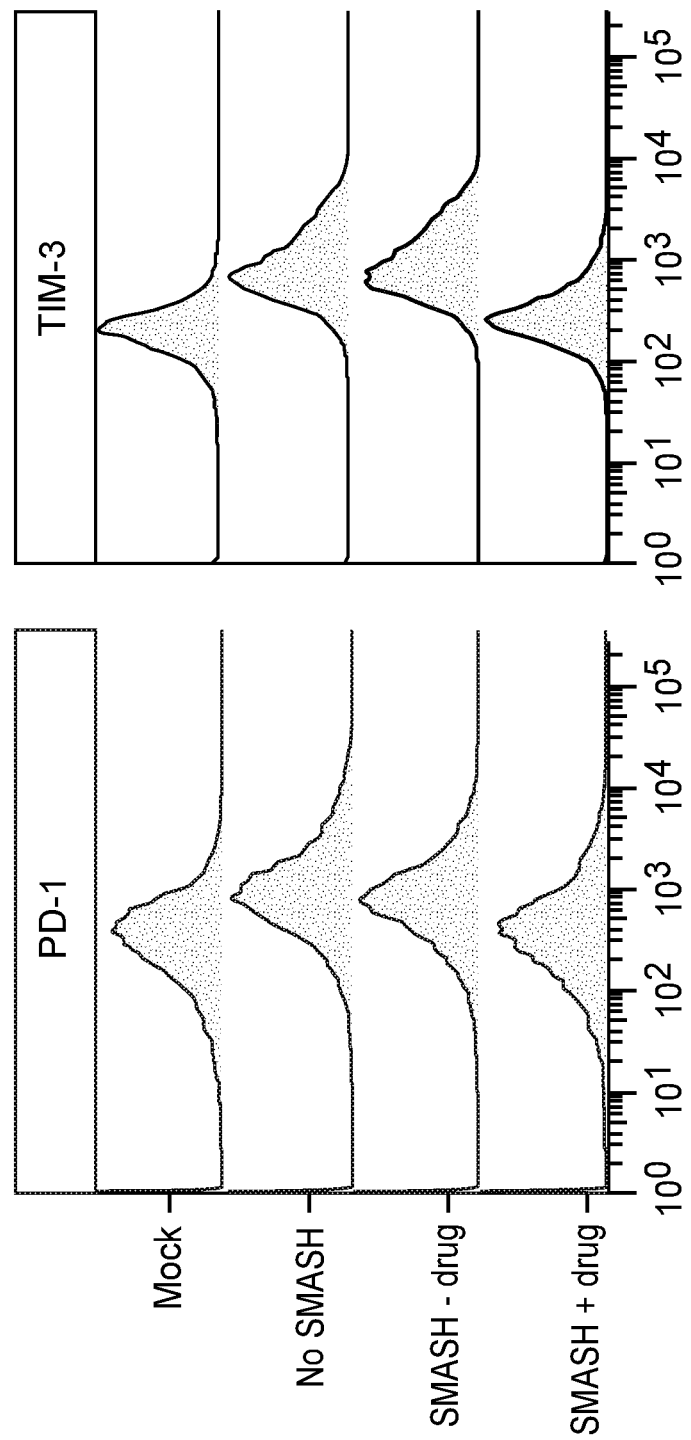
Figure 7:
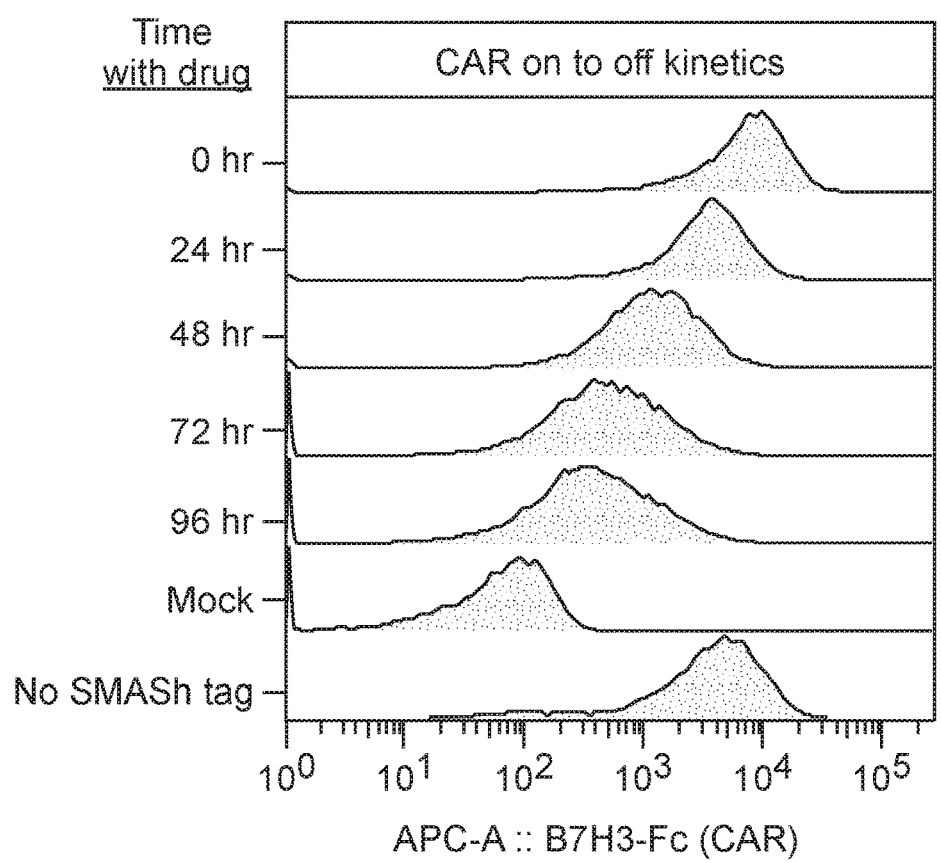
FIG. 7 Panel A: flow cytometry plot showing the decrease in CAR expression after incubation with the protease inhibitor (3 μM simeprevir) for various amounts of time. Panel B: Graph showing the MFIs of the flow cytometry data.
Figure 7:
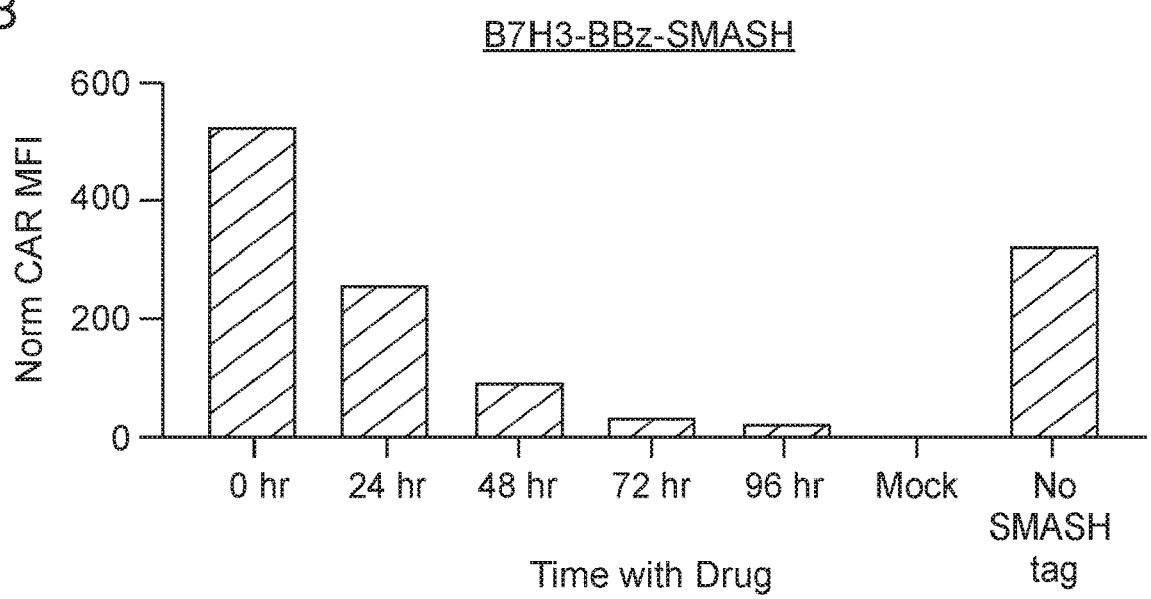
Figure 8:
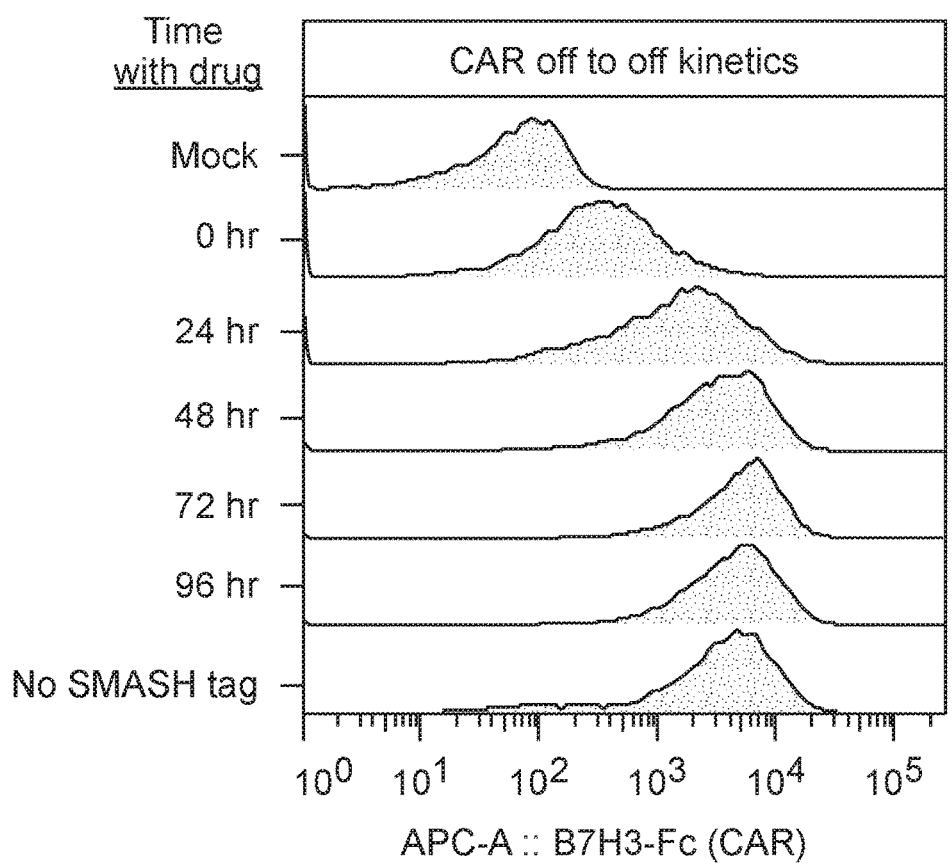
FIG. 8 Panel A: Flow cytometry plot showing the recovery of CAR expression after removal of the protease inhibitor (simeprevir) by washing. "No SMASh" control is a B7H3 CAR without the SMASh tag. Panel B: Graph showing the MFIs of the flow cytometry data.
Figure 8:
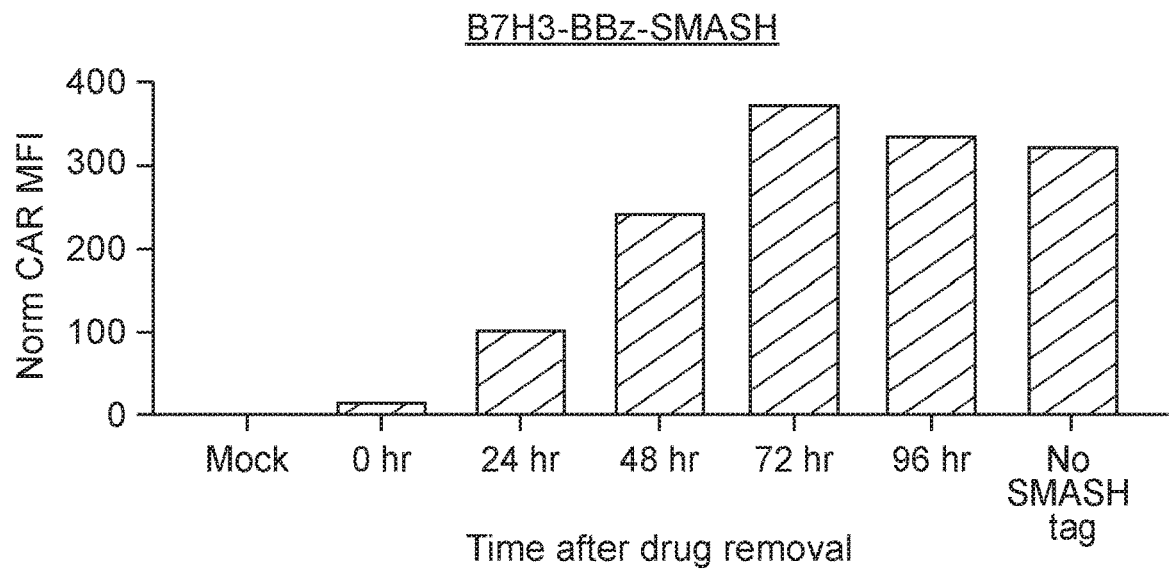
Figure 9:
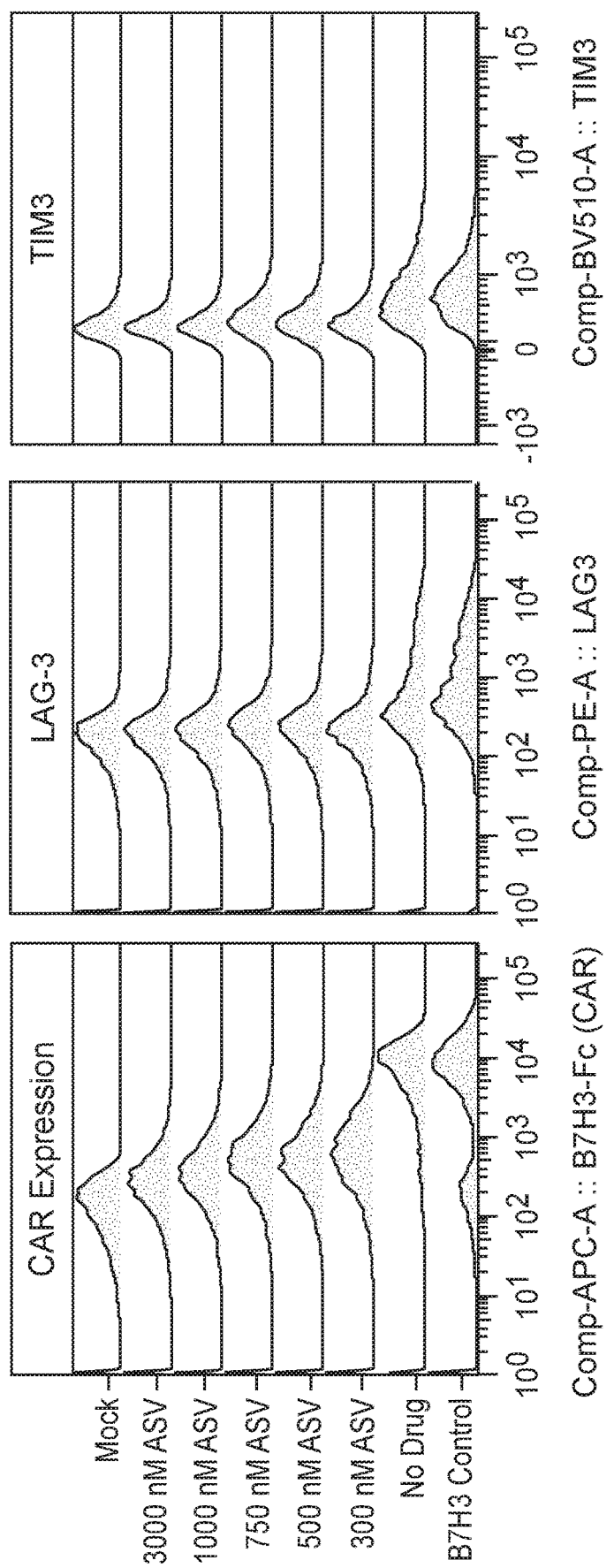
FIG. 9 A series of flow cytometry plots showing a dose-dependent relationship between the protease inhibitor (asunaprevir) and expression of CAR molecules and activation/exhaustion-associated markers.
Figure 9:
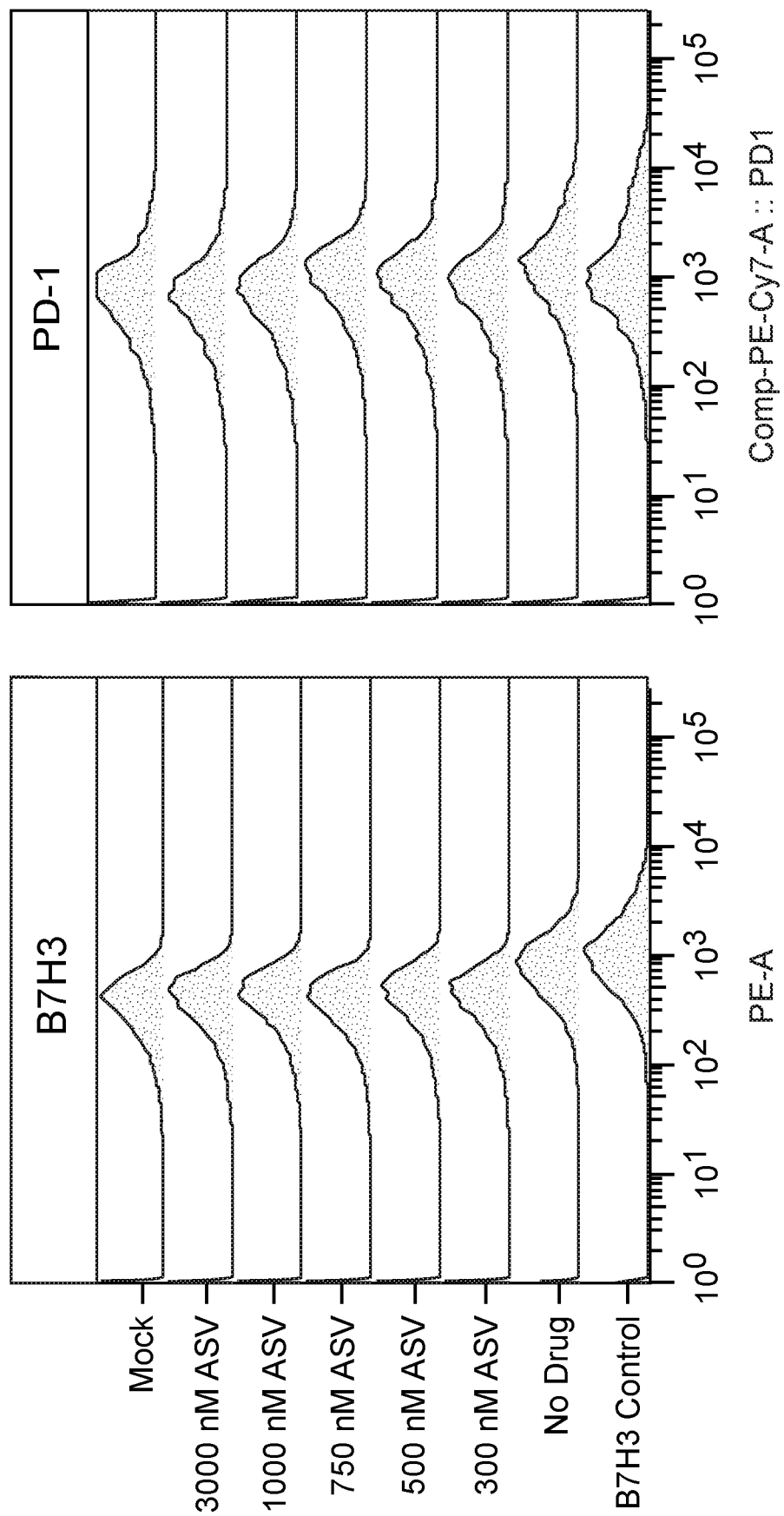
Figure 10:
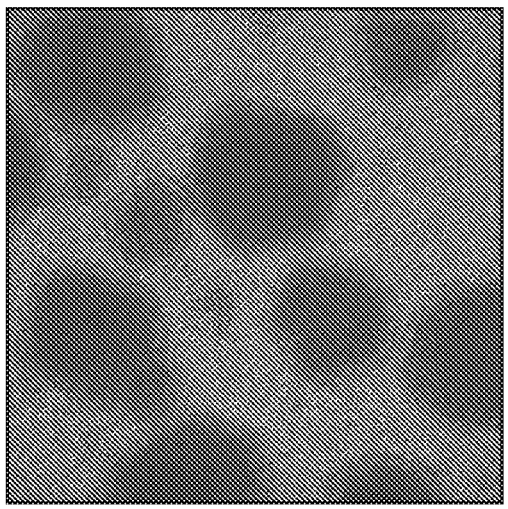
FIG. 10 Microscope images demonstrating that incubation with the protease inhibitor (asunaprevir) renders T cells resistant to aggregation during in vitro culture, whereas T cells having control CAR constructs lacking the SMASh tag are not.
Figure 10:
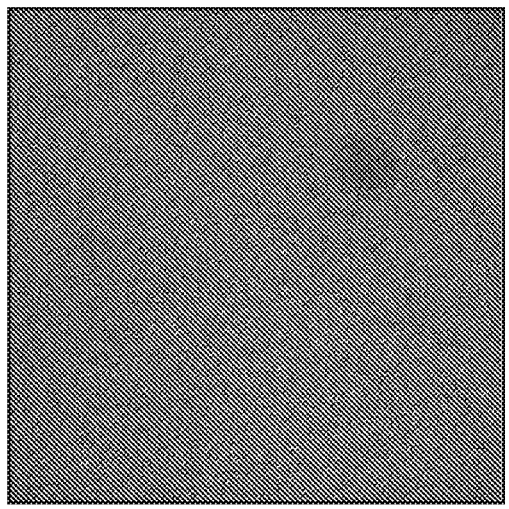
Figure 10:
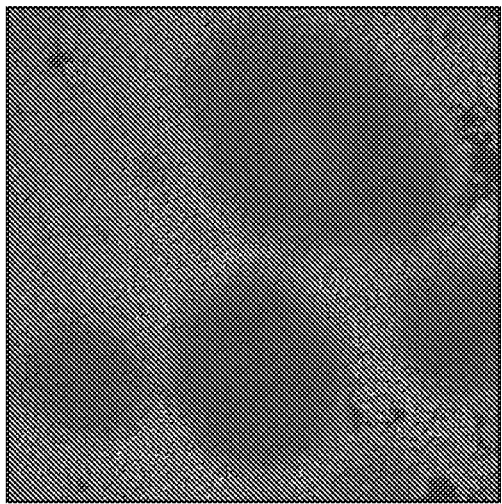
Figure 10:
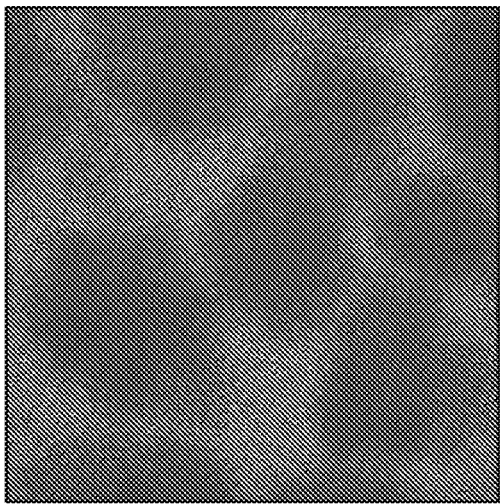

It was further demonstrated that drug-induced loss of expression leads to diminished expression of markers of T cell exhaustion (FIG. 6 and FIG. 9). Maximal effect was observed with 1 µM of asunaprevir, but near maximal effect was observed at 0.3 µM.

Figure 11:
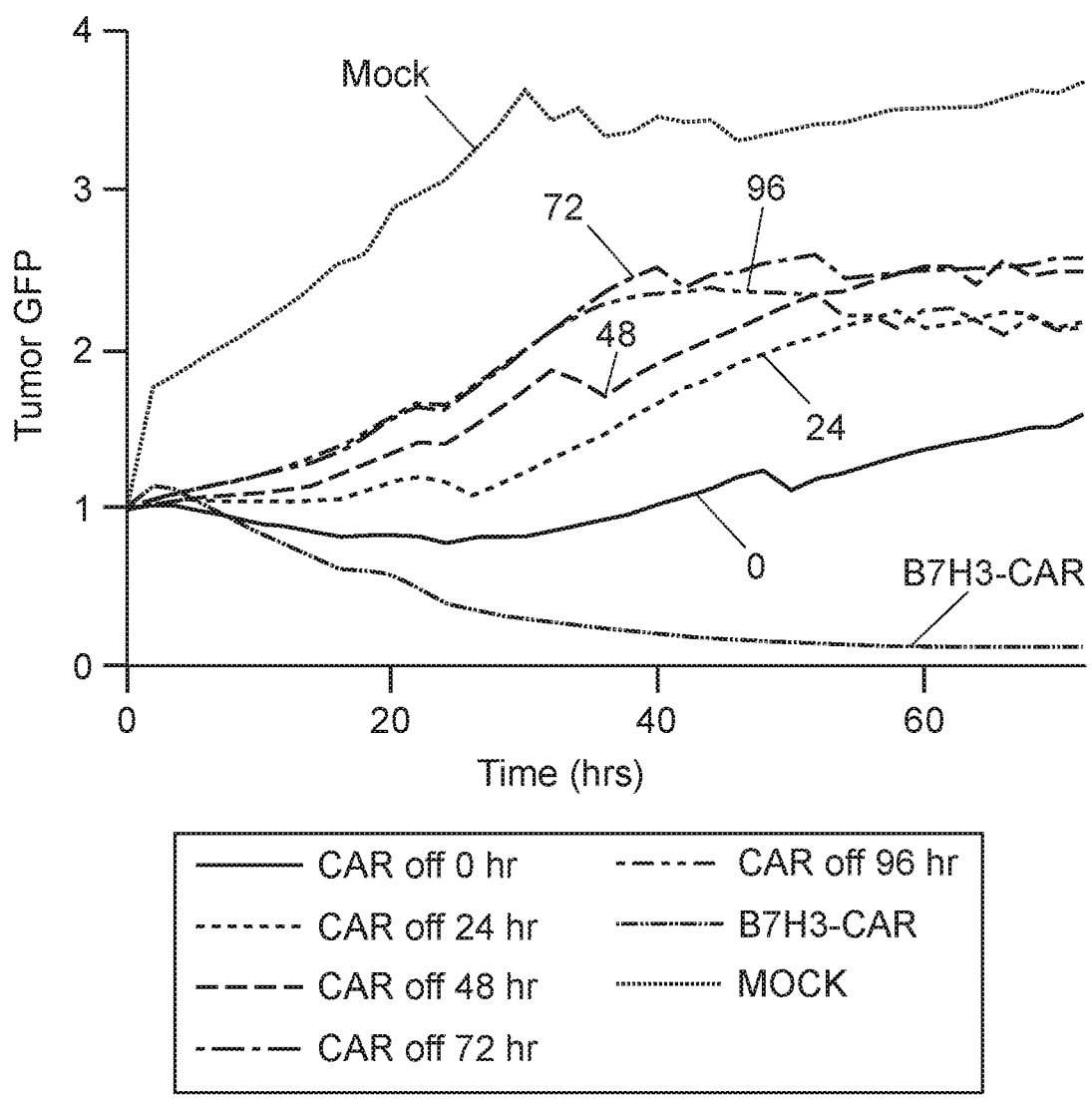
FIG. 11 Graph showing that B7H3 CAR-SMASh T cells which have been incubated with 3 µM asunaprevir for various amounts of time prior to co-culture with B7H3-expressing Nalm6 GFP tumor cells have reduced cytotoxicity. Control B7H3-CAR T cells (red) which lack a SMASh tag have a strong cytotoxic effect against B7H3-expressing Nalm6 GFP tumor cells, as determined by tumor GFP fluorescence.
Figure 11:
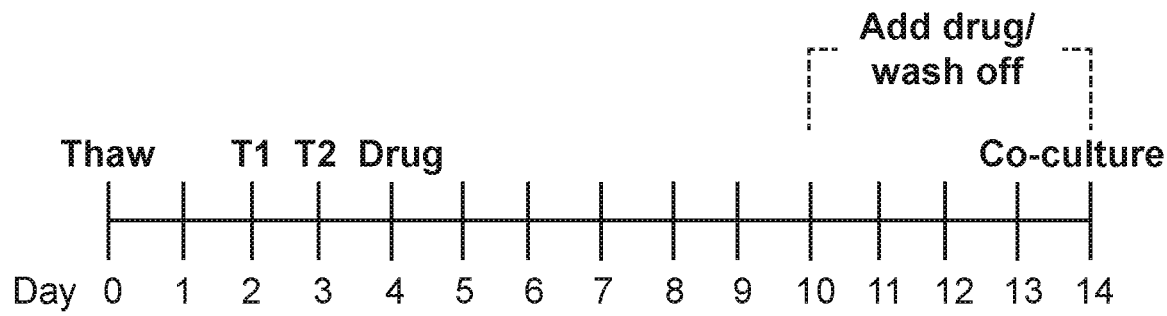
Figure 12:
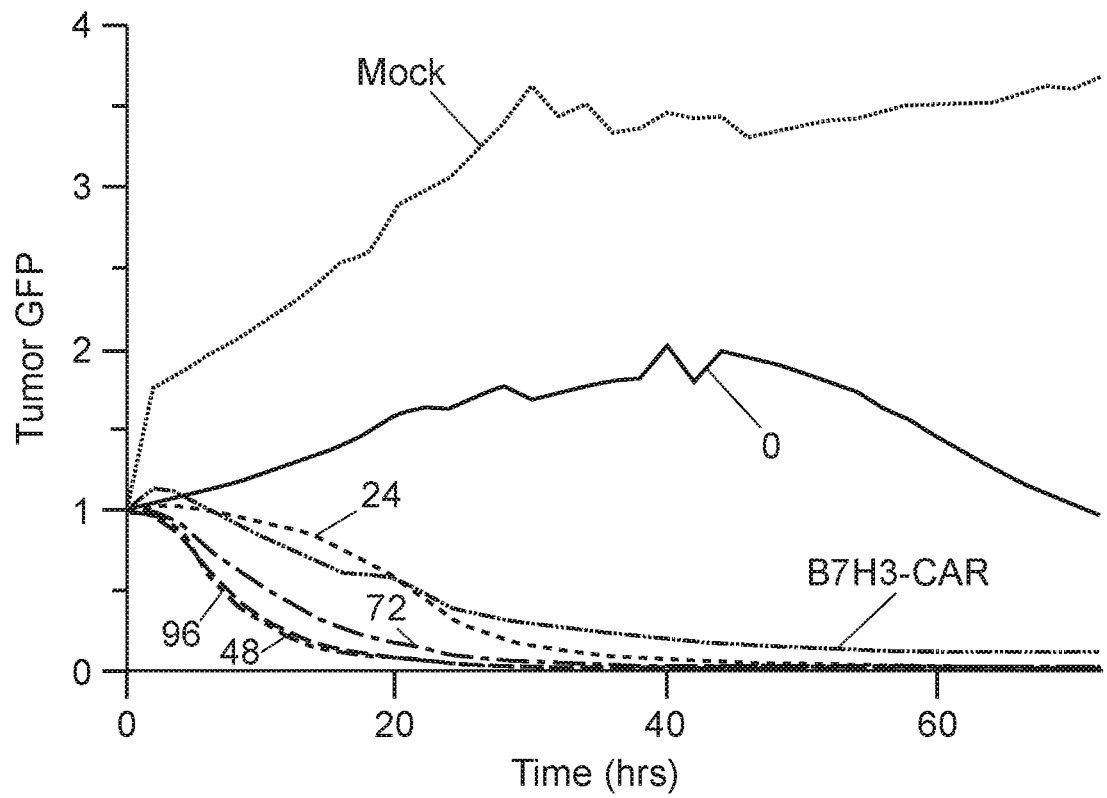
FIG. 12 Graph showing that B7H3 CAR-SMASh T cells which have had drug/protease inhibitor removed for various amounts of time prior to co-culture with B7H3-expressing Nalm6 GFP tumor cells retain their cytotoxic effects, as determined by tumor GFP fluorescence.
Figure 12:
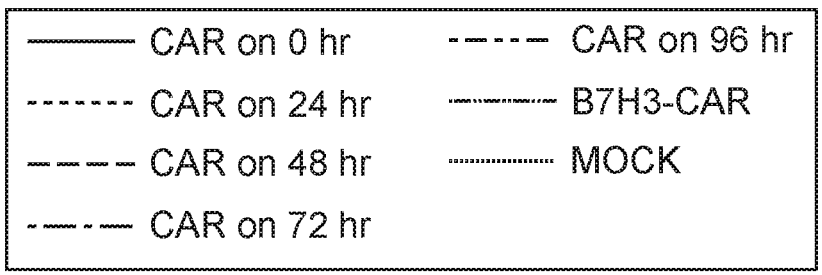
Figure 12:
Figure 13:
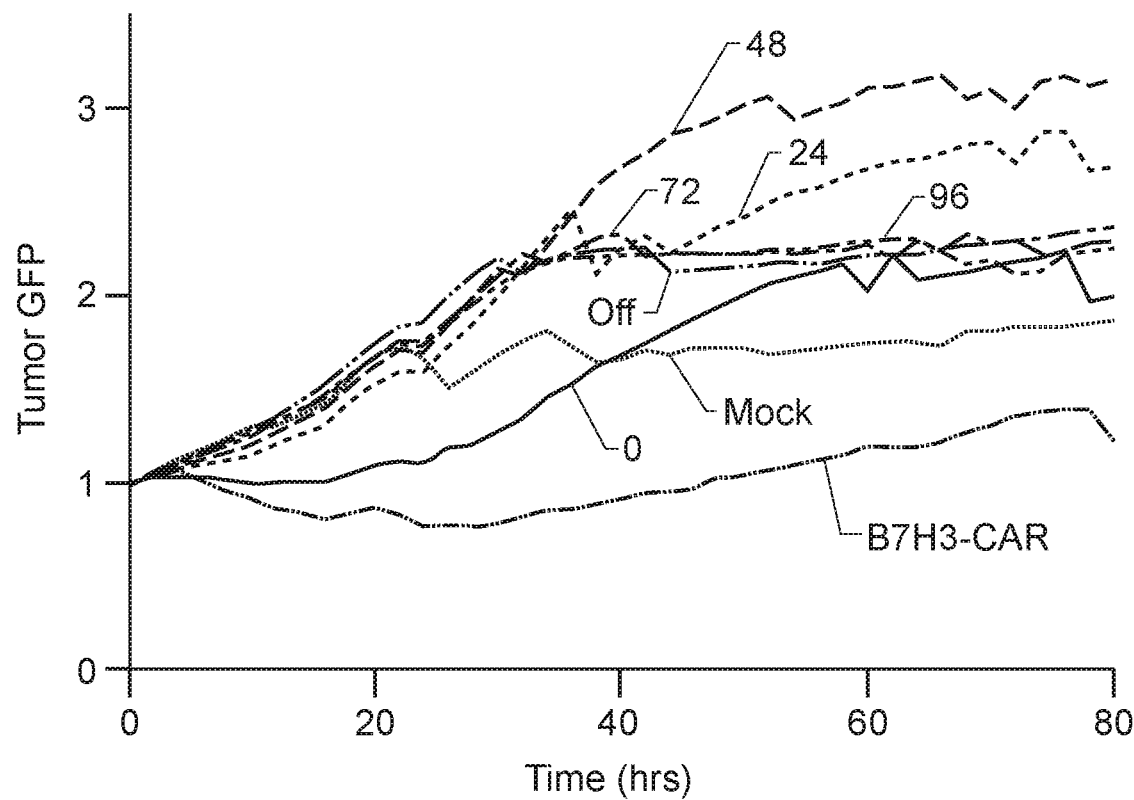
FIG. 13 Graph showing that B7H3 CAR-SMASh T cells which have been incubated with 3 µM asunaprevir for various amounts of time prior to co-culture with B7H3 (low)-expressing Nalm6 GFP tumor cells have reduced cytotoxicity.
Figure 13:
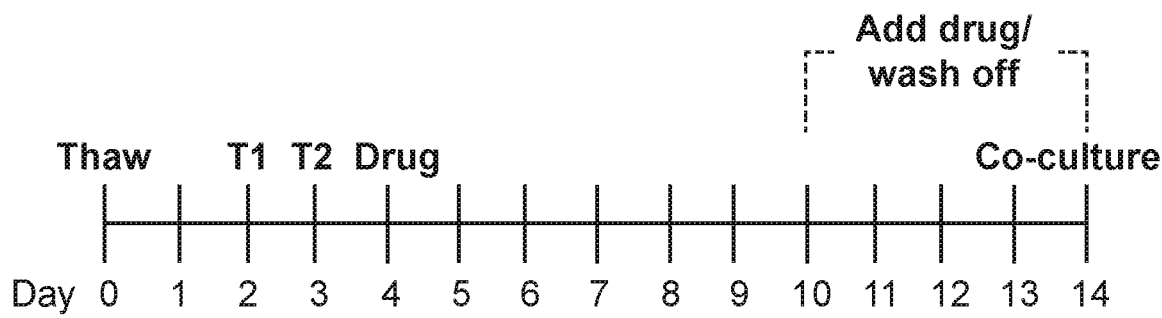
Figure 14:
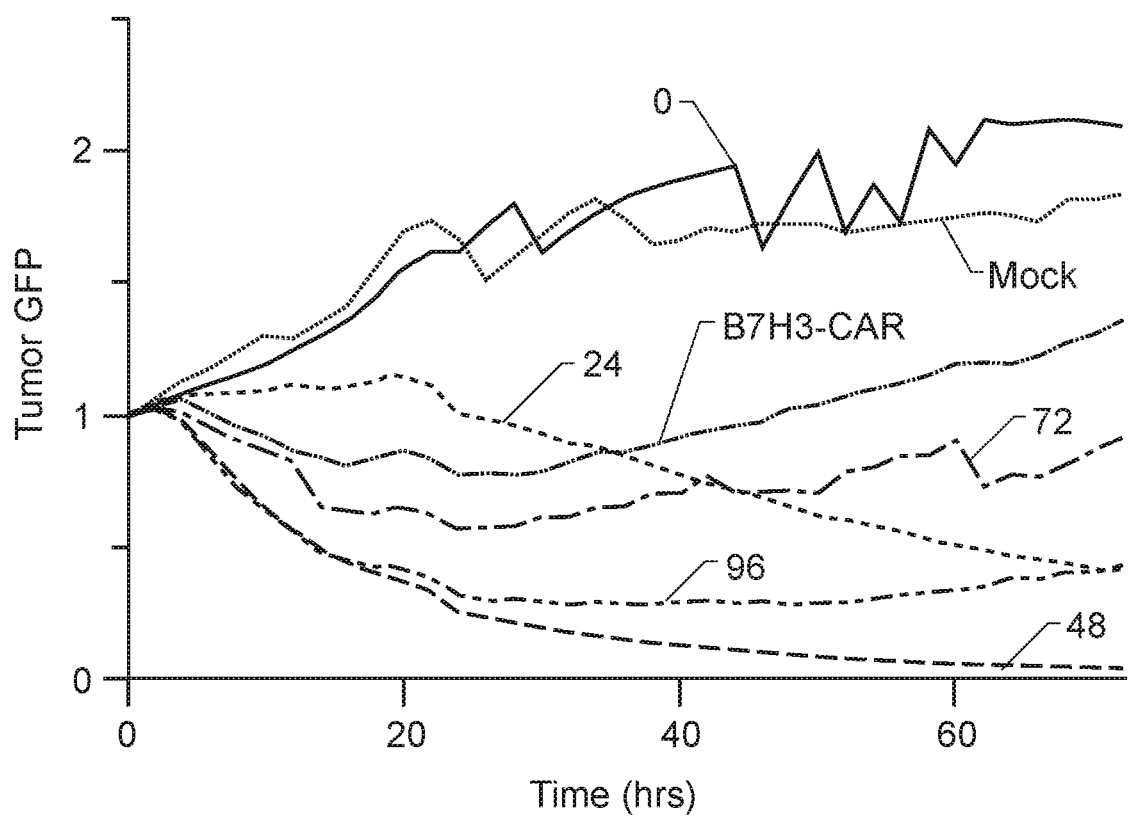
FIG. 14 Graph showing that B7H3 CAR-SMASh T cells which have had drug/protease inhibitor removed for various amounts of time prior to co-culture with B7H3 (low)-expressing Nalm6 GFP tumor cells retain their cytotoxic effects, as determined by tumor GFP fluorescence.
Figure 14:
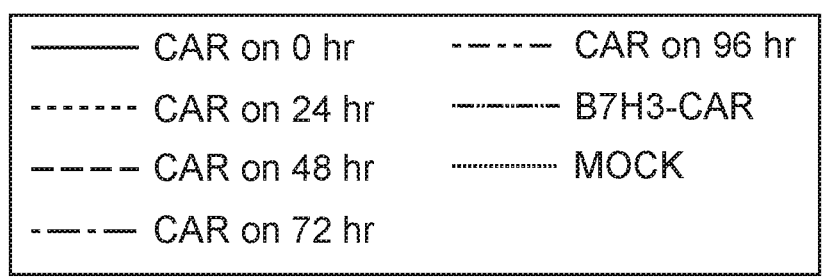
Figure 14:
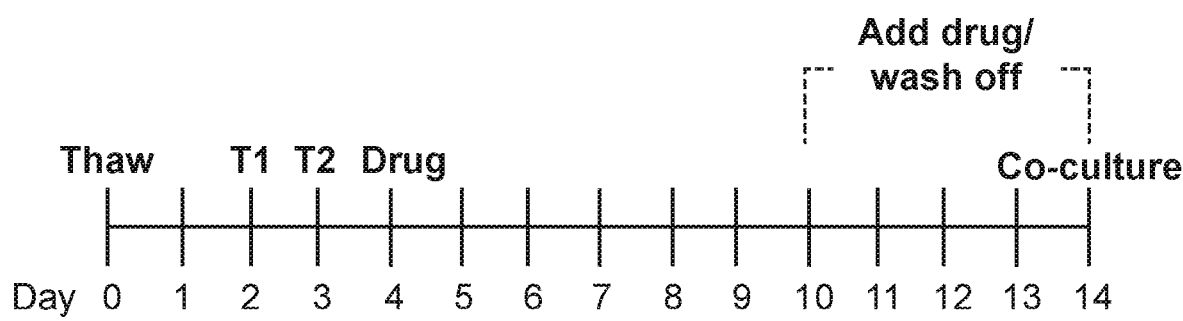
Figure 15:
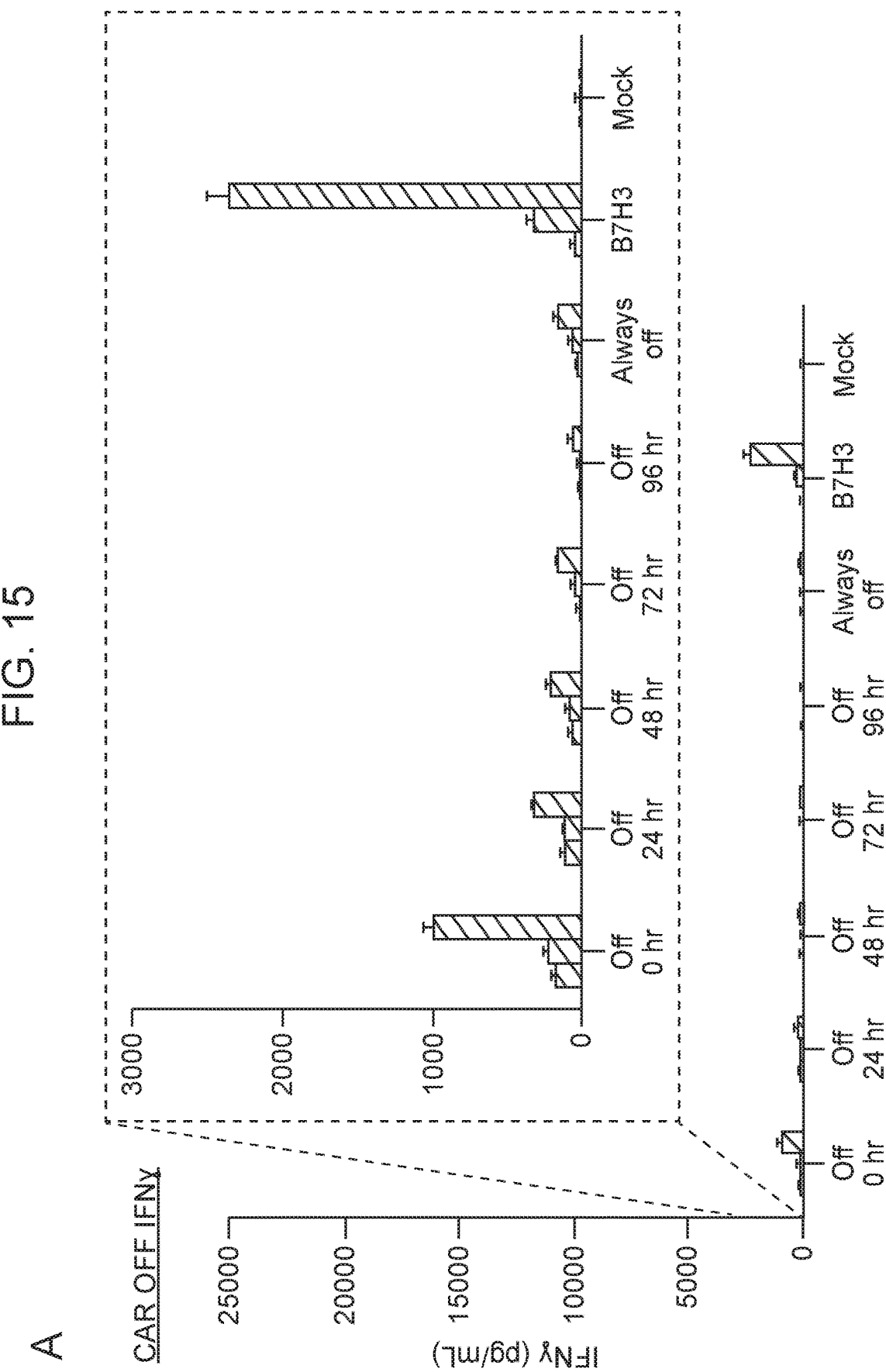
FIG. 15 Panel A: Graph showing interferon gamma (IFNγ) levels in co-culture supernatant of B7H3 CAR-SMASh T cells which have been incubated in 3 µM asunaprevir time prior to co-culture with B7H3-expressing Nalm6 GFP. Panel B: Graph showing quantification of IFNγ levels in co-culture supernatant of B7H3 CAR-SMASh T cells which have had drug removed for various amounts of time prior to co-culture with B7H3-expressing Nalm6 GFP.
Figure 15:
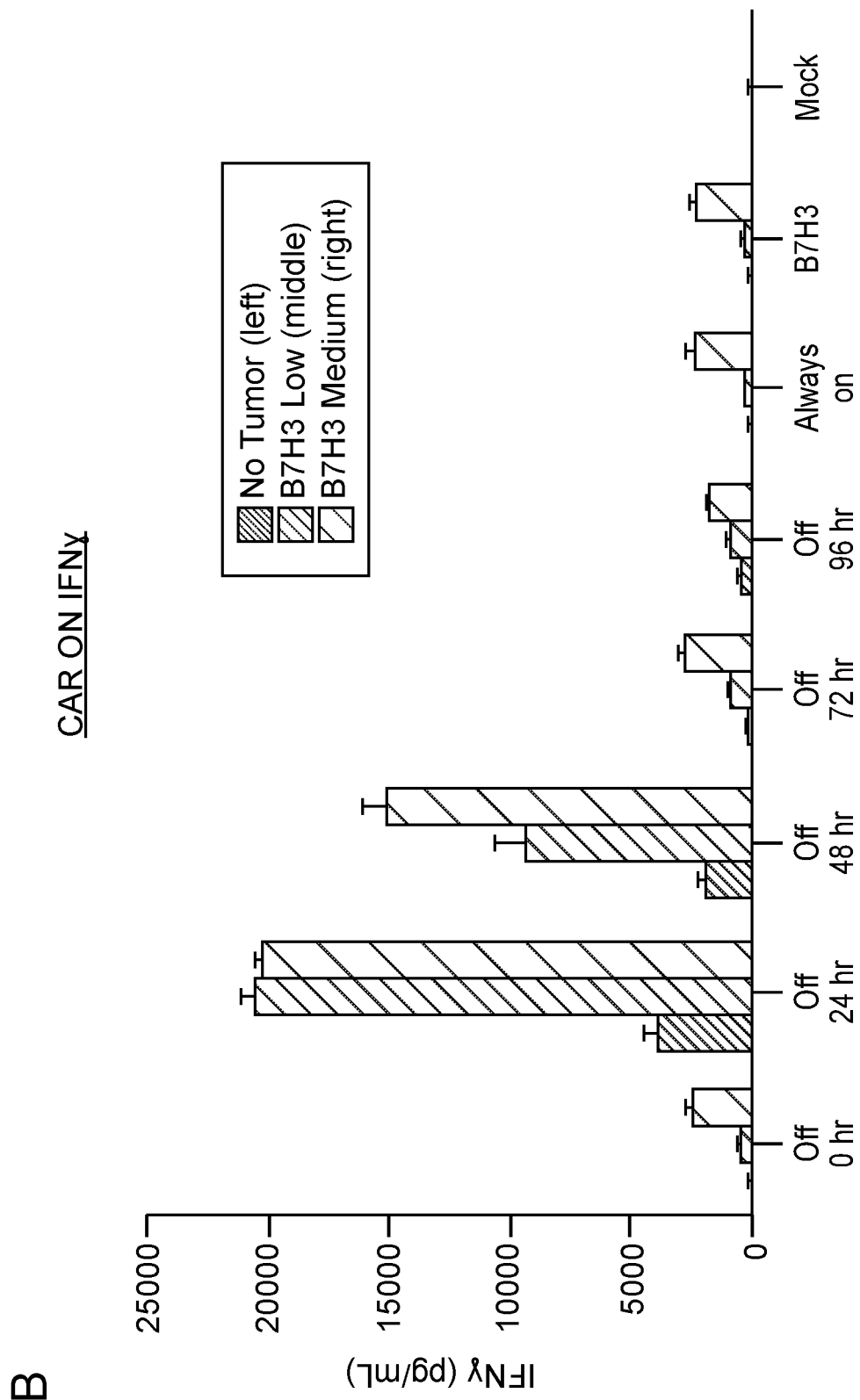
Figure 16:
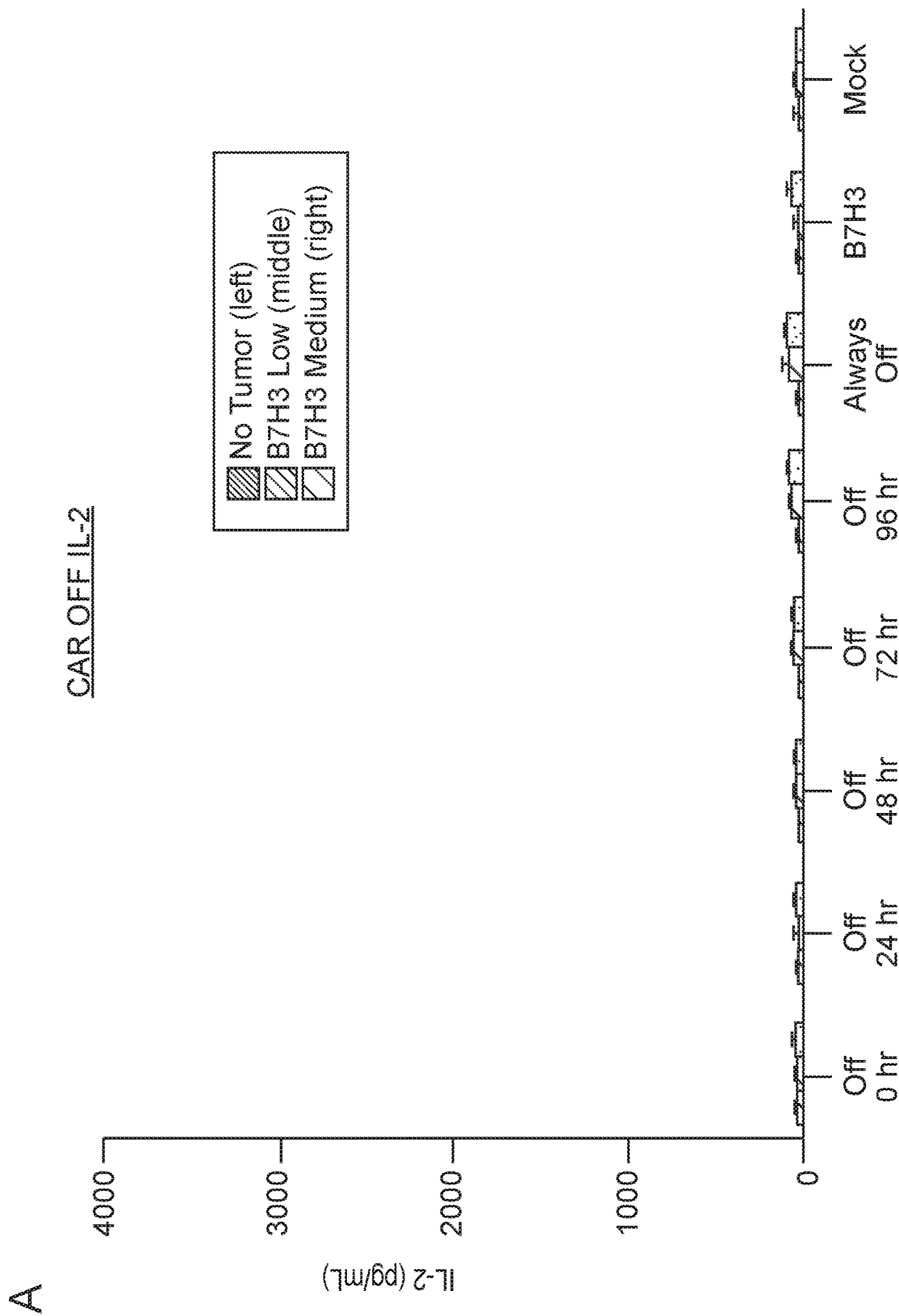
FIG. 16 Panel A: Graph showing interleukin-2 (IL-2) levels in co-culture supernatant of B7H3 CAR-SMASh T cells which have been incubated in 3 µM asunaprevir time prior to co-culture with B7H3-expressing Nalm6 GFP. Panel B: Graph showing quantification of IL-2 levels in co-culture supernatant of B7H3 CAR-SMASh T cells which have had drug removed for various amounts of time prior to co-culture with B7H3-expressing Nalm6 GFP.
Figure 16:
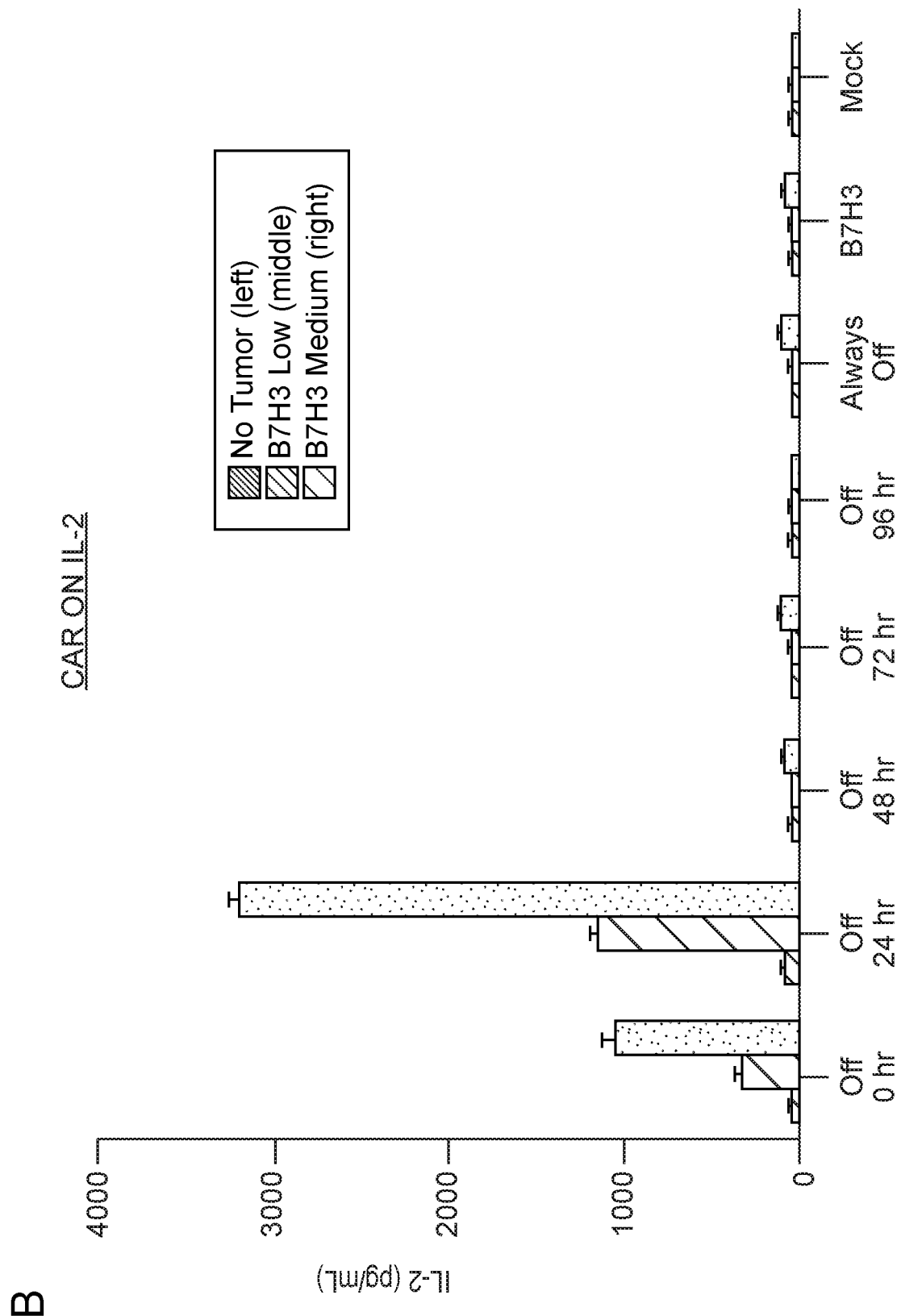
Figure 17:
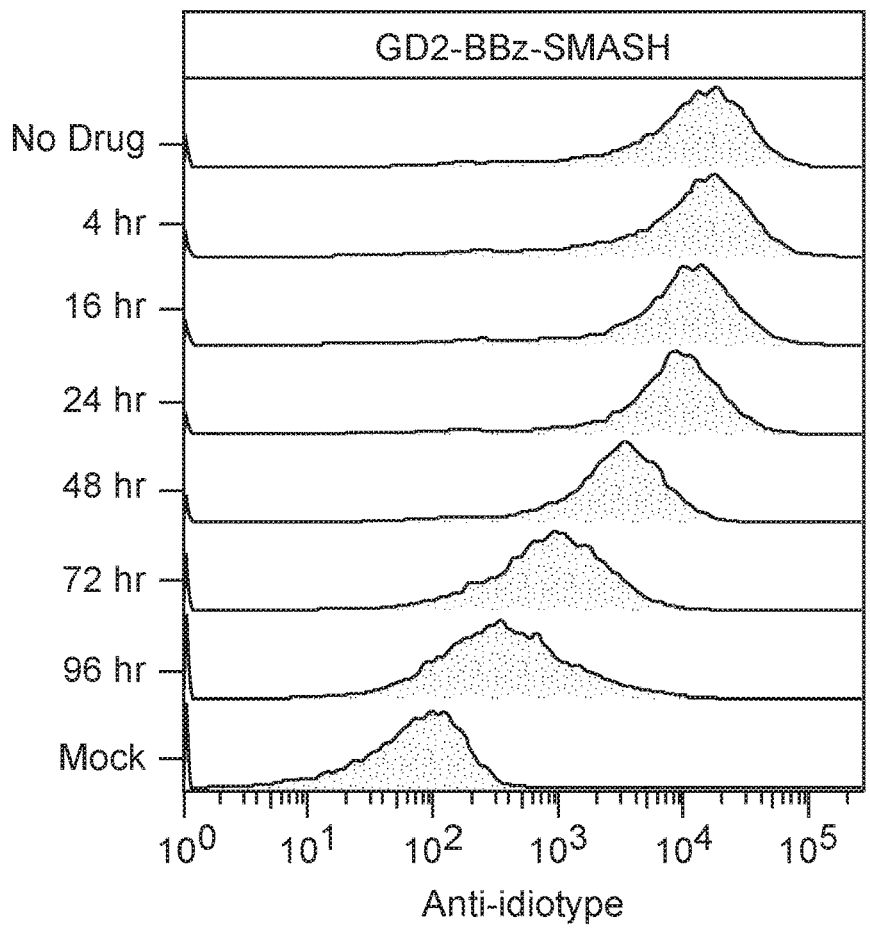
FIG. 17 Panel A: Flow cytometry plot showing the decrease in GD2 CAR-SMASh expression after incubation with 3 µM asunaprevir for various amounts of time. Panel B: Graph showing the MFIs of the flow cytometry data.
Figure 17:
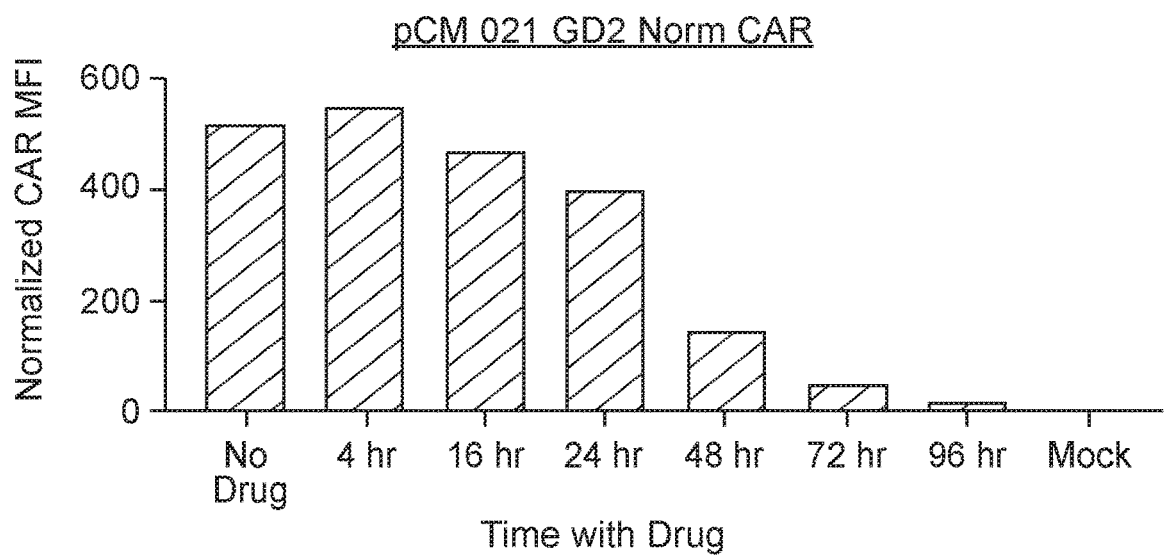
Figure 18:
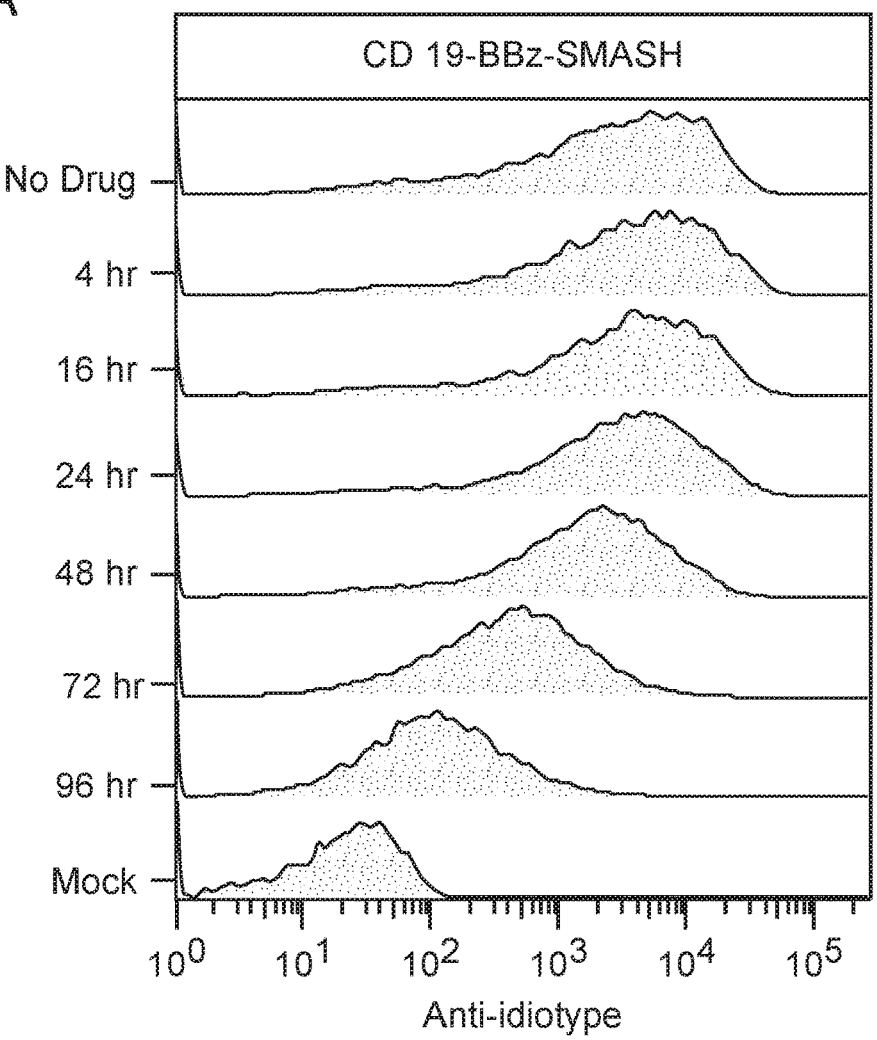
FIG. 18 Panel A: Flow cytometry plot showing the decrease in CD19 CAR-SMASh expression after incubation with 3 µM asunaprevir for various amounts of time. Panel B: Graph showing the MFIs of the flow cytometry data.
Figure 18:
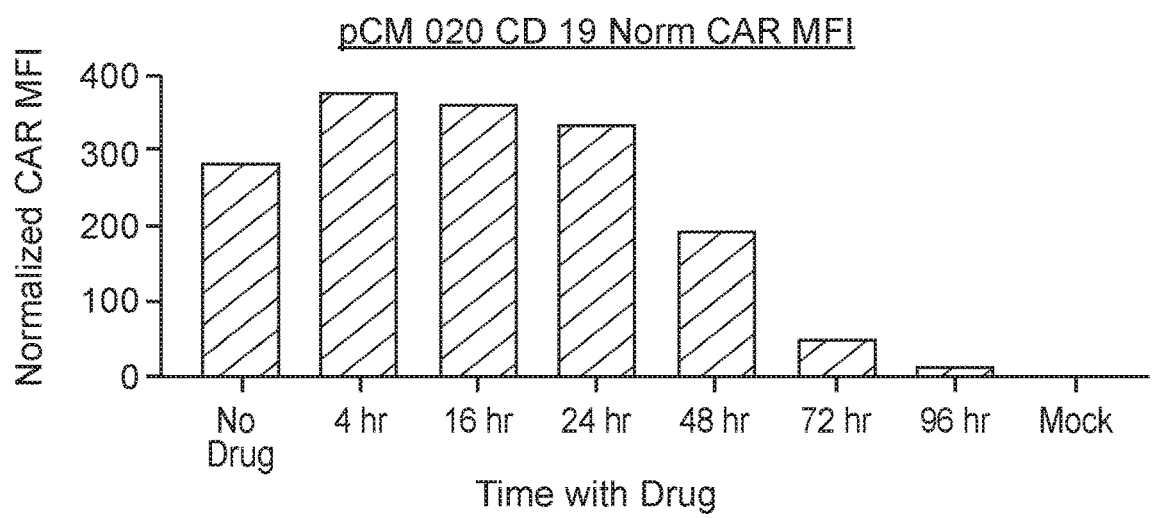
Figure 19:
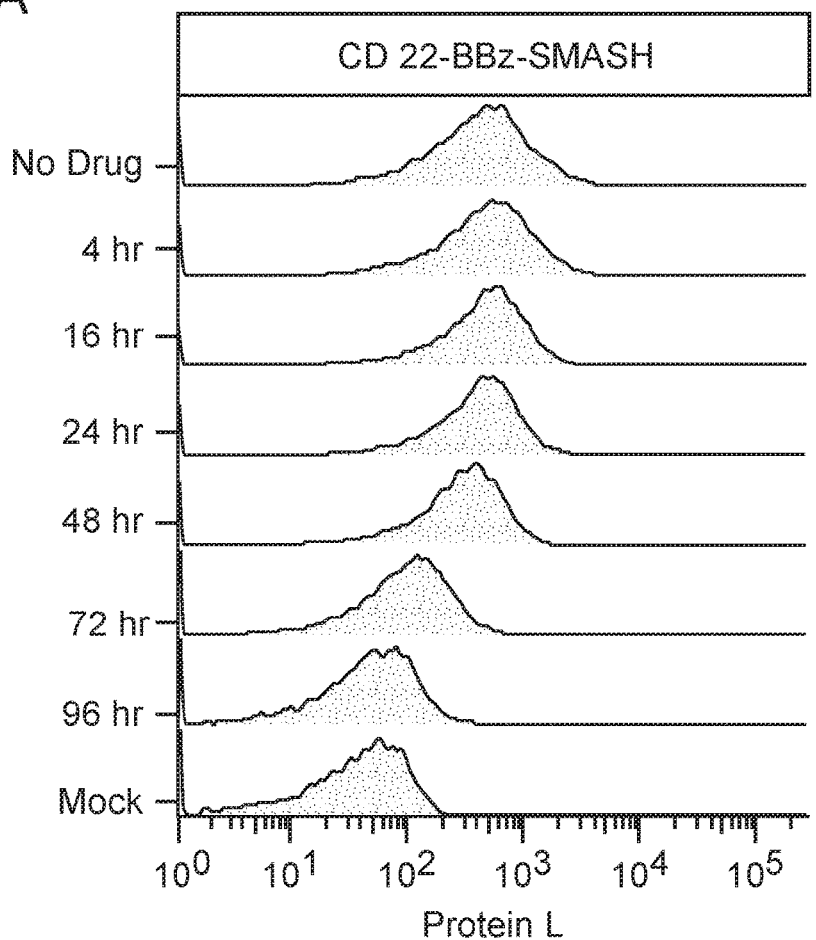
FIG. 19 Panel A: Flow cytometry plot showing the decrease in CD22 CAR-SMASh expression after incubation with 3 µM asunaprevir for various amounts of time. Panel B: Graph showing the MFIs of the flow cytometry data.
Figure 19:
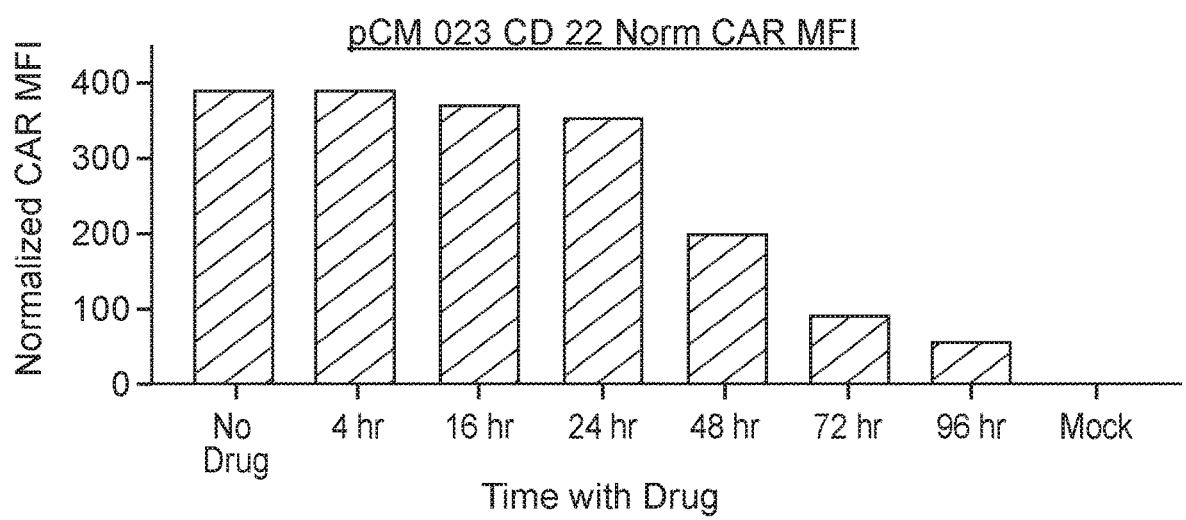
Figure 20:
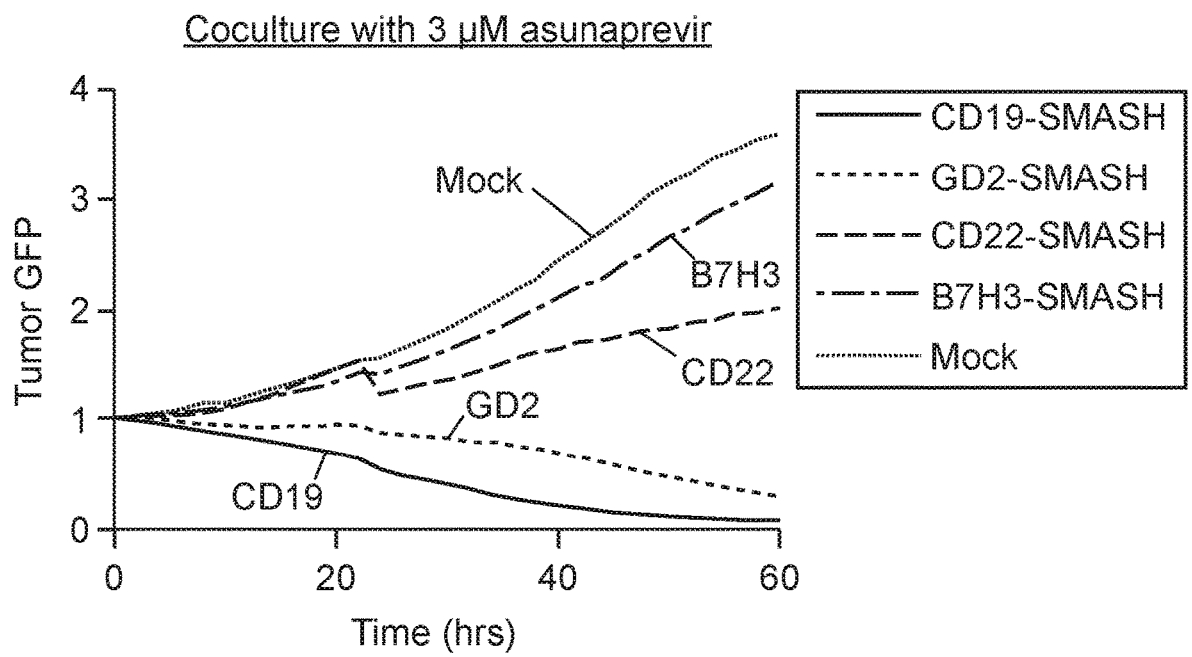
FIG. 20 Graph showing tumor GFP for CD19 CAR-SMASh, GD2 CAR-SMASh, CD22 CAR-SMASh, and B7H3 CAR-SMASh T cells co-cultured with GFP-labeled tumor cells expressing cognate antigen in the presence of 3 µM asunaprevir. The residual expression of GD2 and CD19 CAR-SMASh constructs in the "off" state results in significant cytotoxicity against tumor cells. However, B7H3 CAR-SMASh T cells exhibit minimal cytotoxicity against target cells in the presence of drug, as determined by tumor GFP fluorescence. Mock untransduced T cells served as a control.
Figure 21:
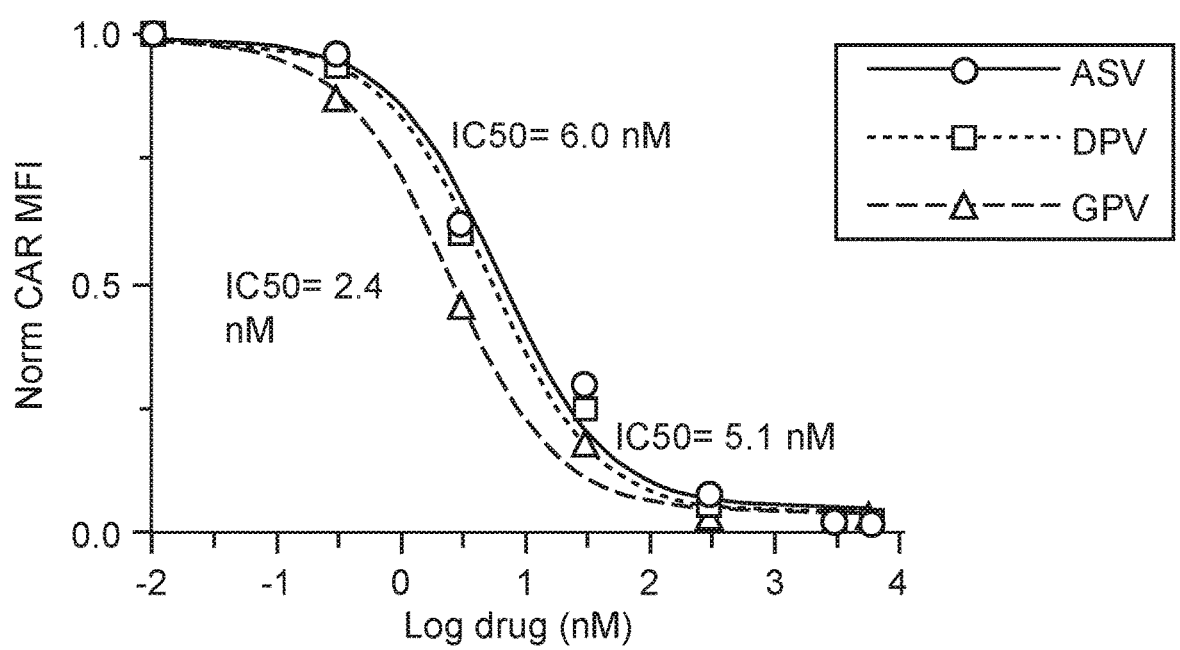
FIG. 21 Graph showing the dose response of B7H3 CAR-SMASh expression to either of three different protease inhibitors: asunaprevir (ASV), danoprevir (DPV), or grazoprevir (GPV).

The level of regulation is biologically significant since drug-induced inhibition of CAR expression beginning at 24 h following drug application demonstrates significant reduction in killing of B7H3+ tumor targets (FIG. 11). Upon re-expression of the CAR following asumaprevir removal, potent killing of tumor targets indistinguishable from constitutively expressed, non-regulated CAR T cells was observed (FIG. 12). Similarly drug-induced inhibition of CAR expression leads to very low levels of interferon production in response to antigen expressing targets, which is restored with 24 h upon removal of the CAR from the media. Similar levels of regulation using multiple CAR constructs was observed, including those targeting GD2, CD19 and CD22 (FIGS. 17-20).

Figure 24:
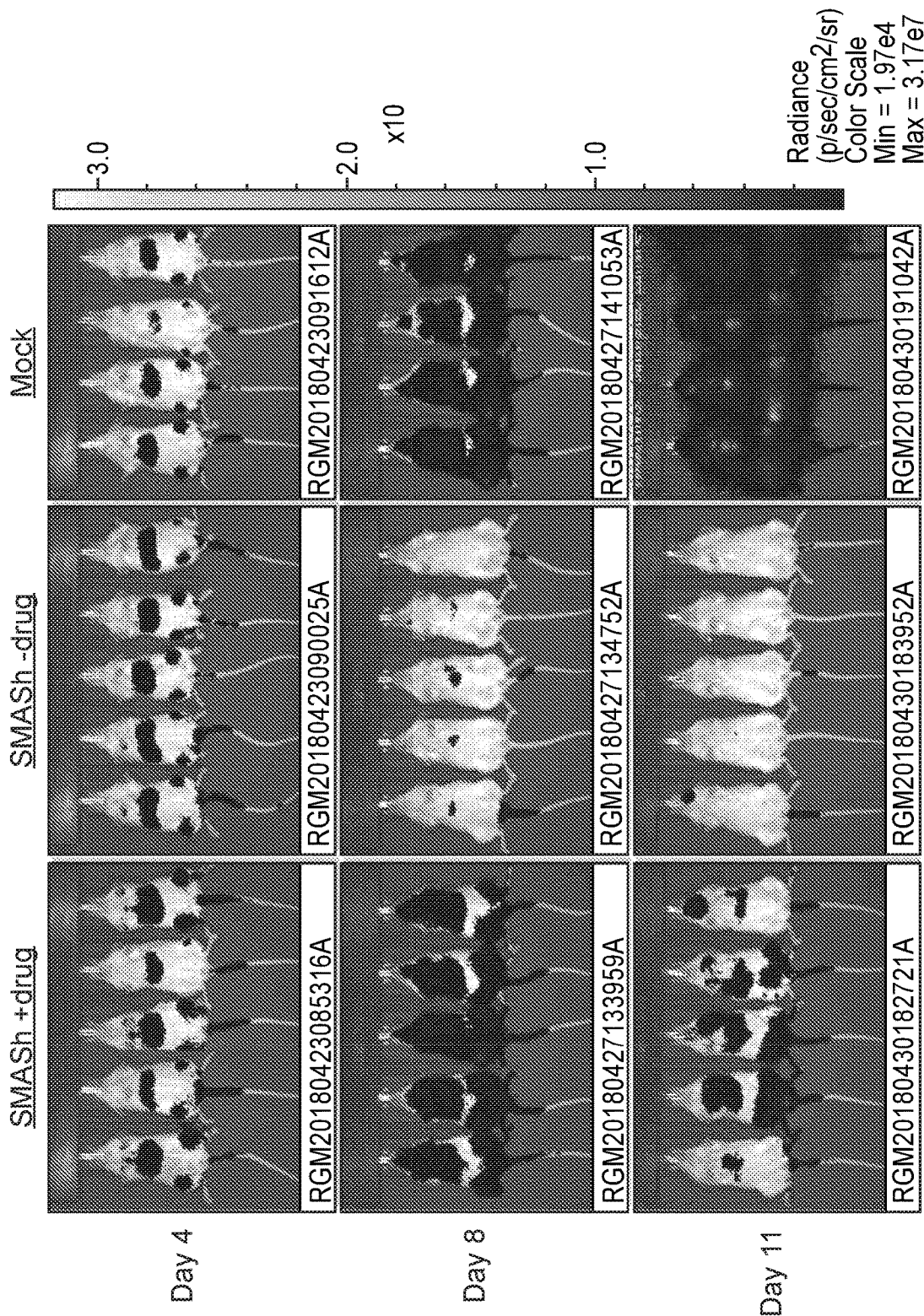
FIG. 24 In vivo mouse imaging data demonstrating drug-regulatable cytotoxic capacity of CAR T cells in vivo.
Figure 24:
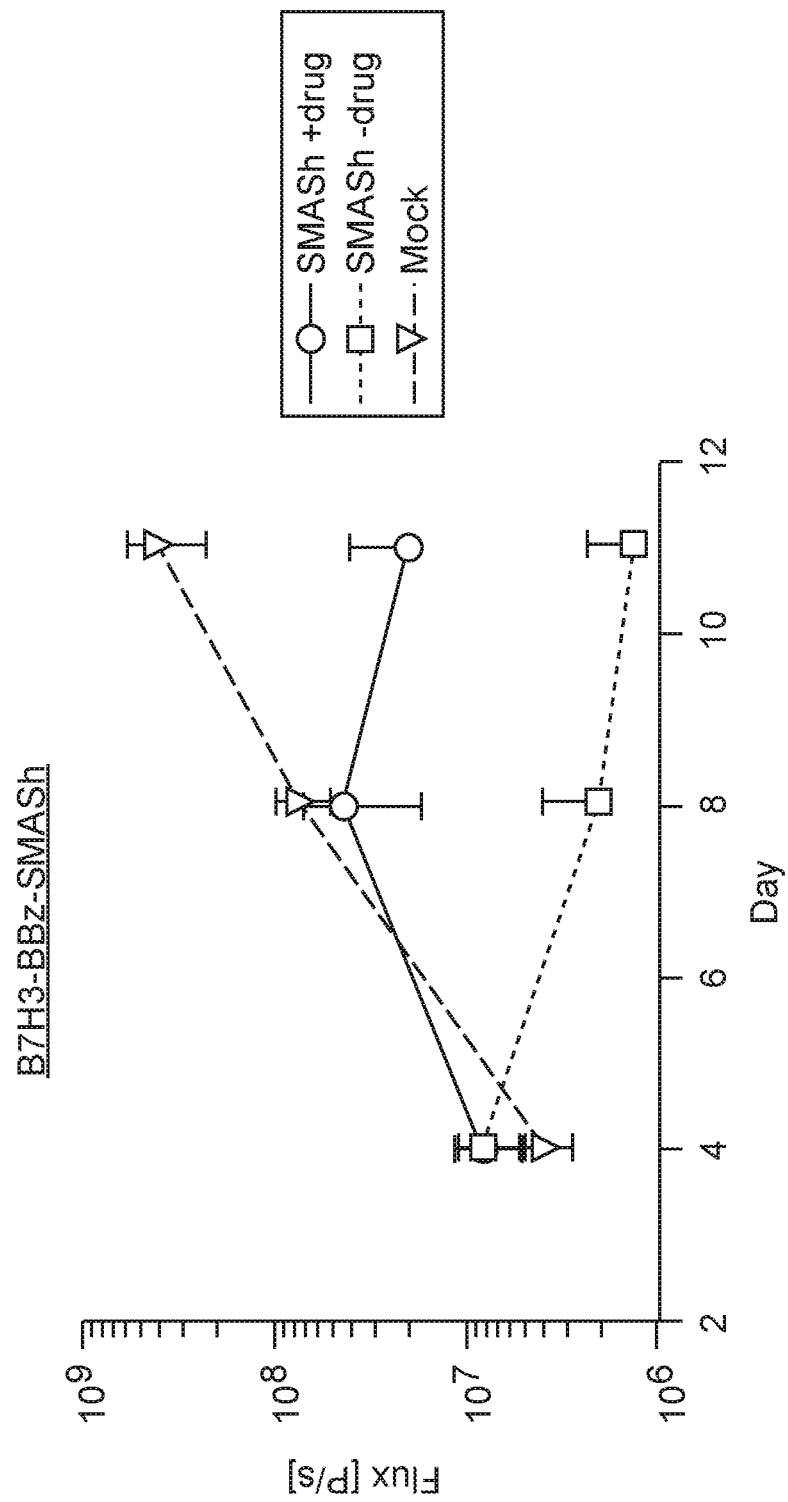

Example 2—Drug-Regulatable Control of CAR Expression and CAR T Cell Cytotoxicity In Vivo This example demonstrates the regulatable expression of a CAR on T cells in vivo. NSG mice were infused with $10^6$ Nalm6 leukemia cells expressing B7H3 and firefly luciferase. Four days later, mice were infused with $8 \times 10^6$ B7H3-BBz-SMASh CART cells or mock untransduced control cells. Mice that received B7H3-BBz-SMASh CAR T cells were either administered drug (50 mg/kg grazoprevir+25 mg/kg ritonavir) or vehicle (50% polyethylene glycol 300) three times per day by oral gavage. Bioluminescence imaging was used to follow the expansion of the firefly luciferase-expressing Nalm6 cells. As shown in FIG. 24, the presence of drug dramatically reduces the cytotoxic capacity of the CAR T cells in vivo.

Figure 25:
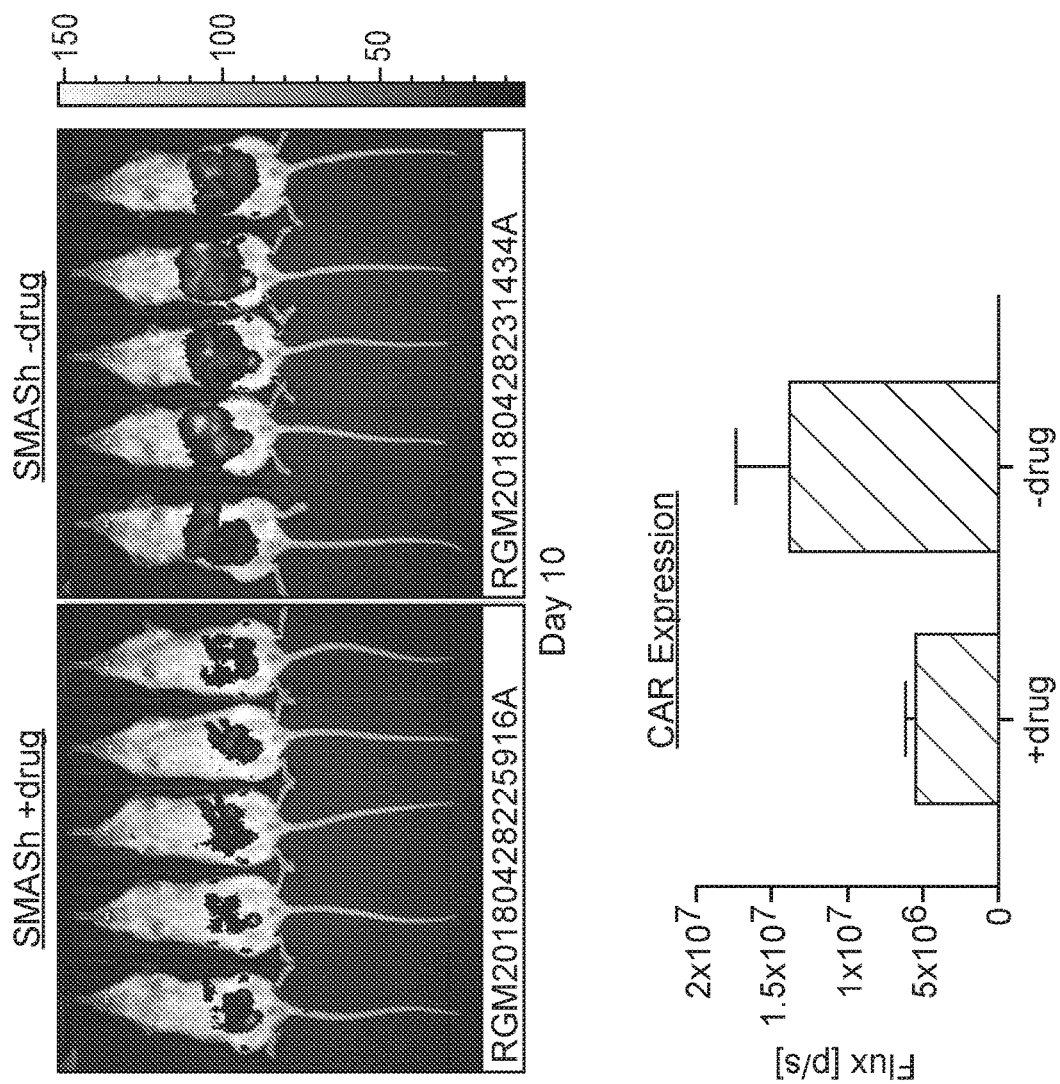
FIG. 25 Real-time expression of a C-terminal nanoluciferase (nLuc) domain-containing CAR as monitored in vivo by nanoluciferase-based imaging. As shown, infusion of a HCV NS3 protease inhibitor diminished CAR expression on the T cells in vivo.
Figure 25:
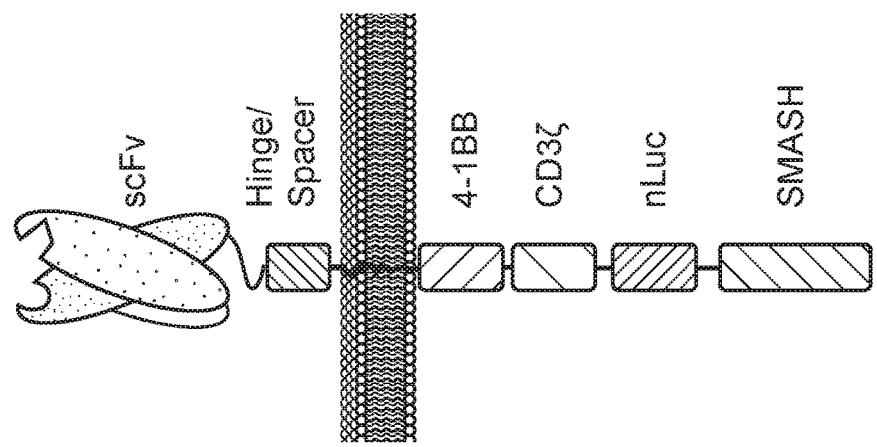

In a further study, real-time expression of a C-terminal nanoluciferase (nLuc) domain-containing CAR was monitored in vivo by nanoluciferase-based imaging. As shown in FIG. 25, infusion of a HCV NS3 protease inhibitor diminished CAR expression on T cells in vivo.

Example 3—Regulatable CAR T Cell-Based Therapy

The following is a protocol for regulatable cell-based therapy using drug-regulatable CAR T cells.

Peripheral blood mononuclear cells (PBMCs) are harvested by leukapheresis and enriched for T cells. The T cells are activated and expanded by magnetic beads decorated with anti-CD3/CD28 antibodies. The CAR-SMASh transgene is delivered to the T cells via an appropriate gene delivery method (lentivirus, retrovirus, AAV, transposase, CRISPR-CAS9, TALENs, nanoparticle, mRNA, electroporation, etc.). The CAR T cells are co-cultured with beads for a period of 2-3 days prior to separation by exposure to a magnetic field. The CAR T cells are expanded for 5 to 21 days in the presence of a cytokine such as interleukin-2 that supports proliferation. The CAR T cells can optionally be cultured in the presence of HCV NS3 protease inhibitor such as asunaprevir (1 µM to 50 µM) during part of or the entire ex vivo culture period to turn off CAR expression. Turning off CAR expression during the ex vivo culture period reduces premature T cell activation due to basal CAR activity or engagement of the CAR with cognate antigen present in the cell preparation. This reduction in premature CAR activity minimizes T cell exhaustion and preserves CAR T cell capacity for mounting an immune response upon engagement of target antigen. The CAR T cells are cryopreserved in cryopreservation media for later use and/or analysis.

Patients are infused with $1 \times 10^6$ to $5 \times 10^{10}$ CAR T cells. When the SMASh tag includes a protease derived from HCV NS3, CAR expression can be controlled in vivo by administering an HCV NS3 protease inhibitor given one to six times per day at a dose of 0.1 to 300 mg/kg. The drug may be administered as needed to control adverse effects. Alternatively, or additionally, the drug is administered in order to minimize T cell exhaustion and/or dysfunction, and/or enhance T cell therapeutic capacity. The drug may be administered in such a manner to confer periods of high CAR expression (activity) and periods of low CAR expression (rest). The dosing schedule may include periods of rest lasting from 1 to 15 days, periods of CAR expression ranging between 1 to 30 days, and any combination thereof.

Example 4—In Vivo Control of B7H3 CAR-Nanoluciferase-SMASh CAR-T Cell Activity Against Nalm6 Leukemia Cells Assessed in this example was whether B7H3 CAR-nanoluciferase-SMASh CAR-T cell activity could be controlled in vivo against Nalm6 leukemia cells. NSG mice were infused with $10^6$ Nalm6 leukemia cells expressing B7H3 antigen and firefly luciferase by tail vein injection. Four days later, mice were infused with $8 \times 10^6$ B7H3 CAR-nanoluciferase-SMASh CAR-T cells or mock un-transduced control T cells by tail vein injection. Mice in the "CAR OFF" group were administered 50 mg/kg grazoprevir+25 mg/kg ritonavir (a pharmacokinetic enhancer of grazoprevir) two to three times per day by oral gavage. Bioluminescence imaging was used to follow the expansion of the firefly luciferase-expressing Nalm6 cells.

Figure 26:
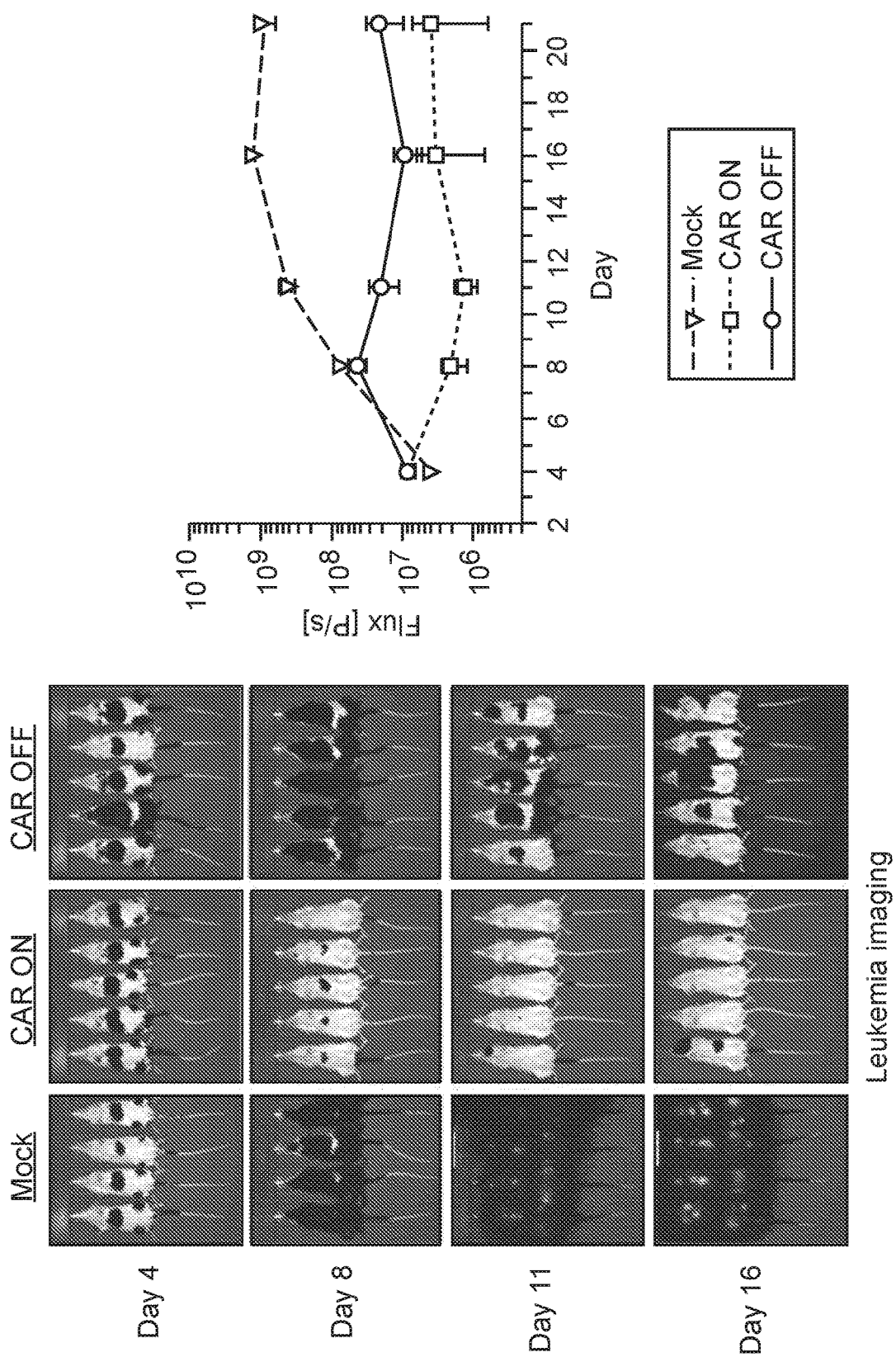
FIG. 26 Data demonstrating in vivo control of B7H3 CAR-nanoluciferase-SMASh CAR-T cell activity against Nalm6 leukemia cells. NSG mice were infused with $10^6$ Nalm6 leukemia cells expressing B7H3 antigen and firefly luciferase by tail vein injection. Four days later, mice were infused with $8 \times 10^6$ B7H3 CAR-nanoluciferase-SMASh CAR-T cells or mock untransduced control T cells by tail vein injection. Mice in the "CAR OFF" group were administered 50 mg/kg grazoprevir+25 mg/kg ritonavir two to three times per day by oral gavage. Bioluminescence imaging was used to follow the expansion of the firefly luciferase-expressing Nalm6 cells. Left panel: a series of images showing the bioluminescence of the Nalm6 leukemia cells throughout the time course of the experiment. Right panel: a graph showing the average bioluminescence flux values of the various experimental groups throughout the time course of the experiment. Error bars represent standard error of mean. As seen in the data, B7H3 CAR-nanoluciferase-SMASh CAR-T cells display robust clearance of leukemia cells in the absence of drug but have diminished cytotoxic capacity in the presence of drug, as determined by bioluminescence imaging.

Provided in FIG. 26 (left panel) is a series of images showing the bioluminescence of the Nalm6 leukemia cells throughout the time course of the experiment. Provided in FIG. 26 (right panel) is a graph showing the average bioluminescence flux values of the various experimental groups throughout the time course of the experiment. Error bars represent standard error of mean. As seen in the data, B7H3 CAR-nanoluciferase-SMASh CAR-T cells display robust clearance of leukemia cells in the absence of drug but have diminished cytotoxic capacity in the presence of drug, as determined by bioluminescence imaging.

Example 5—In Vivo Control of B7H3 CAR-Nanoluciferase-SMASh CAR-T Cell Activity Against a Patient-Derived Medulloblastoma Cell Line Assessed in this example was whether B7H3 CAR-nanoluciferase-SMASh CAR-T cell activity could be controlled in vivo against the patient-derived medulloblastoma cell line MED8A. NSG mice were subcutaneously implanted with $0.5 \times 10^6$ MED8A cells that were engineered to express firefly luciferase. Five days later, mice were infused with $5 \times 10^6$ B7H3 CAR-nanoluciferase-SMASh CAR-T cells or mock untransduced control T cells by tail vein injection. Mice in the "SMASh OFF" group were administered 50 mg/kg grazoprevir+25 mg/kg ritonavir (a pharmacokinetic enhancer of grazoprevir) two to three times per day by oral gavage. Bioluminescence imaging was used to follow the expansion of the firefly luciferase-expressing MED8A cells.

Figure 27:
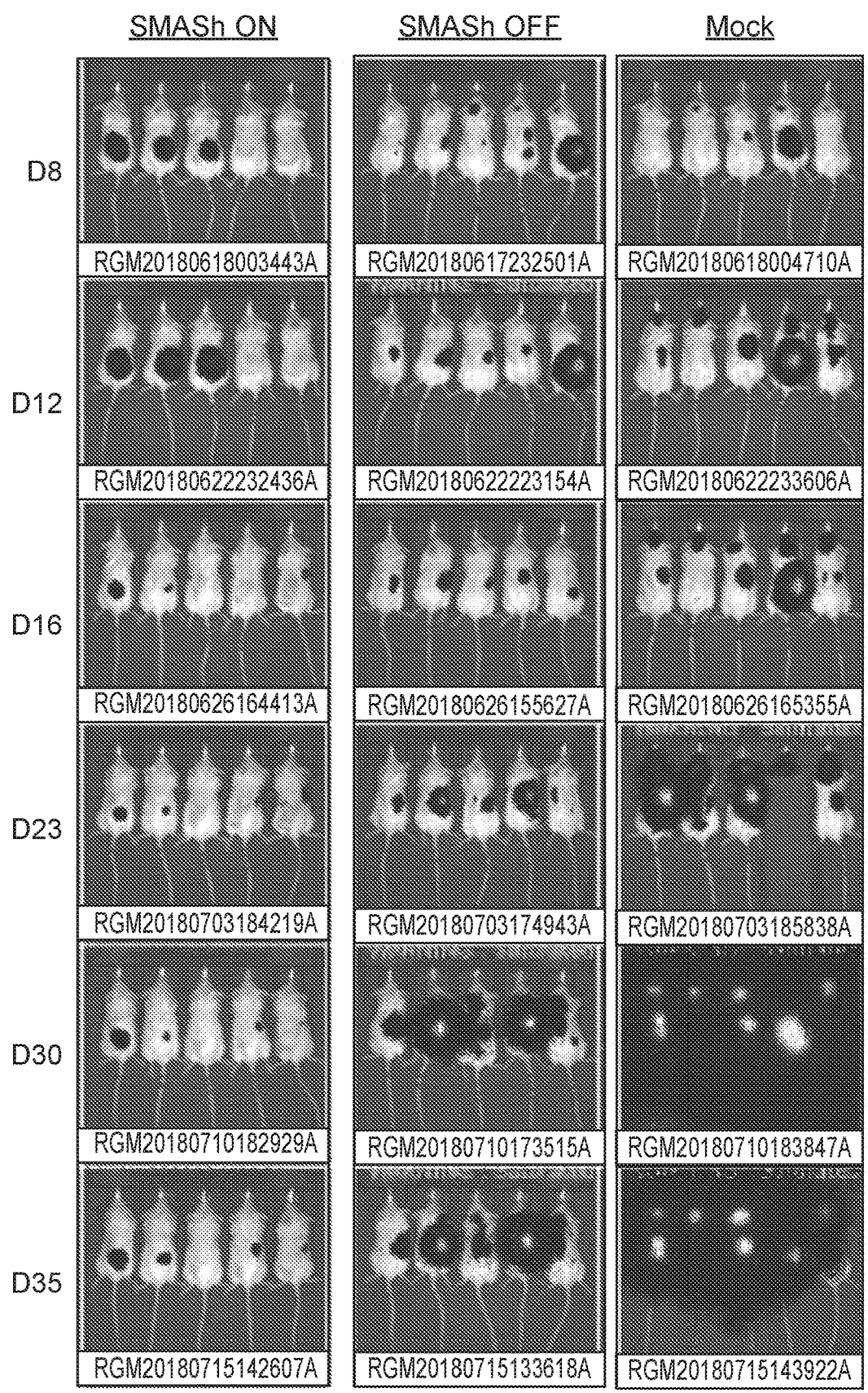
FIG. 27 Data demonstrating in vivo control of B7H3 CAR-nanoluciferase-SMASh CAR-T cell activity against a patient-derived medulloblastoma line (MED8A). NSG mice were subcutaneously implanted with $0.5 \times 10^6$ MED8A cells that were engineered to express firefly luciferase. Five days later, mice were infused with $5 \times 10^6$ B7H3 CAR-nanoluciferase-SMASh CAR-T cells or mock untransduced control T cells by tail vein injection. Mice in the "SMASh OFF" group were administered 50 mg/kg grazoprevir+25 mg/kg ritonavir two to three times per day by oral gavage. Bioluminescence imaging was used to follow the expansion of the firefly luciferase-expressing MED8A cells. Left panel: a series of images showing the bioluminescence of the MED8A cells throughout the time course of the experiment. Right panel: a graph showing the average bioluminescence flux values of the various experimental groups throughout the time course of the experiment. Error bars represent standard error of mean. As seen in the data, B7H3 CAR-nanoluciferase-SMASh CAR-T cells display robust clearance of MED8A cells in the absence of drug but have diminished cytotoxic capacity in the presence of drug, as determined by bioluminescence imaging.
Figure 27:
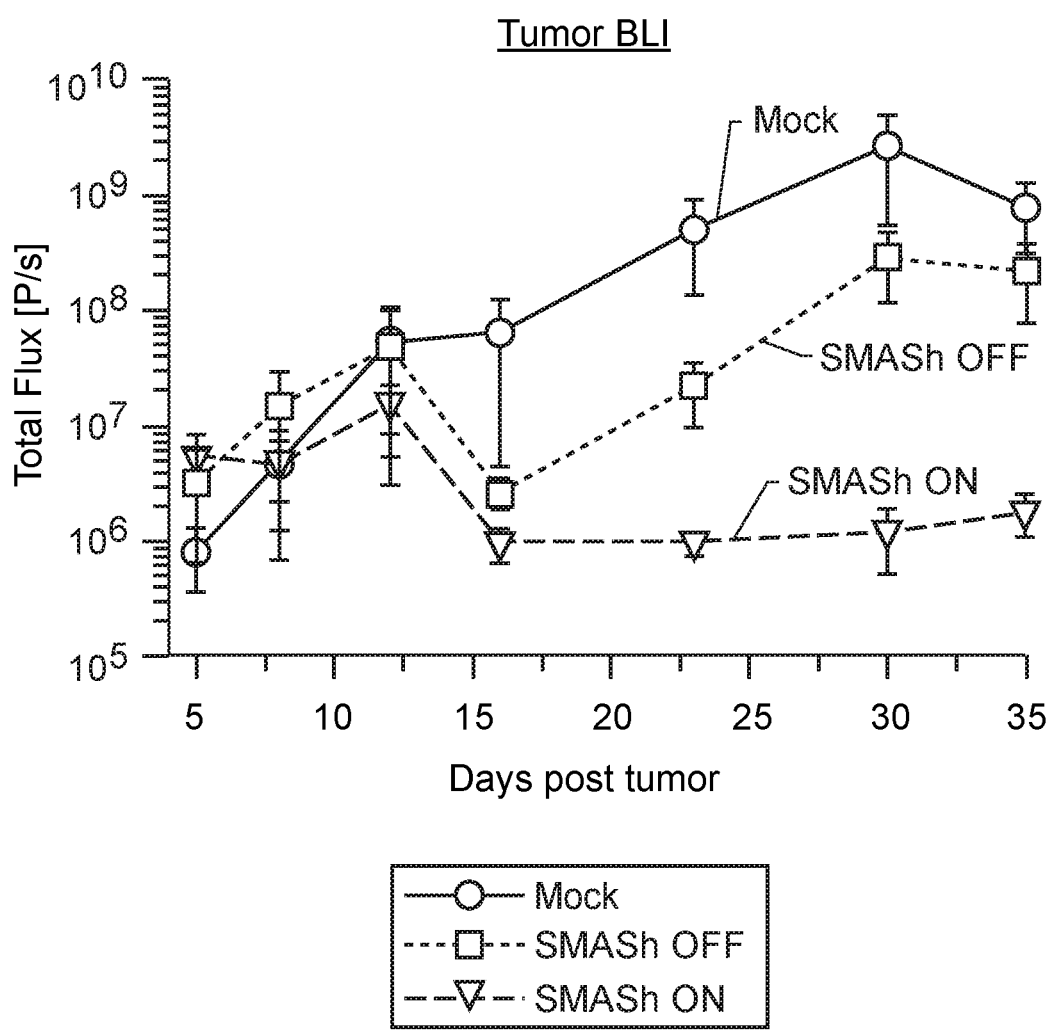
Figure 28:
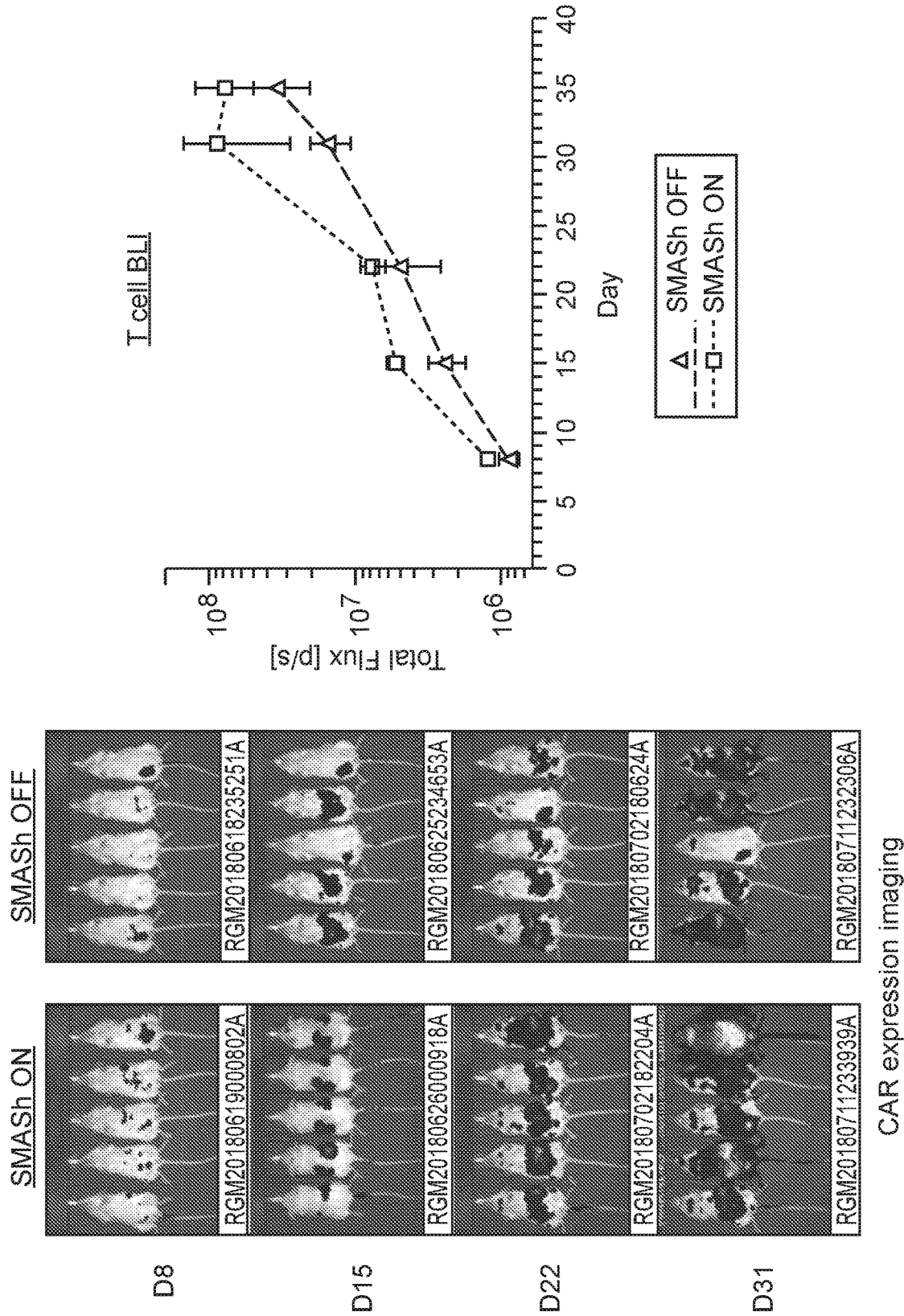
FIG. 28 In vivo CAR expression of mice described in FIG. 27 was assessed by nanoluciferase imaging. Mice were injected with 200 µL of Nano-Glo substrate that was diluted 40× in PBS. After a 6 min incubation period, the mice were imaged on an IVIS Spectrum imager. As seen in the data, in vivo CAR expression was diminished in mice that received 50 mg/kg grazoprevir+25 mg/kg ritonavir two to three times per day by oral gavage.

Provided in FIG. 27 (left panel) is a series of images showing the bioluminescence of the MED8A cells throughout the time course of the experiment. Provided in FIG. 27 (right panel) is a graph showing the average bioluminescence flux values of the various experimental groups throughout the time course of the experiment. Error bars represent standard error of mean. As seen in the data, B7H3 CAR-nanoluciferase-SMASh CAR-T cells display robust clearance of MED8A cells in the absence of drug but have diminished cytotoxic capacity in the presence of drug, as determined by bioluminescence imaging.

Next, in vivo CAR expression in the mice described in FIG. 27 was assessed by nanoluciferase imaging. Mice were injected with 200 µL of Nano-Glo substrate that was diluted 40× in PBS. After a 6-minute incubation period, the mice were imaged on an IVIS Spectrum imager. As seen in the data, in vivo CAR expression was diminished in mice that received 50 mg/kg grazoprevir+25 mg/kg ritonavir two to three times per day by oral gavage.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the example embodiments shown and described herein.

What is claimed is:

1. A T cell expressing a polypeptide comprising from N-terminus to C-terminus:
   a chimeric antigen receptor (CAR) comprising a single chain variable fragment (scFv);
   a hepatitis C virus (HCV) nonstructural protein 3 (NS3) protease; and
   a degron comprising an amino acid sequence having 90% or greater identity to the amino acid sequence of SEQ ID NO:1,
   wherein the polypeptide further comprises a cleavage site for the protease disposed between the CAR and the protease.

2. The T cell of claim 1, wherein the polypeptide further comprises a spacer domain between the CAR and the cleavage site.

3. The T cell of claim 2, wherein the spacer domain decreases the response time of the polypeptide to an inhibitor of the protease.

4. The T cell of claim 1, wherein the scFv of the CAR specifically binds an antigen on the surface of a cancer cell.

5. The T cell of claim 4, wherein the antigen on the surface of the cancer cell is a tumor-associated antigen or a tumor-specific antigen.

6. The T cell of claim 4, wherein the antigen on the surface of the cancer cell is selected from the group consisting of: B7-H3 (CD276), CD19, GD2, CD22, and HER2.

7. The T cell of claim 1, wherein the protease comprises an amino acid sequence that is at least 80% identical to the amino acid sequence set forth in SEQ ID NO:2, which protease comprises an alanine at position 54, and wherein numbering is as in SEQ ID NO:2.

8. The T cell of claim 1, wherein the cleavage site for the protease is selected from the group consisting of: an NS4A/4B junction cleavage site, an NS3/NS4A junction cleavage site, an NS4A/NS4B junction cleavage site, an NS4B/NS5A junction cleavage site, and an NS5A/NS5B junction cleavage site.

9. The T cell of claim 1, wherein the degron comprises an amino acid sequence that is at least 95% identical, or 100% identical, to the amino acid sequence set forth in SEQ ID NO:1.

10. The T cell of claim 1, wherein the CAR comprises a signaling endodomain comprising 4-1BB and CD3 zeta.

* * * * *